US011315079B2

(12) United States Patent
Miller et al.

(10) Patent No.: US 11,315,079 B2
(45) Date of Patent: Apr. 26, 2022

(54) DYNAMIC INNOVATION ENABLEMENT SYSTEM

(71) Applicants: William Cox Miller, Frisco, TX (US); Debra Ruth Miller, Frisco, TX (US)

(72) Inventors: William Cox Miller, Frisco, TX (US); Debra Ruth Miller, Frisco, TX (US)

( * ) Notice: Subject to any disclaimer, the term of this patent is extended or adjusted under 35 U.S.C. 154(b) by 166 days.

(21) Appl. No.: 16/030,771

(22) Filed: Jul. 9, 2018

(65) Prior Publication Data

US 2020/0013014 A1    Jan. 9, 2020

(51) Int. Cl.
*G06Q 10/10* (2012.01)
(52) U.S. Cl.
CPC .................. *G06Q 10/101* (2013.01)
(58) Field of Classification Search
None
See application file for complete search history.

(56) References Cited

U.S. PATENT DOCUMENTS

| | | | | |
|---|---|---|---|---|
| 2007/0203711 A1* | 8/2007 | Nation | ...................... | G09B 5/00 434/350 |
| 2008/0215403 A1* | 9/2008 | Bentley | ................ | G06Q 10/101 705/7.11 |
| 2008/0281616 A1* | 11/2008 | Johnson | ................. | G06Q 10/00 705/1.1 |
| 2009/0117524 A1* | 5/2009 | Lynam | ................... | G09B 19/18 434/107 |
| 2009/0326999 A1* | 12/2009 | Duke | .................... | G06Q 50/184 705/301 |
| 2014/0214691 A1* | 7/2014 | Morris, III | ........... | G06Q 10/101 705/300 |
| 2017/0262783 A1* | 9/2017 | Franceschini | ............ | G06N 5/04 |
| 2018/0068271 A1* | 3/2018 | Abebe | .................. | G06Q 10/103 |

\* cited by examiner

*Primary Examiner* — Andrew B Whitaker

(57) ABSTRACT

A dynamic Innovation Enablement System (IES) that utilizes a novel n-dimensional vector-based data management system, in combination with a novel user interface and novel expert system, to speed up the efficiency of computer processing and real-time user application of data for selecting user interventions that optimize outcomes within the IES. The IES is a computer-implemented system for facilitating users to develop, practice and apply competency in innovation-conducive behaviors and techniques. The system has a user system and coupled to the user system, a server system, a data store and an innovation enablement system (IES). IES has a first module that includes information to guide users through a first set of tasks directed to developing competencies in innovation. IES also has a second module that includes information to guide users through a second set of predetermined tasks, including at least two tasks that together form an innovation process that directs a user towards producing an innovation. IES also has a third module that integrates the first module and the second module, wherein information about the users, generated utilizing one of the two modules, can inform and facilitate what the users input as information when utilizing the other of the two modules. In a further aspect, the IES employs vector matrix algebra to arrive at an ideal vector correlated to an innovation outcome.

20 Claims, 89 Drawing Sheets

Browser - I E S _ 🗗 X

Innovation Enablement System
650 → 640 → John Smith  Settings | Logout

| Subscription Home | Development Plan | Competency Modules | Project Workspace | Workgroups |

| Settings | 695 | Help Menu |

660 →

Subscriptions

| Subscription Name | Subscription Type | Last Activity | Expiration | Auto Renew | |
|---|---|---|---|---|---|
| ● IEEE Engineering | Organization - Basic | Workgroups 5 Jan 2009 | 15 Dec 2009 | Yes | Activity Report |
| ○ Trial Subscription | Trial - 15 days | Human Values 20 Jun 2009 | 05 July 2009 | No | Activity Report |
| ○ ABC Company | Organization - Basic | Innovative Thinking 25 Jun 2009 | 31 Aug 2010 | No | Activity Report |

670

[ Messages ]
[ Notepad ]
[ Activities ]
[ Active Groups ]

Browser - I E S

Innovation Enablement System

John Smith Settings | Logout

| Subscription Home | Development Plan | Competency Modules | Project Workspace | Workgroups |

— 660 →

Subscriptions
Settings

Help Menu

| Subscription Name | Subscription Type | Last Activity | Expiration | Auto Renew |
|---|---|---|---|---|
| IEEE Engineering | Organization - Basic | Workgorups 15 Jan 2009 | 15 Dec 2009 | Yes |

Subscription Activity Report for : IEEE Engineering  Download Activity Report

| | Last Activity | Activity | | | Activity Report |
|---|---|---|---|---|---|
| Development Plan | | Items in plan:0 | | | |
| Projects | 31 Dec 2008 | 1 Active | Projects : 0 Archived | | |
| Workgroups | 15 Jan 2009 | 1 Active | 0 Archived | Workgroups : 0 | *Be sure to develop* |
| | Last Activity | Assessment Taken | eLearning Units Accessed | Toolkit Accessed | 00:23:10 Total time spent |
| Competency Modules | | | | | 00:35:07 Total time spent |
| Basic of I E S | 20 Nov 2008 | ✓ | 2 | 2 | |
| Human Values | | | 10 | 5 | *Be sure to develop* |
| Innovative Thinking | 13 Dec 2008 | ✓ | | | |

— 675

Messages
Notepad
Activities
Active Groups

Innovation Enablement System

SEEKING CREATIVE, INNOVATIVE SOLUTIONS ◀— 747

Instructions

1. For the given context statement there are a number of items containing two options, with six points in between. For example:

When you are seeking creative, innovative solutions to work challenges, which human values are more likely to be in the foreground of your mind (in your conscious awareness)?

| Making a Meaningful contribution | ● | ○ | ○ | ○ | ○ | ○ | Trusting in goodness of others |
   |---|---|---|---|---|---|---|---|

2. Select a point between the two options that represents the degree to which one of the human values is more prominent in the foreground of your mind when you are doing innovative work.

Please note: We are not asking you to rank the importance of these human values to you. All of them may seem important to you; that is quite natural.

However, each of us usually has a limited number of human values "on our minds" at work – we consciously think about them and express them. We are asking you to rank the human values in terms of their likelihood to be in the foreground of your mind in various situations.

[ Reply Intro ]  [ Take Assessment ] — 749

Innovation Enablement System — 750

When you are seeking creative, innovative solutions to work challenges, which human values are more likely to be in the foreground of your mind (in your conscious awareness)?

| | | | | | |
|---|---|---|---|---|---|
| Making wise use of resources | ○ | ○ | ○ | ○ | ● | Cultivating inner peace |
| Caring for others | ○ | ○ | ● | ○ | ○ | Making fair decisions |
| Having a generous spirit | ○ | ○ | ○ | ● | ○ | Being thorough |

752 → Making wise use of resources
753 → Caring for others
754 → Having a generous spirit Progress ~ 756
3 of 10

Instructions    Previous    Next

FIG. 7E

Innovation Enablement System

SPECIAL: FACING STRESSFUL SITUATIONS ← 747

Instructions

Each item contains a statement that has two options. Many people feel that each of the two options might apply to them in some way. Therefore, for each statement:

1. Divide four (4) points between the two options to represent the degree to which one option is more prominent than the other in the foreground of your mind:
   4-0, 3-1, 2-2, 1-3, 0-4   (2-2 means you think about them the same)

For example:

When you are facing stressful work situations, which human values do you think about more frequently (in your conscious awareness)?

```
  3   Cultivating inner happiness
  1   Having gratitude
```

Please note: We are not asking you to rank the importance of these human values to you. All of them may seem important to you; that is quite natural.

However, each of us usually has a limited number of human values "on our minds" at work – we consciously think about them and express them. We are asking you to rank the human values in terms of which are more likely to be in the foreground of your mind (in your conscious awareness)?

[Reply Intro]   [Take Assessment]

FIG. 7F

Innovation Enablement System

765

When you are facing stressful work situations, which human values do you think about more frequently (in your conscious awareness)?

767 → ___ Having a calm mind
    ___ Making a contribution to society

768 → ___ Having a courageous spirit
    ___ Having a high regard for others

769 → ___ Having compassion for others
    ___ Cultivating self confidence

Progress
3 of 10

[Instructions]  [Previous]  [Next]

*FIG. 7G*

Browser - I E S

Innovation Enablement System

John Smith Settings | Logout

| Subscription Home | Development Plan | Competency Modules | Project Workspace | Workgroups |

705 →

Modules Home | Select Module | My Results | Workgroup Results | eLearning | Toolkit | Help Menu Messages
Notepad
Activities
Active Groups Select a Module ▼

Human Values

Your Human Value Profile is : Intention - Action

| Intention | Connection | Action |
| 50 ● | 15 | 35 ○ |

Keep my scores Hidden: No   Date Taken 22 July 2009

730

Select a Category :   4 Competencies   Overview

There are 4 innovation competencies you can develop in the Human Values module. Select a competency to get started 1 | My Results | Understand yourself: | By taking the self-assessment, you will discover your unique human value orientation and strengths 2 | Workgroup Results | Understand Others: | Your workgroup results will help you to gain a broader awareness and understanding of the people you work with 3 | eLearning | Learn the Concepts: | With the eLearning you will develop strengths and versatility with all 3 human values orientations 4 | Toolkit | Apply Wisely: | The Application Toolkit will help you to apply human values wisely in your day-to-day work

Browser - I E S

Innovation Enablement System

John Smith Settings | Logout

| Subscription Home | Development Plan | Competency Modules | Project Workspace | Workgroups |

| Modules Home | Select Module | My Results | Workgroup Results | eLearning | Toolkit | Help Menu |

Foreground and Background Human Values   hide

The human values you tend to have more in the background of your mind when you are innovating. Bringing out your background human values may often be the key to strengthen your innovative work.

| Intention | Connection | Action |
|---|---|---|
| Engaging in thoughtful inquiry | Having a sincere interest in others | Cultivating Self-confidence |
| Being Tolerant of Mistakes | Doing no harm | Fulfilling my duties |
| Having a Enthusiastic mind | Having a humble spirit | Making fair decisions |
| | Being genuinely friendly | Being thorough |

Foreground | Background

828

810

Messages
Notepad
Activities
Active Groups

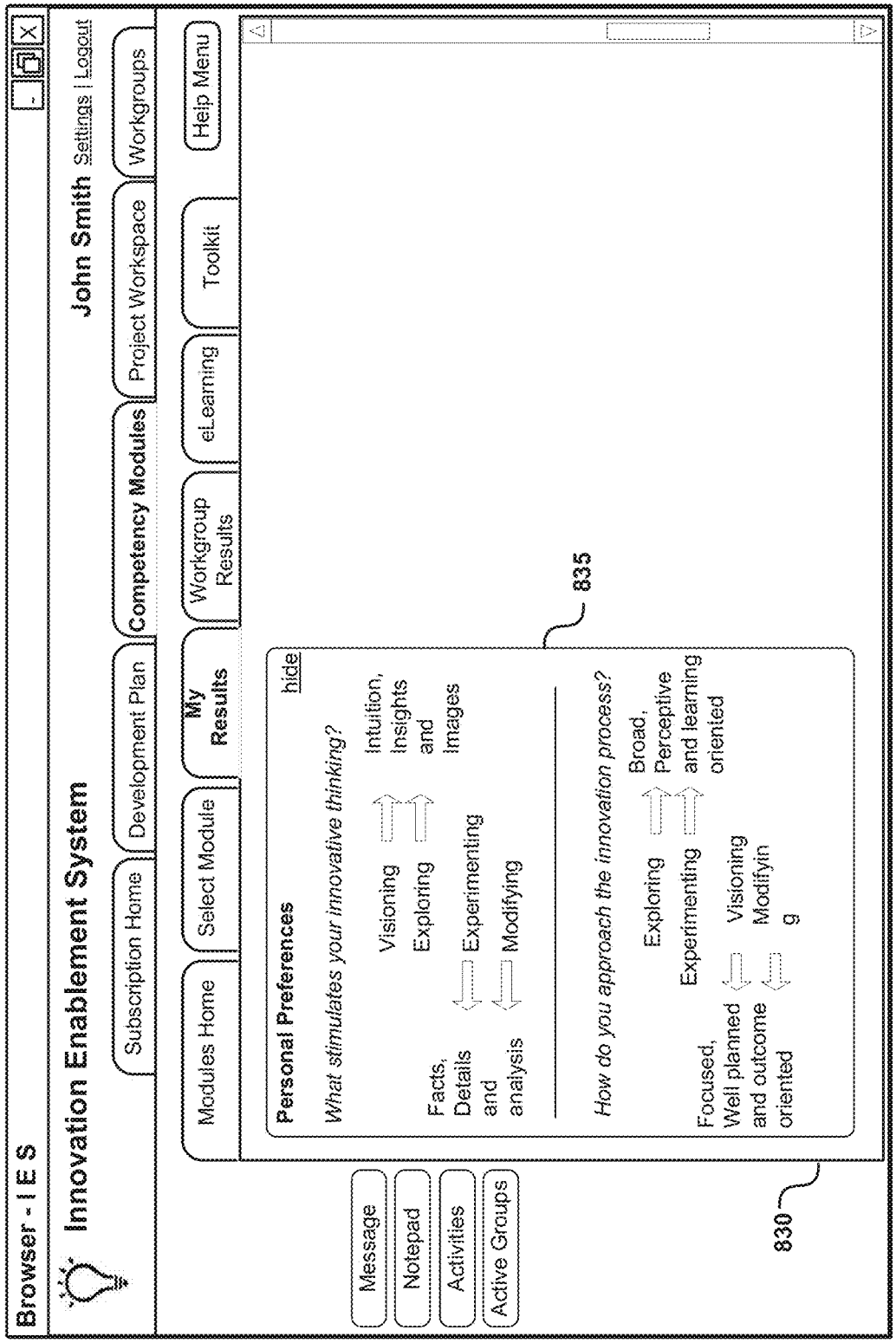
FIG. 8B1

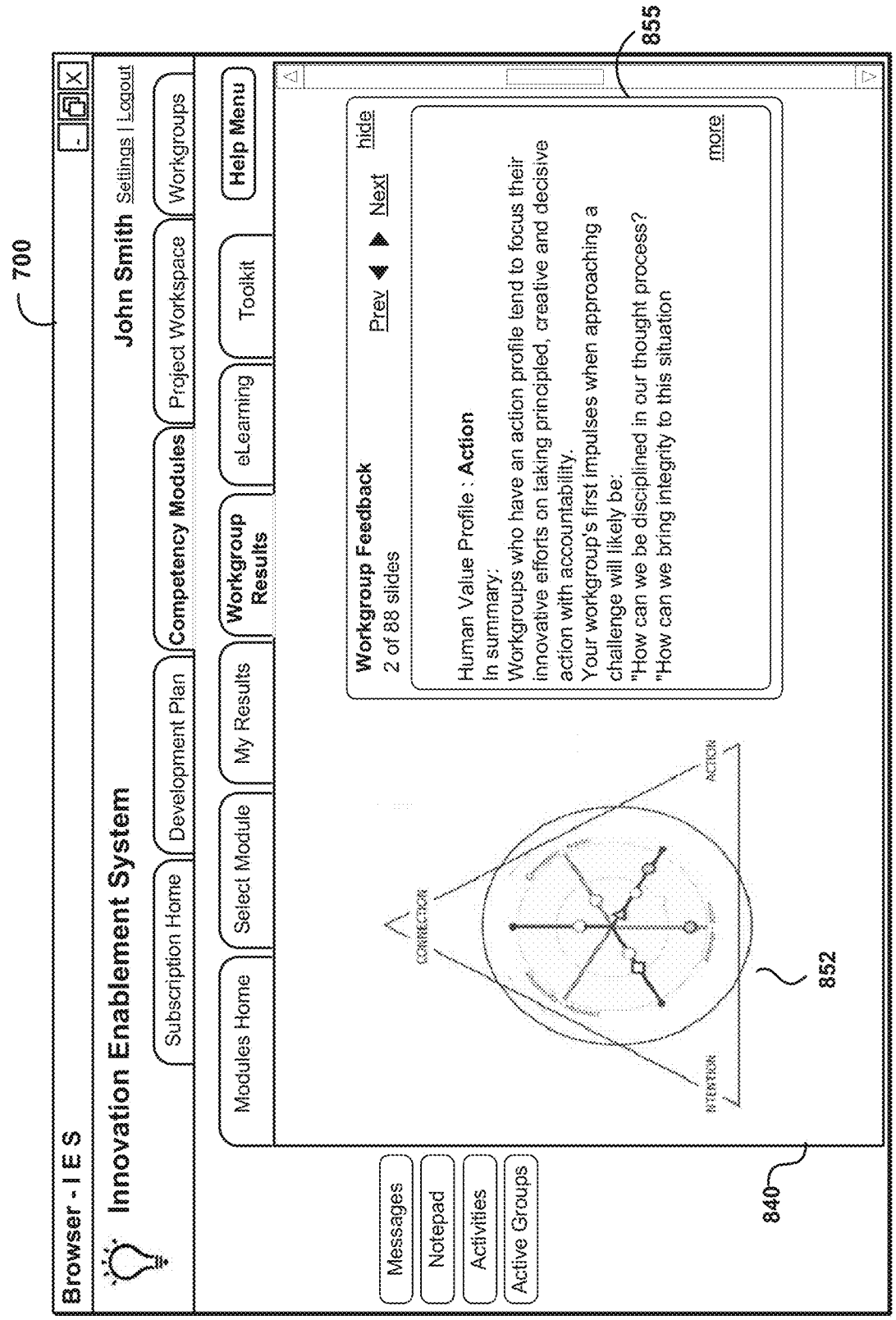
FIG. 8C1

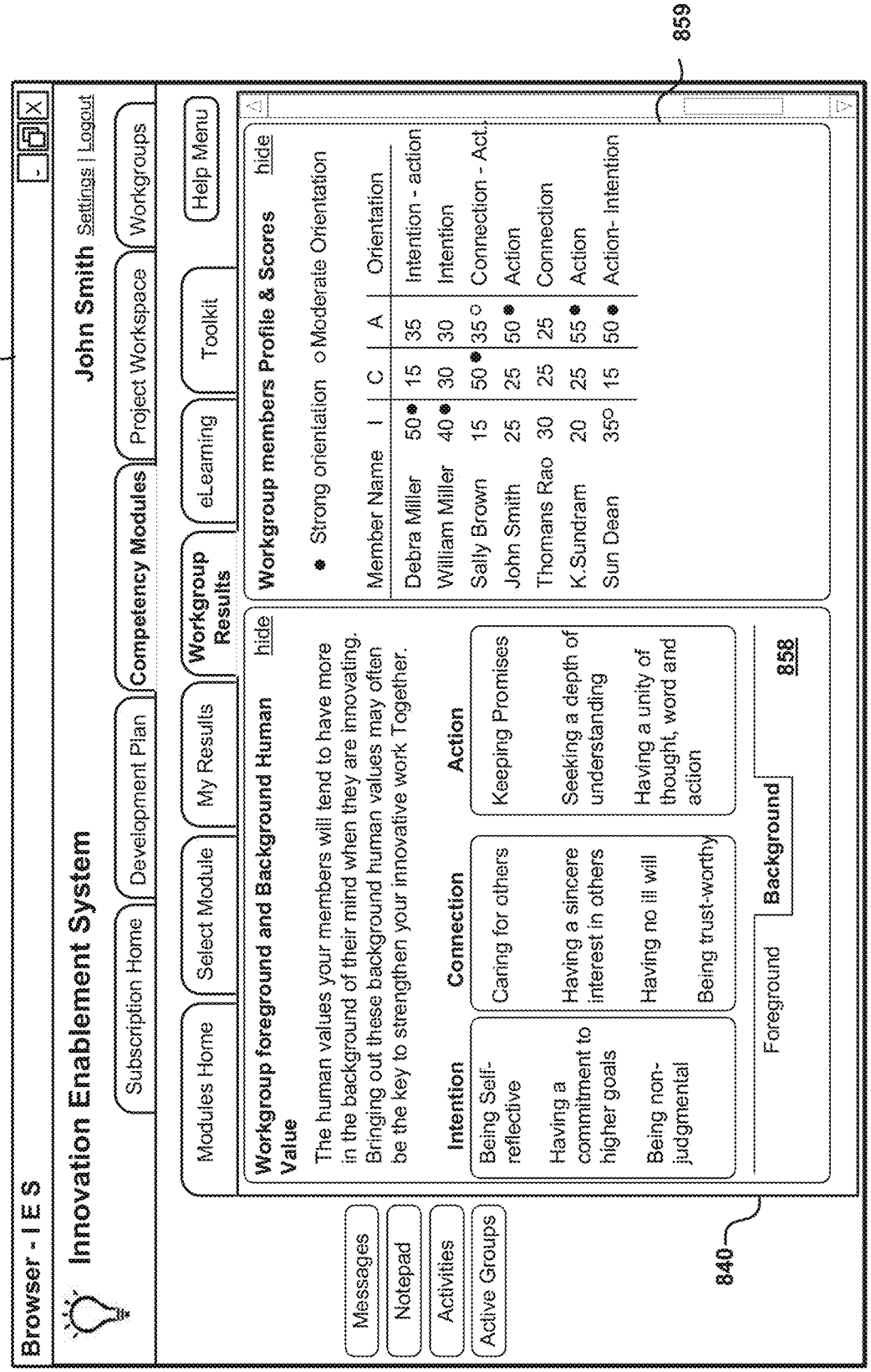
FIG. 8C2

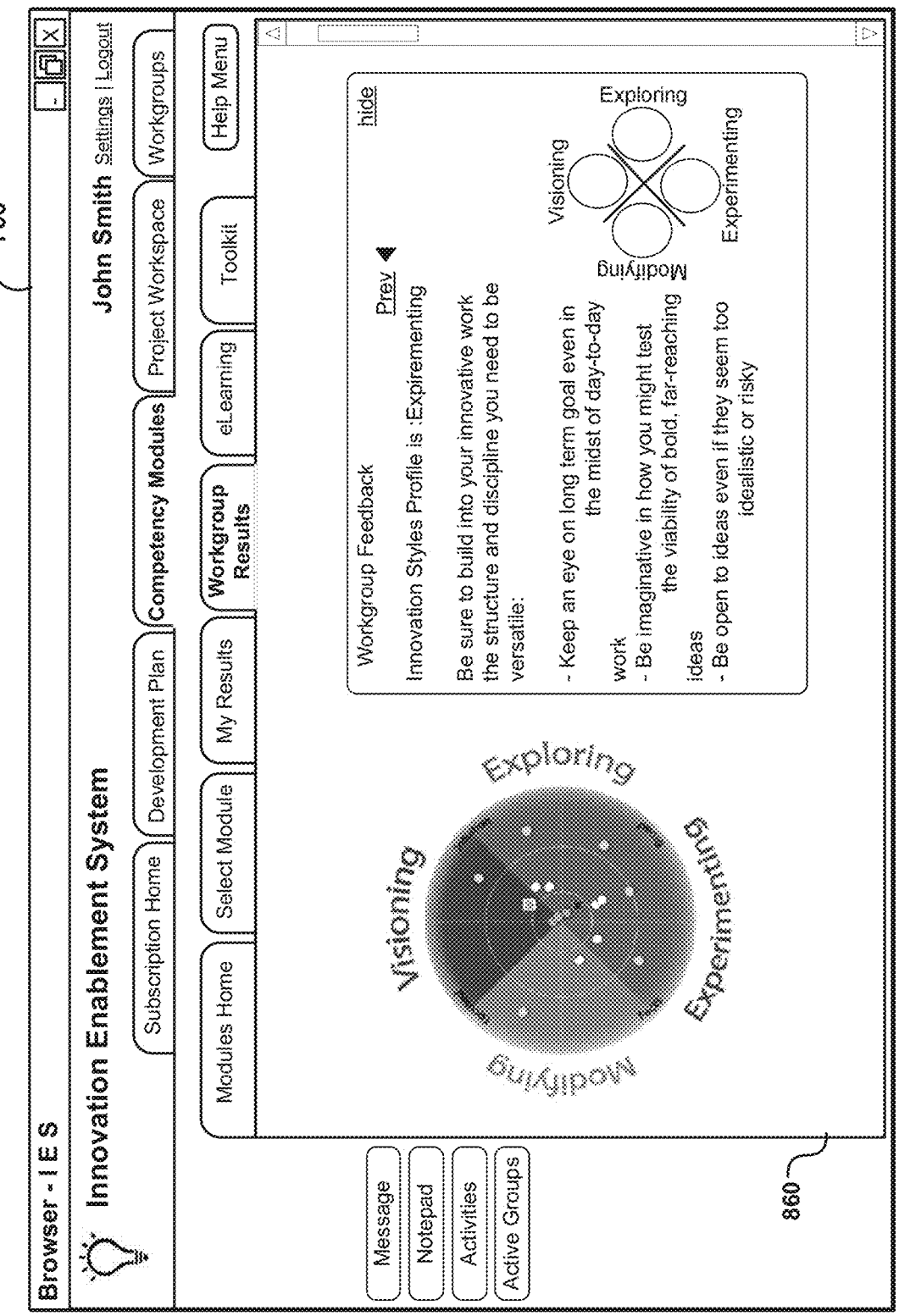
FIG. 8D1

FIG. 8D2

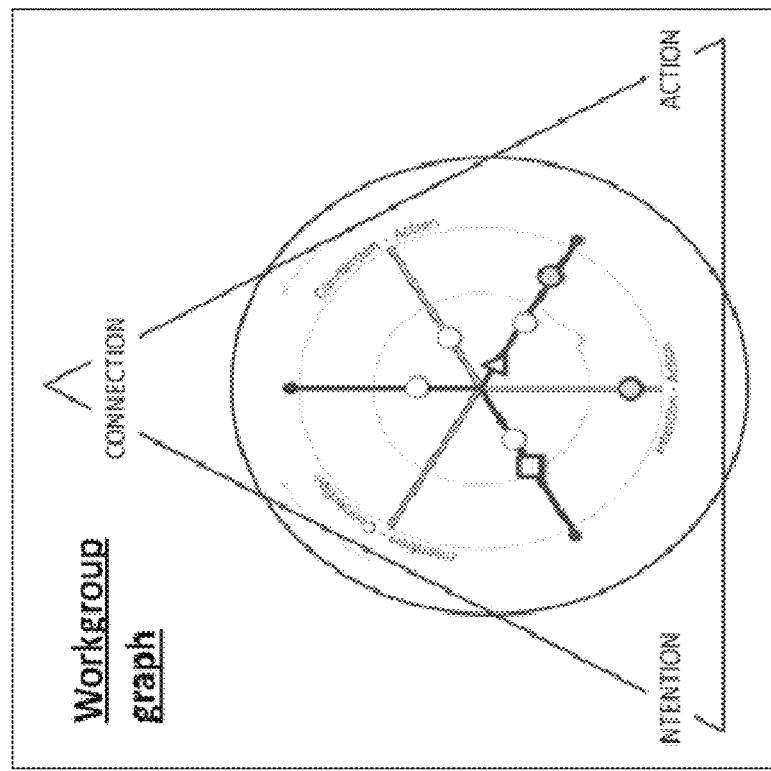
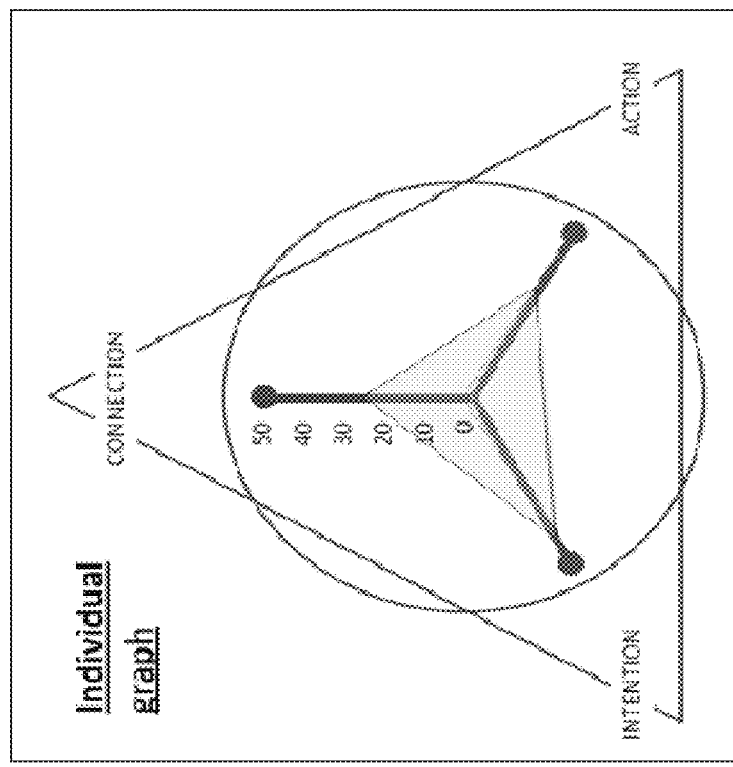
FIG. 8E

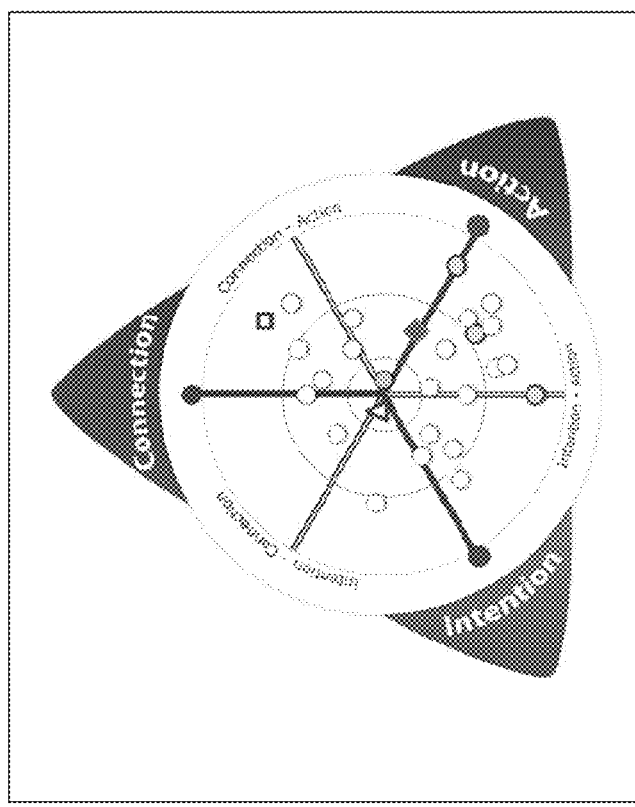
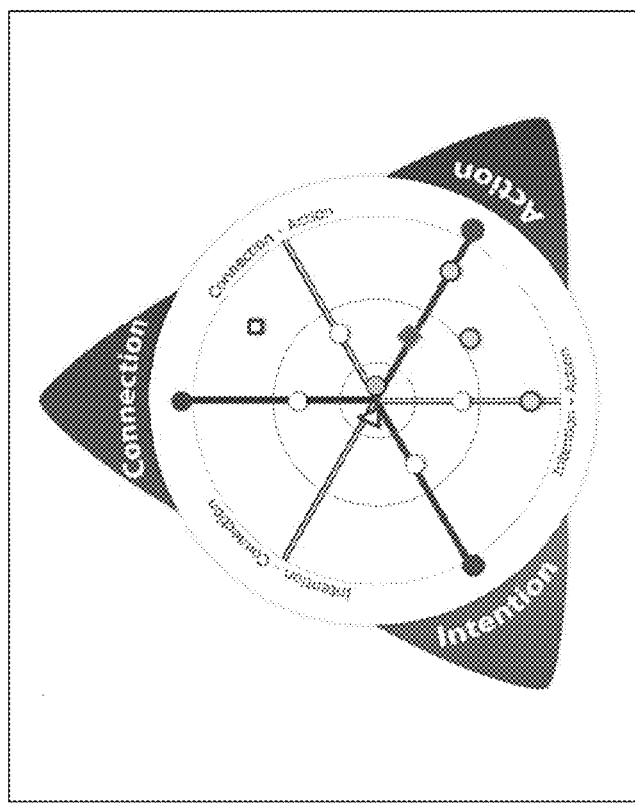
FIG. 8H

FIG. 10B

Innovation Enablement System — 1150

TASK 1: Establish the goal or purpose

- Enter your thoughts and insights about this task in the box below
- Each time you click "Add this entry" your data will be added as one entry to this task
- You can add as many entries as you would like The whole purpose of this journey is for me to find new ways to simplify my work. This hasn't been easy, so I am going to really focus on this and make it stick this time — 1155

Add this entry

*FIG. 11D*

Innovation Enablement System

TASK 1: Establish the goal or purpose

Basic Questions ▼ ← 1162

- Use each question below to help you define your goal or purpose for this journey
- Each time you click "Add this entry," your data will be added as one entry to this task
- You can add as many entries as you would like Learn more — 1165

1160

What human values are important as I define my goal or purpose for this journey?

Add your thoughts and insights here...

[Add this entry]

What would make this an exciting adventure?

Add your thoughts and insights here...

[Add this entry]

How can I best serve others with this creative journey?

we have a lot of important work to do, so if I can do things more simply, then I will be prepared to really help others do a better job. I want to help others be more realistic in their planning and not be so stressed out if I can demonstrate a better way. it will surely be accepted

[Add this entry]
1168

What would make any hardship worthwhile?

Add your thoughts and insights here...

[Add this entry]

[Add all entries]

+ Add other thoughts and insights

Add your thoughts and insights here...

[Add this entry]

[Clear all entries]

*FIG. 11E*

Innovation Enablement System

TASK 1: Establish the goal or purpose

Module and profile Specific Questions ▼ ←—— 1162

Select a module [Innovative Thinking ▼] ←—— 1172

Your innovation styles profile is: Visioning Exploring ←—— 1174

| Visioning | Experimenting | Exploring | Modifying |
|---|---|---|---|
| 70 ● | 30 | 60 ○ | 40 |

Keep my scores hidden: No    Date taken: 22 July 2009

Use the Innovative Thinking questions below to draw on your strengths and develop your versatility while engaging in this task: ←—— 1175

● Visioning             ○ Exploring

What goal or purpose do I ideally want to achieve?

What goal or purpose would represent a radical new breakthrough?

Add your thoughts and insights here...

Add your thoughts and insights here...

[Add this entry]

[Add this entry]

Modifying             Experimenting

What goal or purpose would build on the core mission of my work?

What goal or purpose would integrate the interest of everyone involved?

My works is to help others be more efficient in their work, so if I can make my work simpler then I will automatically be helping others too...

Add your thoughts and insights here...

[Add this entry] ←—— 1178

[Add this entry]

[Add all entries]   [Clear all entries]

Innovation Enablement System

TASK 1: Establish the goal or purpose

Basic Exercise ▼ ←— 1162

Step 4:
In the other direction, ask "what is a key barrier to achieving my goal or purpose?" and type your answer below your original statement

Step 5:
Ask again "what is a barrier" to narrow your scope and type your answer below the previous statement I'll feel better about myself and that will help others feel better too.

Because then I will be less stressed out and can help others around me do a better job I want to simplify my work Its always been hard for me to stay organized. I can only do it for a short while Every time I get organized people around me start asking for more things Clear all input Prev ▼  ▲ next

Innovation Enablement System

TASK 1: Establish the goal or purpose

Basic Exercise ▼ ←—— 1162

Step 6:
Formulate the right scope for your goal or purpose and type it into box:

| I'll feel better about myself and that will help others feel better too. |

| Because then I will be less stressed out and can help others around me do a better job |

My goal is to simplify my work, reduce my stress and feel good about myself

~ 1192

| I want to simplify my work |

| Its always been hard for me to stay organized. I can only do it for a short while |

| Every time I get organized people around me start asking for more things |

Step 7:
Select how you want to save your energy:

| - Save my goal statement as my entry<br>- Do not save all data | - Save my goal statement as my entry<br>- Save all data to a PDF file |

~ 1196   ~ 1198

Clear all input

Prev ▼

FIG. 11H

Innovation Enablement System

TASK 2: Assess the risks
Basic Question ▼ ← 1222
- Use each question below to help you assess the risks for this journey
- Each time you click "Add this entry," your data will be added as one entry to this task
- You can add as many entries as you would like Learn more What might be at odds with human values that are important to us?

Add your thoughts and insights here...

[Add this entry]

What's at stake? what could be the effects of either success or failure?

Add your thoughts and insights here...

[Add this entry]

What do we fear might happen?

Add your thoughts and insights here...

[Add this entry]

what biases might keep us from seeing the risks objectively?

Add your thoughts and insights here...

[Add this entry]

✚ Add other thoughts and insights

Add your thoughts and insights here...

[Add this entry]

[Clear All Entries]  [Add Entries]

Innovation Enablement System

TASK 6- Develop and decide on a solution
Decision-making worksheet-Basic rating criteria
- Use this worksheet to organize your Task 5 entries into themes and then use the 5 criteria below to rate them
- Save this worksheet to your Task 6 home panel and refer to it anytime
- You can create as many worksheets as you need to develop and decide on a solution Helpful hints
Export all entries
Export themes only

[ Save this worksheet ]

Show all themes      Show all entries

Select Criteria ▼

Selected: All entries (0)

Basic rating criteria : Entries

| Theme | Entries | Type | Date entered | Bold Sustainable (5=high) | Realistic Quick (5=high) | Hidden Gems (5=high) | Human Values (5=high) | Your Criteria (5=high) | Personal meaning (5=high) |
|---|---|---|---|---|---|---|---|---|---|

→ Bring in your Task 5 entries

Once you bring in your entries, you can organize them into themes, rate them according to the criteria you've chosen, add insights and delete entries Your original entries in Task 5 will not be changed If you want to add to or edit your entries, use Task5,all updated to Task 5 will automatically be transferred to this worksheet Add a theme
Favorite Themes ▲
1254
All Themes ▲

Innovation Enablement System

TASK 6 - Develop and decide on a solution
Decision-making worksheet-Basic rating criteria
- Use this worksheet to organize your Task 5 entries into themes and then use the 5 criteria below to rate them
- Save this worksheet to your Task 6 home panel and refer to it anytime
- You can create as many worksheets as you need to develop and decide on a solution Helpful hints
Export all entries
Export themes only

[ Save this worksheet ] ← 1258

Show all themes    Show all entries                                                    1257 →  Select Criteria ▼

| | | | | Basic rating criteria : Entries | | | | |
|---|---|---|---|---|---|---|---|---|
| Favorite Themes ▲ | Selected: All entries (0) | | | | | | | |
| Simple ideas I can do now (2) | Theme | Entries | Type | Date entered | Bold Sustainable (5=high) | Realistic Quick (5=high) | Hidden Gems (5=high) | Human Values (5=high) | Your Criteria (5=high) | Personal meaning (5=high) |
| All Themes ▲ | ☑ Simple ideas can do now | Exercise | Vision of the future | 27 Jul 2009 Summary: I clean off the top of my desk every night before I go home and come in each day to a clean state | 12345 | 12345 | 12345 | 12345 | 12345 | 12345 |
| Simple ideas I can do now (2) | ☑ Simple ideas can do now | Question | Which ideas could build upon my core competencies? Build into my panning system time to organize things once each week more | 26 Jul 2009 | 12345 | 12345 | 12345 | 12345 | 12345 | 12345 |
| This will take more time (2) | | | | | | | | | | |
| Add a theme | This will take more time | Free form | Sometimes the best ideas come from watching my child and how they flow through their day. more | 25 Jul 2009 | 12345 | 12345 | 12345 | 12345 | 12345 | 12345 |

Innovation Enablement System

TASK 6- Develop and decide on a solution

Task/Process specific rating criteria
-Select 1 of the tasks/process below for your worksheet Helpful hints

Rating Criteria

| Module | | | | | |
|---|---|---|---|---|---|
| Basics of IES<br>Select this criteria | Sustainable<br>Provides a solution that is sustainable over time | Will Work<br>Offers more than a "good idea"-will actually work | Inner Motivation<br>Inspires inner Motivation to get the job done | Global and Local<br>Meets the larger picture: global and local needs | Your Criteria<br>Add your Basics of VCI Criteria here |
| Human values<br>Select this criteria | Noble Goal<br>Will achieve a generous, noble, meaningful goal | Serves others<br>Will use resources wisely, with accountability | Wise Accountable<br>will use resources Wisely, with accountability | Broad Fair<br>Will be broadminded, helpful, and fair | Your Criteria<br>Add your Human values Criteria here |
| Wisdom Learning<br>Select this criteria | Unique Knowledge<br>Improves or extends our current offerings | Analytical Support<br>Has strong analytical support for workability | Intuitive Basis<br>Has strong intuitive basis as "right thing to do" | Manage unknowns<br>Unknowns and uncertainties are manageable | Your Criteria<br>Add your Wisdom Learning criteria here |
| Innovative Thinking<br>Select this criteria | Idea I Long-Term<br>Offers an ideal, long-term solution | Combines Features<br>Combines many features in a practical solution | Totally Unique<br>Offers a totally unique, even radical, solution | Enhances<br>Build on and enhances what has already been done | Your Criteria<br>Add your Innovative Thinking criteria here |
| Innovation process<br>Select this criteria | Addresses Risks<br>Addresses key risks and concerns | Good character<br>Aligns with good character and values | Creates Knowledge<br>Can create important new Knowledge | Enables Success<br>Can be implemented successfully | Your Criteria<br>Add your Innovation process criteria here |

Innovation Enablement System

TASK 6– Develop and decide on a solution

Task/Process specific rating criteria
–Select 1 of the tasks/process below for your worksheet

1265

Helpful hints

| Task/Process | Rating Criteria | | | | | |
|---|---|---|---|---|---|---|
| | Market Fit | Technical Fit | Strategy Fit | People Fit | | Your Criteria |
| Business Development Select this criteria | meets the true needs of customers and stakeholders | is something we have the capability of fulfilling | Aligns with higher goals and calling of our strategy | matches well with the people resources available | | Add your Business Development criteria here |
| | Builds on core | Ideal position | Rewrites Rules | Integrates | | Your Criteria |
| Strategic Thinking Select this criteria | Build on core Competencies | Ideally positions us within our industry | Rewrites the rules of competition | Integrates our products, markets or partnerships | | Add your New product Development criteria here |
| | Improve current | Bold Imaginative | Challenges | Flexible | | Your Criteria |
| New Product Development Select this criteria | improves or extends our current offerings | is a bold and imaginative "product of the future" | Challenges the formula for success in our industry | Provides a flexible set of features to meet diverse needs | | Add your New product Development criteria here |
| | Simplifies | World Class | Re-engineers | Combines | | Your Criteria |
| Quality Improvement Select this criteria | Simplifies or augments our current work processes | Gives us world-class Processes | Totally re-engineers our work processes | Combines or integrates our work processes | | Add your Quality improvement criteria here |
| | Improves present | Attracts Talent | Unfreezes | Better Synergy | | Your Criteria |
| Organizational Change Select this criteria | Improves upon how we presently operate | Makes us the organization of choice" to work for | unfreezes the organization to allow for something new | Gives us better synergy among our capabilities and units | | Add your organizational change criteria here |

Browser - I E S

Innovation Enablement System

John Smith Settings | Logout

| Subscription Home | Development Plan | Competency Modules | Project Workspace | Workgroups |

Help Menu

Creative Journey Name: Simplifying Work    Description: it's time to find ways to simplify me work!
Started: 22 July 2009    Last activity: No activity

← 1110

| Home | Task 1 | Task 2 | Task 3 | Task 4 | Task 5 | Task 6 | Task 7 | Task 8 | Progress |

Task 7 - Implement the Solution

Checkpoint : 1. While implementing the solution, did we meet my agreements?
2. Did we operate with a unity of thought, word and action % Completed [ ▼ ]

Outcome: [Based on your thoughts and insights below, Identify your progress as you implement your solution]

Show themes   Show entries    New Entry:  Free Form Questions Exercises

| Theme | Entries | Type | Date entered | My entry ratings |
|---|---|---|---|---|
| | | | | Priority  Meaning  Total |
| | | | | (5-high)  (5-high) |

Favorite
Themes

All Themes

Have to Complete the other task first as this
is a Certified Project

⌐ 1285

Message
Notepad
Activities
Active Groups

Add Themes

Innovation Enablement System

TASK 6- Develop and decide on a solution
Decision-making worksheet-Basic rating criteria
- Use this worksheet to organize your Task 5 entries into themes and then use the 5 criteria below to rate them
- Save this worksheet to your Task 6 home panel and refer to it anytime
- You can create as many worksheets as you need to develop and decide on a solution Helpful hints
Export all entries
Export themes only Save this worksheet Show all themes ▼   Show all entries

Selected: All entries (0)

| Favorite Themes | Theme | Entries | Type | Date entered | | Bold Sustainable (5=high) | Realistic Quick (5=high) | Hidden Gems (5=high) | Human Values (5=high) | Your Criteria (5=high) | Personal meaning (5=high) |
|---|---|---|---|---|---|---|---|---|---|---|---|
| Simple ideas I can do now (2) | | | | | | | Basic rating criteria : Entries | | | | |
| All Themes ▲ | | | Exercise | 27 Jul 2009 | My | 12345 2.3 | 12345 3.1 | 12345 3.3 | 12345 4.1 | 12345 4.2 | 12345 4.8 |
| Simple ideas I can do now | Simple ideas can do now | | Vision of the future Summary: I clean off the top of my desk every night before I go home and come in each day to a clean state | | All | | | | | | |
| This will take more time (2) | Simple ideas can do now | | Question Which ideas could build upon my core competencies? Build into my planning system time to organize things once each week more | 26 Jul 2009 | My | 12345 2.3 | 12345 3.1 | 12345 3.3 | 12345 4.1 | 12345 4.2 | 12345 4.8 |
| Add a theme | | | | | All | | | | | | |
| | This will take more time | | Free form Sometimes the best ideas come from watching my child and how they flow through their day.   more | 25 Jul 2009 | My | 12345 2.3 | 12345 3.1 | 12345 3.3 | 12345 4.1 | 12345 4.2 | 12345 4.8 |
| | | | | | All | | | | | | |

Browser - I E S

Innovation Enablement System

John Smith  Settings | Logout

| Subscription Home | Development Plan | Competency Modules | Project Workspace | Workgroups |

Help Menu

Creative Journey Name: Simplifying Work   Description: It's time to find ways to simplify me work!
Started: 22 July 2009                    Last activity: No activity

| Home | Task 1 | Task 2 | Task 3 | Task 4 | Task 5 | Task 6 | Task 7 | Task 8 | Progress |

Task 7 - Implement the Solution

Checkpoint : 1. While implementing the solution, did we meet my agreements?
2. Did we operate with a unity of thought, word and action Outcome: Based on your thoughts and insights below, identify your progress as you implement your solution % Completed [ 0% ]  [▼]

Show themes   Show entries

New Entry:   Free Form   Questions   Exercises

| Theme | Entries | Type | Date entered | My entry ratings |
| | | | | Priority (5-high) | Meaning (5-high) | Total |

Your Workgroup administrator has not selected this task
To select this task, notify your workgroup contact ⟩ 1385

Message
Notepad
Activities
Active Groups

Favorite Themes

All Themes

Add Themes

Browser - IES

Innovation Enablement System

John Smith Settings | Logout

1470

| Subscription Home | Development Plan | Competency Modules | Project Workspace | Workgroups |

Name: Village service Project
Total Members : 7

Purpose:We're going to the village to serve their needs and to learn from them
Workgroup contact : [add]

| Settings | Members | Activities | Progress Report |

Invite Member   View/Update Member   Member Messages

Step 1: Select who you want to send a message to    Active members (2) ▼

Step 2: Enter your subjects: [Let's schedule a planning time]

Step 3: Enter your message:

Would you be able to have a conference call next Tuesday at 10:00 to plan our workgroup activities?

Warm regards,
Debra

Step 4: Enter "reply to" e-mail address    [johnsmith@yahoo.com]

Step 5: Enter "respond by date"    [25 Aug 2009 ▼]

Step 6: Choose send method    [Email & IEssystem ▼]

Step 7: Send a copy to me    [Yes ▼]

Submit

Message
Notepad
Activities
Active Groups

1490

Help Menu

Submit

Innovation Enablement System

Develop your HumanValues Competencies

| Manage activities | Engage in activities ← 1535 |
|---|---|

Workgroup Results | Understand others:

Your Workgroup Results will help you to gain a broader awareness and understanding of the people you work with Place ✓ by each of the activities you want your workgroup members to engage in:

☑ Take the Human Values self-assessment    Download member results and feedback ▼

☑ Spend some quiet, reflective time to review the workgroup profile, graph and feedback ☐ Personally reflect upon the following questions:

Add questions here

☑ Complete these activities by: 25 Aug 2009 ▼

☐ Allow only administrators to see individual profiles and scores
(otherwise all members can view unless a member has hidden their scores or not given permission)

Clear all   Cancel   update

Helpful hints

Innovation Enablement System

Develop your HumanValues Competencies    Helpful hints  [X]

| Manage activities | Engage in activities | | |
|---|---|---|---| eLearning    Learn the Concepts:    with the eLearning, you will develop strength and versatility with all 3 human values orientations

1540

Place ✓ by each of the activities you want your workgroup members to engage in:

✓ Review the Human values overview    Download member results and feedback ▼

Review the following material (select 1):

✓ Spend some quiet, reflective time to review the workgroup profile, graph and feedback ☐ Review R _recommended_ elearning material ☐ Review _all_ eLearning materials ☐ Personally reflect upon the following questions:

Add questions here

✓ Complete these activities by: [25 Aug 2009 ▼]

✓ Allow members to add their recommended eLearning materials

1545

Clear all    Cancel    [update]

*FIG. 15D*

Innovation Enablement System

Set up new workgroup Project

Step 1: Identify a shot, interesting name for this Pr

Creating new knowledge

Step 2: Add a brief description of the project

As we learn the IES system and start working with knowledge. How we can plan to create that new k Step 3: Select an icon for this project:

browse

Step 4: Set the workgroup permission for this

Step 5: Set the project tasks you want your workg

1570

1575

Project Permissions

| | Viewers cannot see |
|---|---|
| Display Member Name on Individual Entries | Yes ▶ |
| Allow members to add, change or delete themes for each task (otherwise only Administrator can do) | Yes ▶ |
| Allow members to decide which option they want for each task (otherwise only Administrator can do) | No ▶ |
| Allow members to give input to all the task (otherwise, if task is not selected by the administrator, it will not be active | No ▶ |
| Allow the members to update the checkpoints for each task (otherwise only Administrator can update) | No ▶ |
| Allow the members to update the % complete for each task (otherwise only Administrator can update) | No ▶ |
| Allow the members to update the outcome for each task (otherwise only Administrator can update) | No ▶ |
| Allow members to delete Task 6 worksheets (Otherwise only the Administrator can delete) | No ▶ |
| Set to default    Clear all | Update |

*FIG. 15G*

Innovation Enablement System

Set up new workgroup Project

Step 1: Identify a short, interesting name for this Project
Creating new knowledge Step 2: Add a brief description of the project
As we learn the IES system and start working with the tool ourselves and with clients, we have the opportunity to create new knowledge. How Step 3: Select an Step 1: Select the tasks you want your workgroup to engage in   Click here to select all tasks

☑ 1  ☑ 2  ☑ 3  ☑ 4  ☐ 5  ☐ 6  ☐ 7  ☐ 8

Establish goals  Assess risks  Tap into character  Analyze issues  Generate Ideas  Decide on a solution  Implement  Celebrate Step 1: Select the dates you want each task to be completed

| 15 Oct 2009 | 15 Oct 2009 | 15 Oct 2009 | 15 Oct 2009 | ▼ | ▼ | ▼ | ▼ |

Click here to apply one date for all selected tasks clear all   Update

Step 4: Set the w

Step 5: Set the p

Browser - I E S

Innovation Enablement System

John Smith Settings | Logout

1510

| Subscription Home | Development Plan | Competency Modules | Project Workspace | Workgroups |

1450 → Name: Village service Project
Total Members : 7

Purpose: We're going to the village to serve their needs and to learn from them
Workgroup contact : Muller

| Settings | Members | Activities | Progress Report |

Help Menu

Getting your innovative work done:

| Name | Description | Start Date | Last Activity | Time | Entries |
|---|---|---|---|---|---|
| A New Future | Creating our future department so that we all want to come to work more | 2 Feb 2009 | Task 5  25 Jun 2009 | 000:02:24 | 37 |

Workgroup Meetings

Meetings Scheduled :
1

Meetings completed :
0

Message
Notepad
Activities
Active Groups

Browser - I E S

Innovation Enablement System

John Smith Settings | Logout

1600

Subscription Home | Development Plan | Competency Modules | Project Workspace | Workgroups

650 →

1610 →

Plan Home | Make Plan | Complete Plan

Help Menu

How do you want to develop your innovative skills today?

My Plan Progress Report for John Smith
Date : 15 Jul 2009

Download My Progress Report

Message
Notepad
Activities
Active Groups

Short-Term Goals

To Develop a good amount of expertise within 6 months

1625

More

Long-Term Goals

To be able to lead others to be innovative

1628

More

← 1630

Developing your innovative Competencies:

| Modules | Assessment Taken | eLearning Units Accessed | Toolkit Accessed | Be sure to include |
|---|---|---|---|---|
| Basic of IES | | | | |
| Human Values | Complete by | 3 of 9<br>31 July 2009 | 2 | |
| Innovative Thinking | Complete by 31 July 2009 | 2 of 7<br>31 July 2009 | 5 | |

FIG. 16A1

DYNAMIC INNOVATION ENABLEMENT SYSTEM

CROSS-REFERENCE TO RELATED APPLICATIONS

This application relates to, and claims the benefit of the filing date of, U.S. provisional patent application Ser. No. 61/433,314, entitled SYSTEM FOR FOSTERING INNOVATION AMONG A GROUP OF USERS, filed Jan. 17, 2011, and India provisional patent application serial no. 3510/CHE/20910, entitled SYSTEM FOR FOSTERING INNOVATION AMONG A GROUP OF USERS, filed Nov. 23, 2010, the entire contents of which are incorporated herein by reference for all purposes. The Application is also a continuation in part of, and claims the benefit of the filing date of, application Ser. No. 13/301,590, entitled "SYSTEM FOR FOSTERING INNOVATION AMONG A GROUP OF USERS filed Nov. 21, 2011, which is incorporated by reference in its entirety.

TECHNICAL FIELD

The present disclosure relates to software systems, and more specifically to a system for fostering innovation among a group of users.

BACKGROUND

Innovation broadly refers to the generation and implementation of creative ideas targeted to produce new or improved solutions to: product/service development and marketing (e.g., products/services sold to consumers); work processes (e.g., making users more productive); knowledge management (e.g., supervising employee talent and knowledge); organizational leadership (e.g., developing business models and organizational culture); and stakeholder relations (e.g., relations with customers, suppliers and society). The term "innovation" is contrasted to the term "creativity" in that creativity is related to coming up with new, original ideas, while innovation is related to putting those ideas to work and creating a benefit.

Fostering innovation among a group of users refers to promoting/further encouraging the growth or development of innovations/innovative techniques among the users. Such fostering enables the users to be more innovative in terms of the number and/or the quality of the products/processes implemented as a group. The group of users may be an organized set of users or an unorganized assemblage. The group of users may contain only a single user or a large number of users (in the range 1000+). Examples of groups are the employees/consultants working for a business organization, the members of a society/organization such as IEEE, ad hoc groups formed for solving specific problems/tasks, etc.

There is a need in the art for fostering innovation among users in groups.

Moreover, in data base management, when the number of data variables (forces) in a dynamic system grows, the set of relationships between variables and between the tables needed to represent such variables becomes more and more complex. This complexity impacts the speed by which the computer can access needed data and carry out computations with those complex relationships, and the memory needed during to conduct those functions and to store the results for future processing. Increasing the speed of access and computation while reducing needed memory improves the computer-related technology by which the data base manages the dynamic changes in the complex relationships of variables.

Quantifiable data within a data base can be represented as either a scalar or a vector. Scalars are quantities that distinguish a single numerical value like an integer are fully described by a magnitude alone. Vectors are quantities that are fully described by both a magnitude and a direction.

Scalar data are stored using a matrix of cells, with a specified identity for each cell so the computer processor can retrieve specified data to use in computations.

Vector data are stored in a vector-based system as arrays of data with both magnitude and direction, as defined by coordinates marking the beginning and end points Each individual piece of quantifiable data is considered a "singular object" that can be accessed and utilized in computer processing. A vector is itself considered to be an object that can contain multiple singular objects. With basic vector-based data systems, a data "object" exists as a vector in a 3-dimensional space and can be manipulated in accord with 3-dimensional Euclidean vector calculations such as addition, subtraction, multiplication and cross product. With CPUs, vector processing implements an instruction set on vector objects that contain multiple individual data objects, whereas scalar (integer) processing instructions operate on single data objects.

Using vector instructions dramatically outperforms integer instructions. Vector processing originally was the domain of super computers, but approximately as of the year 2015 most commodity CPUs implement architectures that feature instructions for a form of vector processing on multiple (vectorized) data sets, typically known as SIMD (Single Instruction, Multiple Data). Thus, microcomputers have started to incorporate the specialized instructions that support vector algebra by manipulating strings of bits (vectors) in a single instruction. These vector bit strings reflect a compression of data that can be loaded into microprocessors more effectively, thus improving CPU processing.

Along with this evolution in CPU, there has been an evolution in data base management, employing vectors in a columnar database that effectively manages vectors into cache. A vector data base management system (DBMS) will process compressed vector data directly while the integer DBMS will expend resources to un-compress data and then take up to 4× or more of memory. This 4× compression advantage means that the vector processor is more likely to find data in the fast Level 1 cache and in the mid-range L2 cache of memory. The use of vector algebra thereby provides another 8×-50× boost to the speed of calculation compared with integer-based mathematics. (Reference: Rob Klopp, "Database Super Computing," Apr. 10, 2015. https://skylandtech.net/215/04/30/database-super-computing/)

Conventional vector DBMSs are built around data "objects" existing as vectors in 1-, 2-, or 3-dimensional space and are aimed at situations involving spatial relationships or images, such as geographic applications (see VDMS: A Vector Data Management System for GIS Applications; https://ieeexplore.ieee.org/document/4579604/?reload=true) and image data (U.S. Pat. No. 6,539,126B1 and US706562B1). Patents for the use of n-dimensional vectors have been issued for methods of breaking down the components of those n-dimensional vectors into simpler vectors (U.S. Pat. No. 7,729,553B2). Other n-dimensional vectors patents focus on novel means of data compression (U.S. Pat. No. 8,811,156B1), transformation of the data vectors (US20070192316A1), and data searching (U.S. Pat. No. 7,325,001B2).

BRIEF DESCRIPTION OF THE DRAWINGS

Example embodiments of the present invention will be described with reference to the accompanying drawings briefly described below.

FIG. 6B depicts the manner in which IES 150 enables a user to access subscriptions in one embodiment.

FIG. 6C depicts the manner in which IES 150 enables users to view the activities performed within a subscription in one embodiment.

FIGS. 6D and 6E respectively depicts the manner in which IES 150 enables users to create individual and subscription specific profiles in one embodiment.

FIGS. 7C-7E together illustrates the manner in which IES 150 enables users to take assessments for a selected competency module in one embodiment.

FIGS. 7F and 7G together illustrate the manner in which context-based assessments are performed in one embodiment.

FIG. 7I depicts the manner in which IES 150 enables users to view their personal orientations for a selected competency module in one embodiment.

FIGS. 8A-8A1 and 8B-8B1 together illustrate the manner in which IES 150 enables users to view their personal results for different competency modules in one embodiment.

FIGS. 8C-8C2 and 8D-8D2 together illustrate the manner in which IES 150 enables users to view group results for different competency modules in one embodiment.

FIG. 8E depicts the manner in which IES 150 provides the results of a context-based assessment in one embodiment.

FIG. 8H depicts the manner in which IES 150 enables users to view results co-related between a workgroup and a subscription in one embodiment.

FIG. 10B depicts the manner in which IES 150 enables users to understand the relation between the tasks of the IPM and a competency module in one embodiment.

FIG. 11D depicts the manner in which IES 150 enables users to create entries of free-form type for tasks of the IPM in one embodiment.

FIG. 11E depicts the manner in which IES 150 enables users to create entries of question type for the tasks of the IPM in one embodiment.

FIG. 11F depicts the manner in which IES 150 enables users to create entries based on competency-module specific questions for tasks of the IPM in one embodiment.

FIGS. 11G and 11H together depicts the manner in which IES 150 enables users to create entries of exercise type for tasks of the IPM in one embodiment.

FIG. 12B depicts the manner in which IES 150 enables users to create entries of question type specifically for the second task of the IPM in one embodiment.

FIG. 12D depicts the manner in which IES 150 enables users to perform the sixth task of the IPM in one embodiment.

FIGS. 12D1, 12E and 12F together depicts the manner in which IES 150 enables users to create worksheets for the sixth task of the IPM in one embodiment.

FIG. 12G depicts the manner in which IES 150 enables users to select a module based criteria for the sixth task of IPM in one embodiment.

FIG. 12H depicts the manner in which IES 150 enables users to select a business task/process based criteria for the sixth task of IPM in one embodiment.

FIG. 12J depicts the manner in which IES 150 prevents users from performing out-of-sequence tasks for certified projects in one embodiment.

FIGS. 13A-13C together illustrates the manner in which IES 150 enables users to execute group projects in one embodiment.

FIG. 14E depicts the manner in which IES 150 enables users to invite other users to join a workgroup in one embodiment.

FIG. 14G depicts the manner in which IES 150 enables users to view and/or send messages to other members of a workgroup in one embodiment.

FIGS. 15C and 15D depict the manner in which IES 150 enables an administrator to select the specific activities to be performed for a competency module in one embodiment.

FIGS. 15G and 15H together depict the manner in which IES 150 enables an administrator to create a group project (for performing innovative work) in one embodiment.

FIGS. 15J and 15J1 together depicts the manner in which IES 150 enables an administrator to view the progress of the configured activities for the workgroup in one embodiment.

FIGS. 16A-16C together illustrates the manner in which IES 150 enables users to implement (make and complete) a self-development plan in one embodiment.

In the drawings, like reference numbers generally indicate identical, functionally similar, and/or structurally similar elements. The drawing in which an element first appears is indicated by the leftmost digit(s) in the corresponding reference number.

SUMMARY

Figure 1:
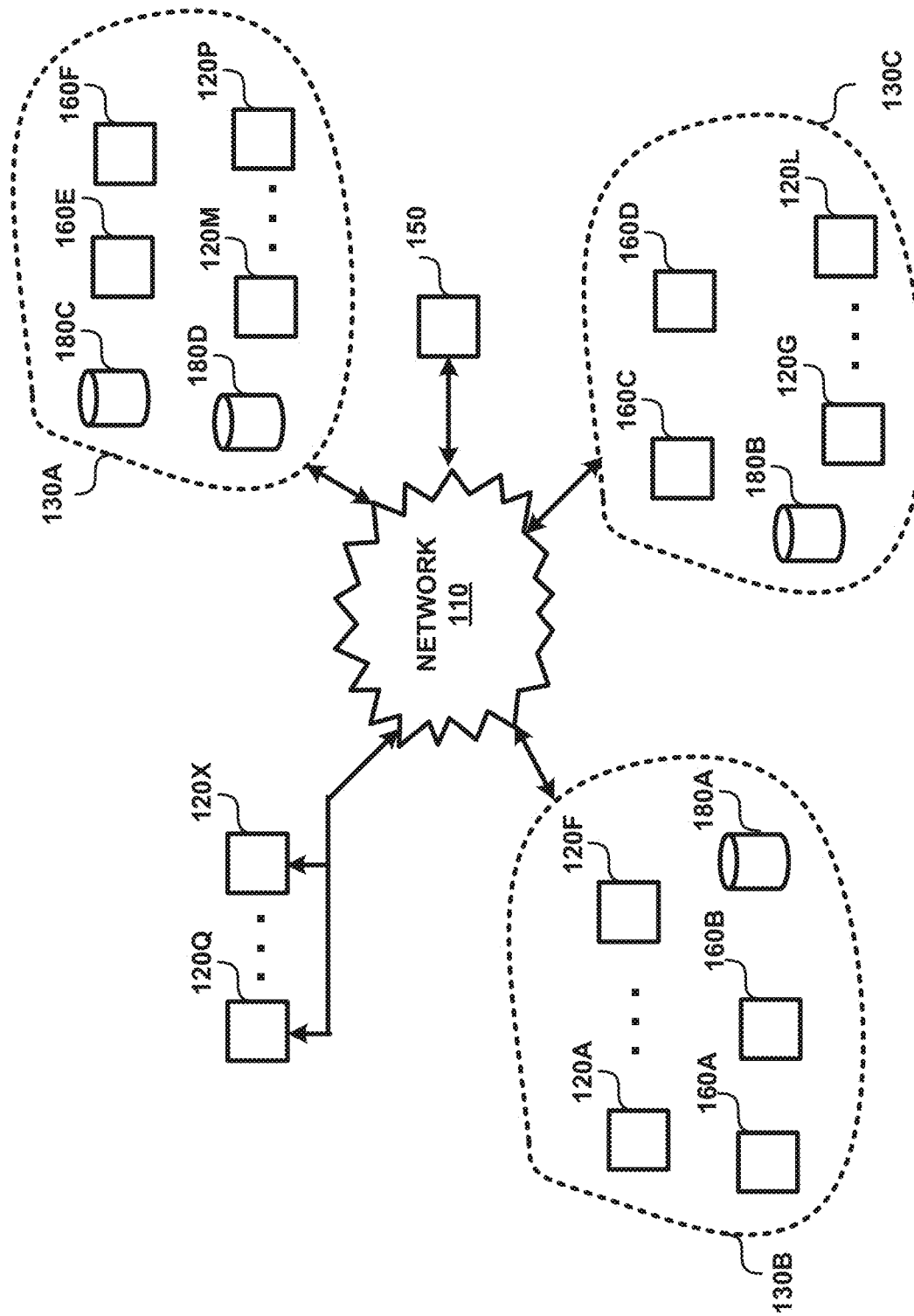
FIG. 1 is a block diagram illustrating the details of an example environment (or computing system) in which several aspects of the present invention can be implemented.

In a first aspect, a computer-implemented system is provided for facilitating users to develop, practice and/or apply innovation-conducive behaviors and techniques in order to produce a user-defined optimum innovative outcome, the system comprising: a user system including at least an input device and a display device; a data store coupled to the user system; and an innovation enablement system (IES) coupled to the user system, the IES including: a first module that enables display of information stored in the data store to guide one or more users through inputting information to complete a first set of one or more tasks directed to developing one or more competencies in innovation, a second module that enables display of information stored in the data store to guide one or more users through inputting information to complete a second set of predetermined tasks, including at least two tasks, that together form an innovation process that directs a user towards producing an innovation, and a third module that integrates the first module and the second module by enabling information input into one of the first and second modules to be used by the other of said first and second modules when the user is utilizing the other of the first and second modules, with guidance for the user to utilize the input from the first and/or second modules to produce a user-defined optimum innovative outcome, wherein the first module, the second module, and the third module each further employs the following either singularly or in combination: a vector-based data structure architecture with n-dimensional compound vectors; a vector-based user interface that enables a user to manipulate one or more vectors sequentially and/or simultaneously; and a vector-based expert system coupled to the vector-base user interface that analyzes the relationship complexities of the n-dimensional compound vectors and guides the production of optimized, innovative outcomes.

In a second aspect, a computer-implemented method is provide for facilitating users to produce an innovation, comprising: (a) establishing, in an IES, a collection of users as a group, (b) establishing, in the IES, a set of innovation competency-building tasks relating to imparting knowledge, awareness and/or skills for that user group to develop, and; (c) establishing, in the IES, a set of tasks that comprise a project in which the user group: practices innovation-conducive behaviors and techniques by inputting information according to a set of predetermined tasks that together form an innovation process whose output is intended to be an innovation, wherein the set of tasks is selected within a selection of one or more modules that increase a competency of innovation, comprising at least one of: a knowledge increase through electronic learning, of a first module an awareness increase through an assessment and feedback of the first module, and a skill increase through an application exercise of the first module, wherein the first module further employs the following either singularly or in combination: a vector-based data structure architecture with n-dimensional compound vectors; a vector-based user interface that enables a user to manipulate one or more vectors sequentially and/or simultaneously; and a vector-based expert system coupled to the vector-base user interface that analyzes the relationship complexities of the n-dimensional compound vectors and guides the production of optimized, innovative outcomes.

In a third aspect, a system is provided, comprising: a vector-based data structure architecture with n-dimensional compound vectors; a vector-based user interface that enables a user to manipulate one or more vectors sequentially and/or simultaneously; and a vector-based expert system coupled to the vector-base user interface that analyzes the relationship complexities of the n-dimensional compound vectors and guides the production of optimized, innovative outcomes.

Generally, this patent application, for a Dynamic Innovation Enablement System, provides a means of data compression involving n-dimensional "compound" vectors that is novel in itself as well as in combination with a novel user interface and a novel expert-system that vectorizes and manipulates vector-based data from the various modules of the IES as well as from various supplemental data bases.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

DETAILED DESCRIPTION

1. Example Environment

The inventors of the subject application have noticed that the current systems are directed to innovation management. The term "innovation management" refers to the process of organizing the "innovations" and innovation related information, in particular to tracking them through their development cycle and providing the means for people to generate, comment on, share, and evaluate creative ideas among the different users. The inventors have observed that such innovation management systems do not include specific functionality for competency-building for users, which would enable them to practice new innovation-conducive skills. The inventors therefore propose solutions for fostering innovation among a group of users, in particular, a system that enables users to be more innovative as individuals or together as a group.

FIG. 1 is a block diagram illustrating the details of an example environment (or computing system) in which several aspects of the present invention can be implemented. The computing system is shown containing network 110, user systems 120A-120X, server systems 160A-160F, data stores 180A-180D and innovation enablement system (IES) 150. The systems (except for user systems 120Q-120X) are shown as being part of different organizations 130A-130C (the dotted lines representing the organization boundaries).

Merely for illustration, only representative number/type of systems and organizations is shown in the Figure. Many environments often contain many more systems, both in number and type depending on the purpose for which the environment is designed. Each component/block of FIG. 1 is described below in further detail.

Network 110 provides connectivity between the various systems in organizations 130A-130C (such as user systems 120A-120P, server systems 160A-160F and data stores 180A-180D) and user systems 120Q-120X (shown outside the organizations). Network 110 may be implemented using protocols such as Transmission Control Protocol (TCP) and/or Internet Protocol (IP), well known in the relevant arts. In general, in TCP/IP environments, a IP packet is used as a basic unit of transport, with the source address being set to the TCP/IP address assigned to the source system from which the packet originates and the destination address set to the TCP/IP address of the target system to which the packet is to be eventually delivered.

Each of user systems 120A-120X represents a system such as a personal computer, workstation, mobile device (e.g., cell phone), etc., used by users to generate requests to application executing in server systems 160A-160F. The requests may be generated using appropriate user interfaces. In general, a user system sends requests to the desired application for performing desired operations and receives as corresponding responses the results of performance of the requested operations.

Each of data stores 180A-180D represents a non-volatile (persistent) storage facilitating storage and retrieval of a collection of data by applications executing in server systems 160A-160F. Some of data stores 180A-180D may be implemented as a corresponding database server using relational database technologies and accordingly provides storage and retrieval of data using structured queries such as SQL (Structured Query Language). Some of data stores 180A-180D may be implemented as a corresponding file server providing storage and retrieval of data in the form of files organized as one or more directories, as is well known in the relevant arts.

Each of server systems 160A-160F represents a server, such as a web/application server executing applications capable of performing tasks requested by users using user systems 120A-120X. In general, a server system receives requests for performing desired operations from user systems 120A-120X, performs the operations on data maintained internally or on external data (for example, stored in data stores 180A-180D) and then sends the result of performance of the operations to the requesting user systems as corresponding responses to the requests.

The users using the systems of FIG. 1 may be viewed as forming groups. For example the users belonging to each of organizations 130A-130C may be viewed as forming a corresponding group. Alternatively, the groups may be formed by users across organizations (e.g., using user systems 120A-120C, 120H, 120N-120P) and may include the users external to any organization (e.g., using users systems 120Q-120X). It may be desirable that the users of such groups, in particular, those corresponding to business organizations 130A-130C, be made more/better innovative as a group.

In one common approach seen within business organizations, the process of "innovation" is delegated to users who are experts (referred to as "specialists") in the domain/functional area in which innovation is sought to be achieved. Thus, marketing specialists are delegated the task of generating innovations for sales/marketing, while engineering specialists are delegated the task of generating innovations for products. Cross domain/functional innovation is achieved by forming groups containing different types of specialists.

One disadvantage is that common users/non-specialists (such as the programmers, sales persons, etc. of the business organization) are not involved in innovation, thereby reducing the innovation capabilities of the business organization as a whole. A current approach to involving non-specialists is the usage of idea management systems (or electronic suggestion boxes) which enable such users to submit/suggest, build upon, comment on, evaluate, and vote on ideas for innovation. Some of the deficiencies of such idea management systems are: (1) the implementation of the submitted ideas (which represents "innovation") is still done by management and specialist groups; this can separate the idea-giver, who might be most motivated to actualize the idea, from the implementation process, sometimes leading to disenfranchisement and de-motivation. (2) Such idea management systems do not teach the users the concepts of "innovation," since they are mainly focused on creative idea-generation and selection—not the whole process of innovation from start to finish. (3) Furthermore, they do not offer competency-building methods to help users to be better participants in the process, and accordingly fall short in the goal of fostering innovation in the group.

There are also several issues related to the formation of groups composed of specialists across professional domains/functions. (1) They are often formed by users within a business organization and do not include users from different business organizations; such an approach may result in "loss" of innovative ideas, in particular, that originate from users outside the organization. (2) Also, the formation of such ad hoc groups does not take into account the team climate and/or business culture of the business organization. (3) Furthermore, such an approach may have mismatch in the lexicon between the various domains/functionalities with respect to the words/terms used for innovation (for example, marketing vs. engineering lexicon); such a mismatch may reduce the effectiveness of cross-domain teams in generating "multi-domain" innovations.

In one typical response to these issues, innovation systems facilitating the specialists to interact with each other over a network ("online") are developed and deployed. The innovation systems are typically implemented as hubs, each hub having a common server system which is accessed by users using different user systems. However, such systems are directed to specific domains such as products, human resources management, etc. and there is no single organization-wide IT platform/system for innovation. Another disadvantage with such typical systems is that training related to fostering innovation is performed offline, for example by conducting workshops, seminars, talks, etc. and there is no co-relation between the innovation training provided and the online interactions using the innovation systems. In other words, what is provided to the users is "just-in-case" training, which may be useful just in case the user wishes to do innovative work. Thus, what is lacking is "just-in-time" training which is available online at any time, available just when the users need it to amplify their abilities to engage in innovation-conducive behaviors, techniques, and processes.

It should be noted that most of the prior approaches provide a "monetary" motivation or simulation to users for doing innovation. For example, users may be monetarily rewarded for each innovation contributed. However, it may be desirable for users to be empowered to have the self-motivation to do innovation. Research from the Harvard Business School, for example, has shown that such intrinsic motivation is more conducive to fostering creativity and innovation. Such intrinsic motivation of the users for performing innovation can draw from human values such as the user's role in society, protecting the environment, and as a service to humanity.

IES 150, provided according to several aspects of the present invention, can foster, equip and enable groups of one or more users (on an as-needed basis) to develop their competency (knowledge, awareness, and skills) to practice innovation-conducive behaviors and techniques and thereby to produce innovations and overcome some or all of the challenges noted above.

Though IES 150 is shown as a separate system, in alternative embodiments, IES 150 may be provided within one of organizations 130A-130C or the features of IES 150 may be implemented as part of server systems 160A-160F. All or part of IES 150 may also be implemented as a stand-alone application on any or all of user systems 120A-120X.

In one embodiment, IES 150 is provided both in the form of a stand-along application that can be downloaded and executed in one of user system 120A-120X, and also as a web application accessible on a cloud shared by multiple users. The cloud may be implemented using server systems 160A-160F and data stores 180A-180D. Some of the features (generally those that can be performed individually) of the invention may be provided using the stand-alone application, while other features (those that are to be performed collaboratively with other users) may require the user to access the cloud. A user is accordingly provided the facility to work in an "online" mode by connecting to the cloud and/or to work in an "offline" mode using the stand alone application, and also to synchronize (the actions performed, the results of the actions, etc.) between the two modes.

The manner in which IES 150 fosters innovation by an individual user and among a group of users is described below with examples.

2. System for Fostering Innovation Among a Group of Users

Figure 2:
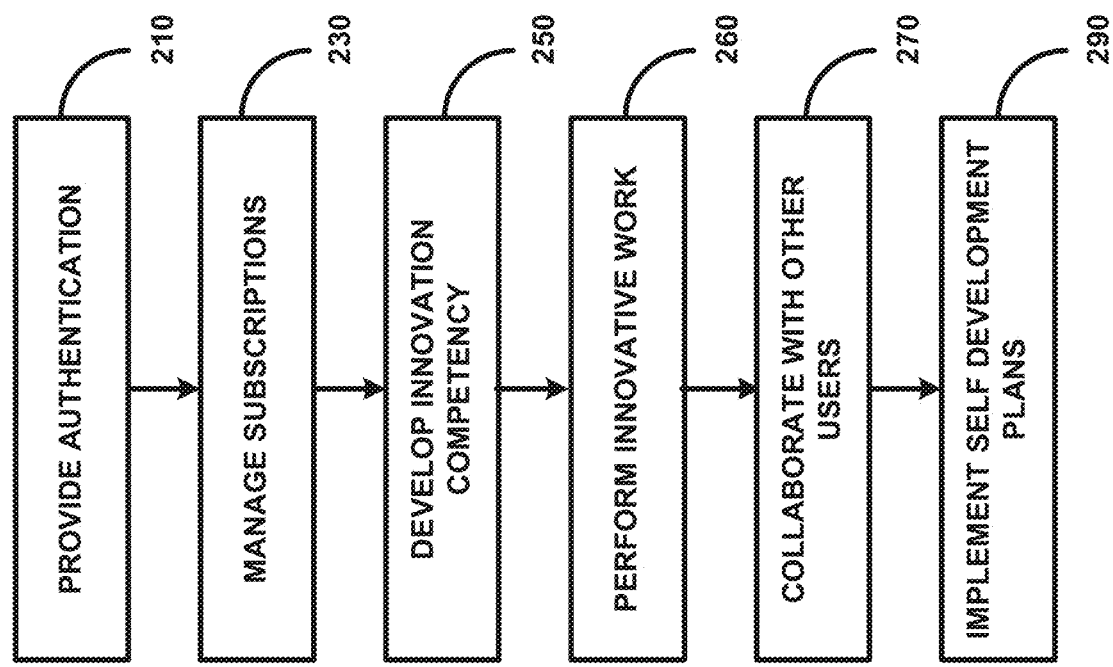
FIG. 2 is a flow chart illustrating the manner in which a system for fostering innovation among a group of users is provided according to an aspect of the present invention.

FIG. 2 is a flow chart illustrating the manner in which a system for fostering innovation among a group of users is provided according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention.

As used in this document, "users" refers to anyone who utilizes the resources of the IES 150 system to develop, practice and apply competency in innovation-conducive behaviors and techniques. "Administrator" refers to anyone who operates and makes choices of functionality and resources available in the IES 150 system on behalf of a set of one or more users; "administrators" may include persons at managerial, leadership, or clerical levels as well as workgroup facilitators-trainers.

In step 210, IES 150 (also referred to as "the system") enables users to provide authentication before performing the other activities noted below. As is well known, authentication refers to the process of establishing the identity of the user. In one embodiment, a user provides authentication by logging/signing in to the system using a pre-specified user name and a corresponding password (expected to be known only to the user, thereby ensuring that the user establishes his/her identity). Other forms of authentication such as use of digital certificates, third-party authorization, hardware/software keys, etc. may also be used by the users to access IES 150.

In step 230, IES 150 enables users to manage subscriptions to different groups defined within the system. Broadly, IES 150 requires the creation/definition of various groups as corresponding "subscriptions" that can be subscribed to by the users. Thus, each of business organizations such as 130A-130C, societies such as IEEE, special interest groups, ad-hoc groups, etc. may be defined as corresponding subscriptions in the system. IES 150 also allows users to have individual subscriptions, whereby the corresponding group may be viewed as containing only the subscribing user.

A user may have multiple subscriptions, for example, one as an individual, another as part of a business organization in which he/she is employed, yet another as part of a society in which he/she is a member, etc. IES 150 enables the user to manage the multiple subscriptions, in particular, to select the specific subscription (group) in which to perform the below described steps of developing innovation competency (250), performing innovative work (260) and collaborating with other users (270).

It may be appreciated that having a subscription based system facilitates IES 150 to operate across organization boundaries, as well as to enable groups to involve users who are not part of any organization (e.g., those using user systems 120Q-120X). Furthermore, IES 150 facilitates more effective cross domain/functional groups to be formed, as the users are enabled to subscribe to any desired group, and are not limited based on their organizational structure. Thus, IES 150 provides a distributed "social networking" system for innovation, in sharp contrast to the various hub style innovation systems provided in the prior approaches.

The manner in which the user performs the steps of 250, 260 and 270 for a selected subscription is described in detail below. However, it may be appreciated that the user may repeatedly perform similar steps for other subscriptions as well, after selecting the desired subscription from a list of subscriptions provided by IES 150.

In step 250, IES 150 enables users to develop their innovation competency (in general, or in relation to a specific group). Innovation competency broadly refers to the state or quality of having the awareness, knowledge and skills for being (adequately/well) qualified and having the ability to perform innovation-conducive behaviors and techniques. Developing innovation competency may entail changing a user's personality attitudes, individual skills, behavior, views, etc. to eventually improve the user's effectiveness (in terms of quality and/or quantity) in producing innovation.

Broadly, IES 150 provides multiple learning units directed to improving the innovation competency of the users. IES 150 then enables each user to determine their requirements in terms of developing their innovation competency and to select and study the desired learning units based to their determined requirements. The specific manner in which IES 150 facilitates users to develop their innovation competency is described in detail below with respect to FIG. 3.

In step 260, IES 150 enables users to perform innovative work, in particular, directed to generating more/better innovations. Broadly, IES 150 requires the user to perform the innovative work in terms of a pre-defined sequence of tasks, thereby guiding the user through the steps of innovation. IES 150 further facilitates users to access the appropriate learning units (provided in step 250) before/during/after the performance of each of the tasks. Accordingly, the user is able to more effectively perform the desired innovative work.

Thus, IES 150 ensures that the training (as represented by the learning units) to the user is provided "just-in-time" while performing innovative work, in contrast to the "just-in-case"/offline learning provided by prior approaches. It is noted that pre-defined sequence includes tasks that are related to implementation. Accordingly, IES 150 by providing guidance for such implementation related tasks enables even non-specialist users to perform implementation of their ideas (in other words "innovate"). The specific manner in which IES 150 facilitates users to perform innovative work is described in detail below with respect to FIG. 4.

In step 270, IES 150 enables a user to collaborate with other users in both developing innovation competency and performing innovative work. For example, a user may send/receive messages with other users using the system, recommend learning units of interest to the other users, work with others in performing the pre-defined sequence of tasks for generating innovations, etc.

In one embodiment, IES 150 further facilitates collaboration by enabling the users to form desired workgroups focused on achieving specific goals. Such workgroups may include users from a single subscription (e.g., for forming teams within a business organization such as 130A-130C) or from different subscriptions (e.g., for forming teams across organization boundaries). In general, workgroups may be viewed as "groups" of users operating at a smaller scale (in terms of the number of users, the learning units made available, the innovative work performed, etc.) in comparison to subscriptions. Thus, subscriptions and workgroups facilitate any desired group of users to collaborate on generating innovation. In the disclosure herein, the term "group" is used to represent both subscriptions and workgroups.

In step 290, IES 150 enables users to implement (make and complete) self development plans. A user may make a self development plan by including activities for developing desired innovation competencies, for performing targeted innovative works, as well as for taking part in desired workgroups as part of his/her self development plan. The user may then perform the various activities included in the self development plan, and also track the progress of completion of the self development plan.

Thus, IES 150 enables the users to develop their innovation competencies, perform innovative works (in tandem with competency development), collaborate with other users, and execute self development plans. IES 150 accordingly promotes/encourages the growth or development of user competencies and opportunities to practice innovation-conducive behaviors and techniques among the users, thereby enabling the users to be more (quantitatively and/or qualitatively) innovative as a group. In other words, IES 150 fosters, equips, and enables groups of users with the competencies and opportunities to produce innovation among the group of users.

The description is continued illustrating the manner in which steps of FIG. 2 are implemented in one embodiment. In particular, the manner in which IES 150 facilitates users to develop their innovation competency is first described below with examples, followed by the description of the other steps.

3. Developing Innovation Competency

Figure 3:
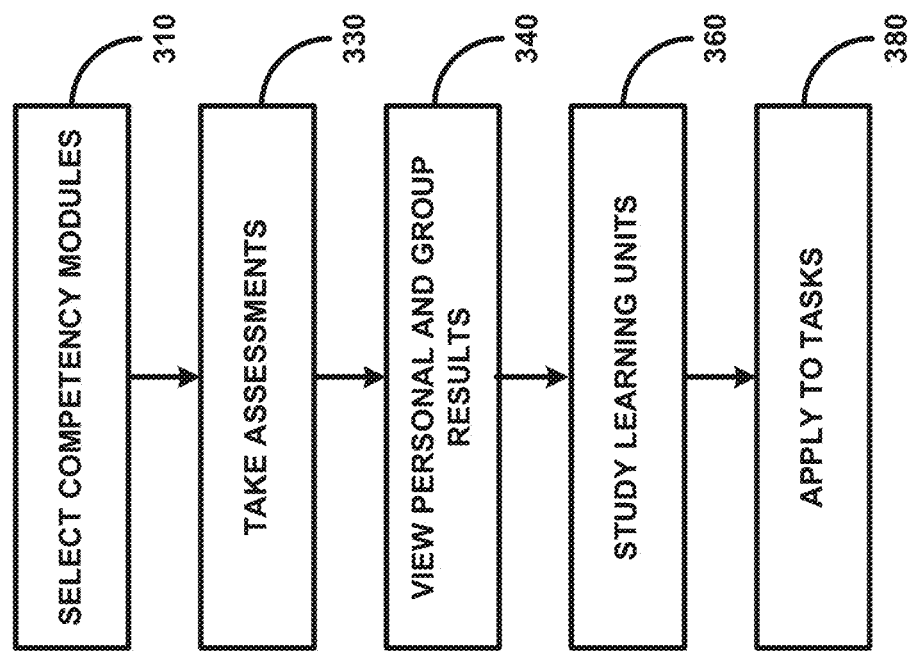
FIG. 3 is a flow chart illustrating the manner in which Innovation Enablement System (IES) 150 enables users to develop innovation competency in one embodiment.

FIG. 3 is a flow chart illustrating the manner in which IES 150 enables users to develop innovation competency in one embodiment. However, in alternative embodiments, some of the steps may be performed in a different sequence than that depicted below, as suited to the specific environment, as will be apparent to one skilled in the relevant arts.

In step 310, IES 150 provides a set of competency modules and enables users/administrators to select the desired competency modules from the provided set. Each competency module is designed to develop a specific aspect of innovation competency, such as the Basic of IES, Human Values, Innovative Thinking, Team Climate, Culture for Innovation, etc. A sample set of competency modules that may be provided by IES 150 is shown in Table 1, while a more detailed description, such as the core concepts on which the competency module is based on, the objectives of the competency module and an outline of the content (learning units) of the competency module is provided in Appendix A.

TABLE 1

Sample Competency Modules

| Competency Module Name | Brief Description |
| --- | --- |
| Basics of IES | Provides an introduction, overview and common language to the field of innovation with a unique emphasis on the role of human values and "wholistic" versatility |
| Human Values | Brings alive the deeper meaning and motivation for innovation based on the qualities of good character that are found in all culture throughout time. |
| Wisdom Learning | Strengthens the knowledge and insights needed to stimulate and inform innovative work |
| Innovative Thinking | Identifies a versatility of innovative strategies for defining challenges, focusing on key issues, generating solutions, and delivering results |
| Innovation Process | Guides individuals and teams in the art and discipline of innovating "from start to finish" |
| Team Climate | Aligns and attunes groups of people to work collaboratively and creatively together on innovative projects |
| Leaders of Innovation | Builds the character and insights for being role models and guides for innovative work |
| Culture for Innovation | Generates the sponsorship of innovation directly and through the systems, policies, and structures that support the innovation process |
| Delivering VCI | Certifies users to gain and demonstrate the competency to facilitate and train users in the resources available on the IES 150 system |

The selection of the specific competency modules to be used for developing innovation competency may be performed at different levels. For example, at a subscription level, an administrator of IES 150 may select the competency modules for each group of users, thereby limiting the competency modules that can be accessed by each of the users subscribed to the corresponding group. At a group level, a workgroup administrator may select the specific competency modules that are to be developed as a group (see step 540 below), and accordingly a user may be provided access to only those selected competency modules when collaborating with other users (step 270).

At a personal level, a user selects a specific competency module in which he/she wishes to develop innovation competency, in particular, to perform the below described steps of taking self assessment (330), viewing personal and group results (340), studying learning units (360) and applying to tasks (380), which together constitute the "learning methodology" of the innovation enablement system. The manner in which the user performs the steps of 330, 340, 360 and 370 for a selected competency module is described in detail below. However, it may be appreciated that the user may repeatedly perform similar steps for other competency modules as well, after selecting the desired competency module from a list of accessible competency modules provided by IES 150.

In step 330, IES 150 enables users to take assessments for the selected competency module. Each assessment is designed to assist a user to determine his/her "personal" orientation from a pre-defined set of orientations for the selected competency module. The personal orientation of the user may reflect the assessment of the individual's self (e.g., for the competency modules Human Values, Innovation Thinking, etc.) or the individual's view of a group, team or culture (e.g., for the competency modules Team Climate, Culture for Innovation, etc.).

It may be appreciated that the pre-defined set of orientations for a competency module may reflect the different views/approaches that users may take with respect to the objectives of the competency module. For example, the pre-defined set of orientations for the competency module Human Values includes the Intention orientation reflecting the intent of the user in adhering to human values, the Connection orientation reflecting the user's view towards co-operating with other users in view of human values, and the Action orientation reflecting the user's approach to doing actions related to human values. Each competency module may accordingly have a different pre-defined set of orientations. For example, the competency module Innovative Thinking has the orientations Visioning, Exploring, Modifying and Experimenting, different from those noted above for the competency module Human Values.

The assessments may be performed in any convenient manner. In one embodiment described below, the assessment for a competency module is performed by asking the user a series of questions. Each question has one or more pairs of options and a set of points in between each pair. The user is required to select a point between the two options that represents the degree to which the specific objectives of the competency module are relevant to the user when performing innovative work. The two options are related to two different orientations, and accordingly the selection of the in-between point reflects the user's leaning towards the different orientations. A quantitative measure (e.g., a number) of leaning of the user for each of the orientations for the competency module is computed (according to a logic), and the dominant orientation (having the larger quantity/number) is identified as the "personal" orientation of the user for the selected competency module.

An aspect of the present invention facilitates context-based assessments for the same competency module, wherein the user assesses his/her "personal" orientation in view of the context specified. For example, for the Human Values competency module, a context-based assessment may capture the user's views/approaches to human values when "Facing Stressful Situations" (in contrast to the general context of "Seeking Creative, Innovative Solutions"). It may be appreciated that the personal orientation of the user for a context based assessment may be different from the orientation determined for the general assessment noted above. Accordingly, such context based assessments may facilitate users to better understand their personal orientations for the selected competency module, and may result in better development of their innovation competency.

In step 340, IES 150 enables users to view their personal and group results for the selected competency module(s). The personal results may indicate the measure of each orientation and the personal/dominant orientation of the user for the selected competency module, while the group results may indicate the average measures and that dominant orientation of the group as a whole (irrespective of whether the group represents a workgroup or a subscription). The group results may also indicate the personal measures/orientations of each of the users of the group. The personal/group results may be presented in a graphical format, and include the results for multiple competency modules as well.

By viewing both personal and group results, a user is enabled to determine whether his/her personal orientation is in alignment with the group orientation, thereby facilitating the user to more effectively collaborate with the other users of the group for performing innovative work. For example, a user may determine the orientation to be improved based on the comparison of his/her personal orientation with the group orientation.

An aspect of the present invention facilitates users to view the results co-related between different groups, for example, between a subscription representing a business organization group and a workgroup representing a team within the organization. The users are accordingly enabled to better align themselves with the orientations of both their team and their organization in the process of generating innovation.

In step 360, IES 150 enables the user to study learning units for the selected competency modules. Various types of learning units, such as exercises, e-books, talks, seminars, workbooks, etc. in the form of text, audio, video, etc. may be provided to the user. The learning units for a competency module may be designed to improve the users' knowledge regarding the objectives of the competency module, to provide insights into and/or improve the different orientations for the competency module, etc. An outline of the content of the learning units that may be provided for different competency modules is shown in Appendix A.

IES 150 may maintain a set of learning units related to each competency module in a data store (such as 180A-180D). IES 150 then enables the users to access the various learning units for a desired competency module, recommend learning units to other users, keep track of the units already accessed, etc. The specific learning materials that may be made available to each user may be based on the assessments taken by the user in step 330. IES 150 also facilitates administrators to select specific learning units that are to accessible by users of each subscription and/or each workgroup, similar to the multi-level selection of competency modules noted above.

In step 380, IES 150 enables the users to understand how to apply (the learning done for the selected competency module) to specific work tasks. For example, the user may wish to understand how each of the personal orientations affect his/her handling of work tasks such as idea generation, leadership coaching, new product development, organizational change, problem solving, project management, marketing, sales, etc. An example overview of how different orientations (Visioning, Modifying, Exploring and Experimenting) of the Innovative Thinking competency module affect different work tasks is shown in Appendix B. IES 150 may similarly help the users to understand how the orientations of other competency modules affect the different work tasks, sought to be performed by the user.

In one embodiment described below, IES 150 provides toolkits designed to teach the users the manner in which the concepts of each competency module can be applied to each of the work tasks. IES 150 enables the users to access the various toolkits for a desired competency module, to recommend toolkits, keep track of accessed toolkits, etc., while also facilitating administrators to select specific toolkits accessible to users of each subscription and/or each workgroup.

In one embodiment, IES 150 provides a pre-defined/pre-configured set of activities designed to teach a user how to facilitate and train other users to develop, practice and apply competency in innovation-conducive behaviors and techniques. Upon successful completion of the required teaching activities, the IES 150 system recognizes that the user has qualified for certification, so as to deem the user to be a "facilitator-trainer." As such, a facilitator-trainer is provided the ability to perform the other steps of FIGS. 3, 4, and 5 as an administrator, with a certification of competency to then lead users through user activities. IES 150 offers a special set of resources for certified facilitator-trainers to utilize in selecting and leading user activities; those resources may include tutorials as well as generic templates of activities such as workshops, seminars, and presentations suited for various needs.

Thus, by enabling users to select desired competency modules and to perform the learning methodology (take assessments, view personal and group results, study learning units and apply to work tasks) for the selected competency modules, IES 150 develops innovation competency of the users of a group (individually as well as for the whole group). The users of the group may then perform innovative work according to their improved innovation competencies. The manner in which IES 150 enables users to perform innovative work is described below with examples.

4. Performing Innovative Work

Figure 4:
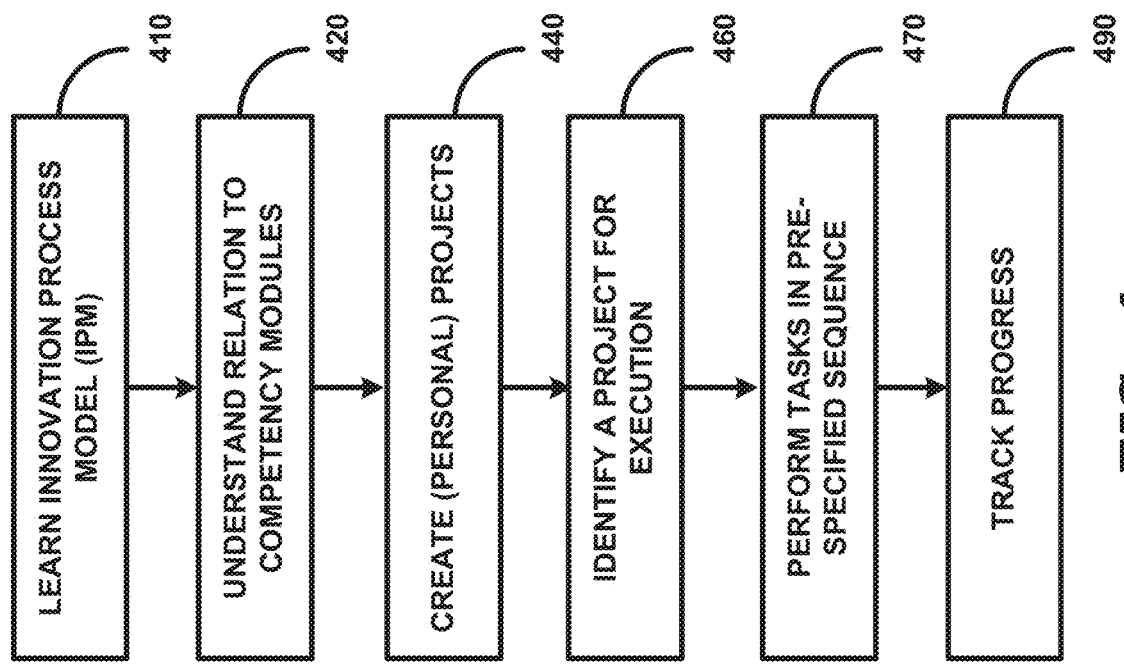
FIG. 4 is a flow chart illustrating the manner in which IES 150 enables users to perform innovative work in one embodiment.

FIG. 4 is a flow chart illustrating the manner in which IES 150 enables users to perform innovative work in one embodiment. However, in alternative embodiments, some of the tasks may be performed in a different sequence than that depicted below, as suited to the specific environment, as will be apparent to one skilled in the relevant arts.

In step 410, IES 150 enables users to learn the innovation process model (IPM) for performing innovative work. In one embodiment of the invention, the IPM consists of four stages with eight inter-related innovation process modules (two process modules per stage) that are to be performed in a pre-defined sequence. Each innovation process module (hereinafter referred to as a "task" of the IPM) has a set of questions, checkpoints, exercises that a user is required to finish before proceeding to the next task. IES 150 guides each user through the tasks of the IPM, thereby facilitating the user to better perform the desired innovative work. A brief description of the tasks of one embodiment of the IPM is shown in Table 2.

TABLE 2

Innovation Process Model (IPM)

| Stage | Task | Brief Description |
|---|---|---|
| Stage 1 CHALLENGE | Task 1 Establish a goal | Deciding what you want to accomplish |
| | Task 2 Assess the risks | Acknowledging the risks along your path |
| Stage 2 FOCUS | Task 3 Tap into character | Tapping into your source of confidence, values, experience |
| | Task 4 Analyze the issues | Identifying and prioritizing key issues to be resolved |
| Stage 3 SOLUTIONS | Task 5 Generate ideas | Generating a comprehensive set of creative ideas |

TABLE 2-continued

Innovation Process Model (IPM)

| Stage | Task | Brief Description |
|---|---|---|
| | Task 6 Develop and decide | Developing and deciding on the best solution to be implemented |
| Stage 4 COMPLETION | Task 7 Implement the solution | Implementing the solution |
| | Task 8 Celebrate the results | Celebrating what has been accomplished and learned along the way |

In one embodiment, IES 150 provides a competency module designed to teach users the concepts of the innovation process model. Users are accordingly enabled to learn the IPM as part of developing their innovation competency and then use the learned skills during the performance of the desired innovative work.

In step 420, IES 150 enables users to understand the relation of IPM to competency modules such as Human Values, Innovative Thinking, etc. Broadly, a user is enabled to understand the relation of each task of the IPM to the concepts of each of the competency modules. For example, IES 150 may indicate to the user that the relation between the second task "Assess the Risks" and the Human Values competency module may be viewed as asking the question "Which human values encourage you to step into uncertainty?" The user is accordingly able to understand the relation between the second task and the Human Values competency module.

IES 150 may also indicate to the user the manner in which each task/stage of the IPM is affected by each of the orientations for a competency module. For example, IES 150 may indicate for the first task "Establish a goal" that a user having a Connection orientation would be more inspired to set innovative goals that do no harm and are helpful to others. The manner in which each of the tasks/stages of IPM is affected by the different orientations (Intention, Connection and Action) of the Human Values competency module is shown in Appendix C, while the manner in which the same tasks/stages of the IPM is affected by the different orientations (Visioning, Modifying, Exploring and Experimenting) of the Innovative Thinking competency module is shown in Appendix D.

Thus, IES 150 enables users to develop their innovation competency in terms of different competency modules and then understand the relation between the competency modules and the innovation process model. The users can also understand the manner in which other users of the group will approach the tasks of IPM, based on their orientations. Such integration of training and practice of innovation may result in the fostering of innovation among the users (of a group).

In step 440, IES 150 enables users to create (personal) projects for performing innovative work. Each project represents the performance of the tasks of the IPM for achieving a specific innovative work or purpose such as to improve customer satisfaction, to reduce the number of product returns, to create a better work environment, etc. A user may create personal projects for performing his/her personal innovative work. Alternatively, as described below in step 550, an administrator of a workgroup may create a group project and then invite the user to become a member of the workgroup and to participate in the group project/innovative work.

In step 460, IES 150 enables users to identify a project for execution. The execution of a project may entail performing the tasks of the IPM as related to the specific innovative work or purpose for which the project was created. A user may identify one of his/her personal projects or a group project as the specific project to be executed. The user may identify the specific project based on the importance of the projects (identify the higher importance ones first), the deadlines associated with the projects (identify the earlier ones first), etc.

In step 470, IES 150 enables users to perform the tasks of the IPM in a pre-specified sequence specified for the identified project. In a scenario that the identified project is a personal project, the pre-specified sequence may be the same as the pre-defined sequence of tasks (e.g., Establish a goal, Assess the risks, etc.) forming the IPM, as shown in Table 2. IES 150 may accordingly enforce a strict order (from task 1 to task 8) in which users perform the eight tasks of the IPM of a personal project. For example, IES 150 may not allow a user to access a subsequent task unless the previous task is completed.

However, for a group project, the administrator of the workgroup may have specified a specific sequence to be followed for the identified (group) project. For example, the administrator may have specified that only some of the eight tasks of the IPM need to be performed, that a specific task is to be performed only after a certain criteria has matched with respect to the previous task, that a set of tasks may need to be repeated before proceeding to the next task, etc. IES 150 may accordingly enforce that the user performs only the tasks specified for the group project and in the pre-specified sequence (as defined by the administrator).

A user may accordingly select and perform each of the tasks of the IPM in the pre-specified sequence. Broadly, the performance of each task (except task 6) entails the user creating entries that represent the thoughts and insights of the user with respect to the innovative work sought to be done consistent with the objectives of the task. For example, for the first task "Establish the goal or purpose", the user may create entries related to the specific goals/purpose sought to be achieved by performance of the innovative work. The entries may be created as free-form texts entered by the user, as answers to specific questions provided by IES 150, or as the results of taking exercises provided by IES 150.

The user may then provide ratings (based on priority, meaning, etc.) for the entries, group the entries as corresponding themes, provide ratings for the themes, add insights to the entries, attach relevant documents, etc. and then come to a conclusion/outcome for the task based on the created entries/themes and associated information (such as the ratings, insights, documents, etc.). With respect to task 6 "Develop and decide", the performance entails selecting some of the entries created in task 5 "Generate ideas" and then rating the selected entries based on a criteria, thereby enabling the user to decide on the specific ideas to be developed further. IES 150 enables the users to select different types of criteria such as competency-module based criteria, business task/process based criteria, etc. for rating the selecting entries.

In step 490, IES 150 enables users to track the progress of performance of the innovative work, in particular, the performance of the tasks of the IPM in the pre-specific sequence for the identified project. By enabling users to track the progress of each project facilitates the users to re-evaluate the importance of the projects (for example, based on the completion status of the projects) and to identify other projects in step 460. A user may also identify other desired projects for execution in step 460 and perform the steps of 470 and 490 for the identified projects.

Thus, IES 150 enables users to perform innovative work (in the form of projects). It should be noted that users may, at any desired time instance during the performance of the innovative work, develop innovation competency by accessing the competency modules provided by IES 150. The users of a group may also collaborate with other users for developing their innovation competency and performing innovative work. The manner in which IES 150 enables users to do collaborative work is described below with examples.

5. Collaborating with Other Users

Figure 5:
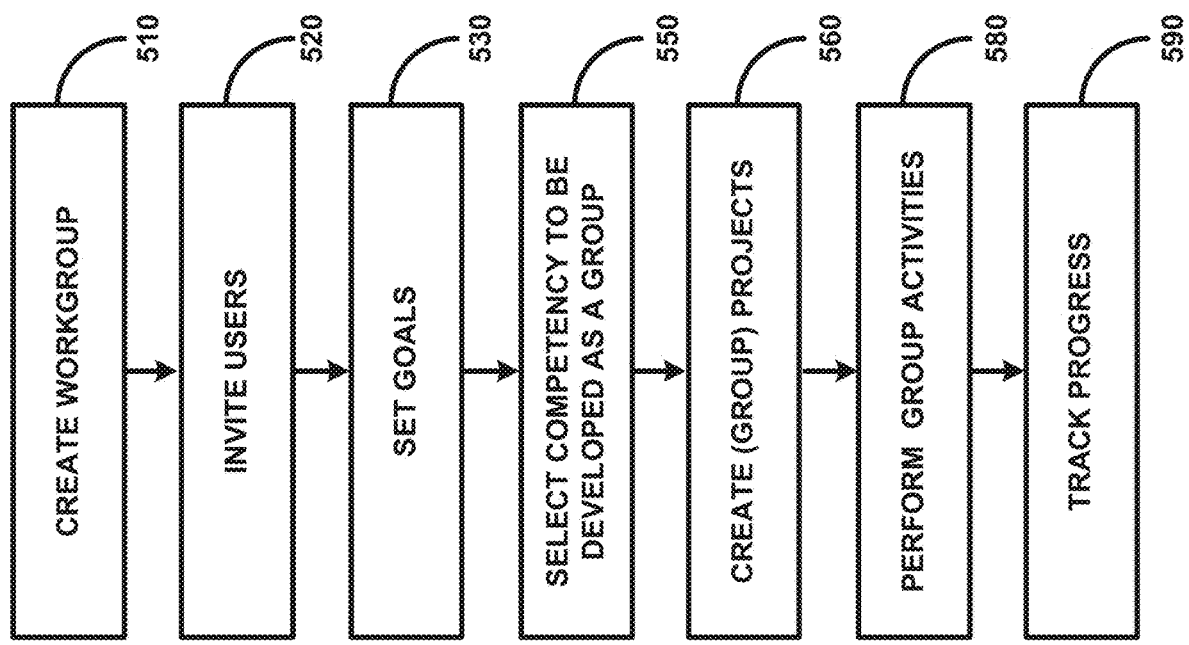
FIG. 5 is a flow chart illustrating the manner in which IES 150 facilitates users to collaborate with other users in one embodiment.

FIG. 5 is a flow chart illustrating the manner in which IES 150 facilitates users to collaborate with other users in one embodiment. However, in alternative embodiments, some of the steps may be performed in a different sequence than that depicted below, as suited to the specific environment, as will be apparent to one skilled in the relevant arts.

In step 510, IES 150 enables users to create workgroups in the system. As noted above, workgroups may be used to form teams of users within a business organization. However, IES 150 also enables users to form workgroup of users belonging to different business organizations and having different expertise level (e.g., domain specialists, non-specialists, etc.).

In the description herein, the user creating a workgroup is referred to as an administrator and that the administrator performs the other steps of FIG. 5. However, in alternative embodiments, the steps of FIG. 5 may be performed by different users having different roles (for example, a system administrator and a group owner), as will be apparent to one skilled in the relevant arts. IES 150 may also enable the administrator of a workgroup to specify the settings for the newly created workgroup such as the maximum number of members allowed, whether members are allowed to update the goals, to manage the activities of the group, download workgroup data, upload files, etc.

In step 520, IES 150 enables the administrator of the workgroup to invite users to join the workgroup. The invitations may be sent to the appropriate set of users such that the desired workgroup (e.g., a team within an organization, a cross functional team, a group across multiple organizations) is formed. The users who accept the invitations are referred to as members of the workgroup. IES 150 enables the individual users to manage the invitations, in particular, to view the invitations and to accept/decline the invitations.

In step 530, IES 150 enables the administrator of the workgroup to set goals for the group as a whole. The goals may be short-term goals or long-term goals, and the administrator may specify a time period within which the goals are to be achieved.

In step 550, IES 150 enables the administrator of the workgroup to select competency to be developed as a group. This may entail the administrator selecting the specific competency modules to be accessed by the group, the specific assessments to be taken by the members of the group, the specific learning units that are accessible to the members, the specific toolkits that are to be made available to the members, etc. The administrator may also specify a target date within which each of the competency modules needs to be completed by the members, and also target dates for completing the steps of taking assessments, studying learning units and studying toolkits for each of the selected competency modules.

In one embodiment, IES 150 assists administrators (including facilitator-trainers) in the selection of the competency modules, assessments, learning units and toolkits. IES 150 is accordingly designed to ask a pre-defined series of questions to the administrator, and then, based on the answers provide by an administrator, recommend/suggest a possible selection of learning units, toolkits, etc. that are identified to be most suitable. IES 150 may also ask further questions based on the answers, and then arrive at the possible selection based on the answers provided earlier and for the further questions. In such a scenario, IES 150 may be viewed as an "expert" system that assists an administrator in performing the various tasks noted above.

In step 560, IES 150 enables the administrator of the workgroup to create (group) projects. The created projects represent the innovative work to be performed (as a group) by the members of the workgroup. The administrator may specify various project settings for the created projects, such as whether members should provide inputs for all tasks, whether members can update the progress percentage for a task, etc. The administrator may also select which of the eight tasks of the IPM can be performed for a newly created project, and a corresponding target date within which each of the selected tasks needs to be completed.

In step 580, IES 150 enables members of the workgroup to perform the group activities created by the administrator of the workgroup. For example, IES 150 enables the members to take assessments, study learning units, accesses toolkits, for each of the competency modules selected in step 550, to add entries for each of tasks in each of the (group) projects created in step 560, etc.

In step 590, IES 150 enables the administrator of the workgroup to track progress of the various activities added in the previous steps, such as the number of members who have taken the assessments, completed study of the learning units, completed application of the toolkits, for each of the competency modules selected in step 550, the number of entries provided by the member for each of tasks in each of the (group) projects created in step 560, etc.

Thus, IES 150 enables users to collaborate with other users for developing innovation competency and performing innovative work. It may be appreciated that such collaboration among the users of the group may result in fostering innovation among the users of the group, thereby enabling the users to become more/better innovative as individuals as well as a group.

The manner in which IES 150 may enable a group of users to perform the steps of FIGS. 2, 3, 4 and 5 and accordingly foster innovation among the group is described below with examples.

6. Illustrative Example

FIGS. 6A-6E, 7A-7I, 8A-8H, 9A-9D, 10A-10E, 11A-11H, 12A-12J, 13A-13C, 14A-14G, 15A-15J1, and 16A-16C together illustrate the manner in which IES 150 fosters innovation among a group of users in one embodiment. Each of the Figures is described in detail below.

Broadly, users use some of user systems (e.g., 120A-120X) to send requests for performing the steps of FIGS. 2, 3, 4 and 5 to IES 150. In response, IES 150 displays the appropriate user interfaces (described below) on a display unit associated with the requesting user system, thereby enabling the user to interact (provide input data in a form displayed, view the result of performance of requested tasks, click on links/buttons to send requests for new/related user interfaces, etc.) with IES 150.

In one embodiment, each user interface is provided as a corresponding web page that can be viewed using a web browser such as Internet Explorer 8.0 available from Microsoft Corporation. As is well know, a web page may contain textual data in the form of normal text, hypertext markup language (HTML), extensible markup language (XML), JavaScript instructions, etc, and non-textual data such as images, videos, audios, etc. Accordingly, a user can use any system (such as user systems 120A-120X, server systems 180A-180F) that has a web browser to perform the steps of FIGS. 2, 3, 4 and 5.

Figure 6A:
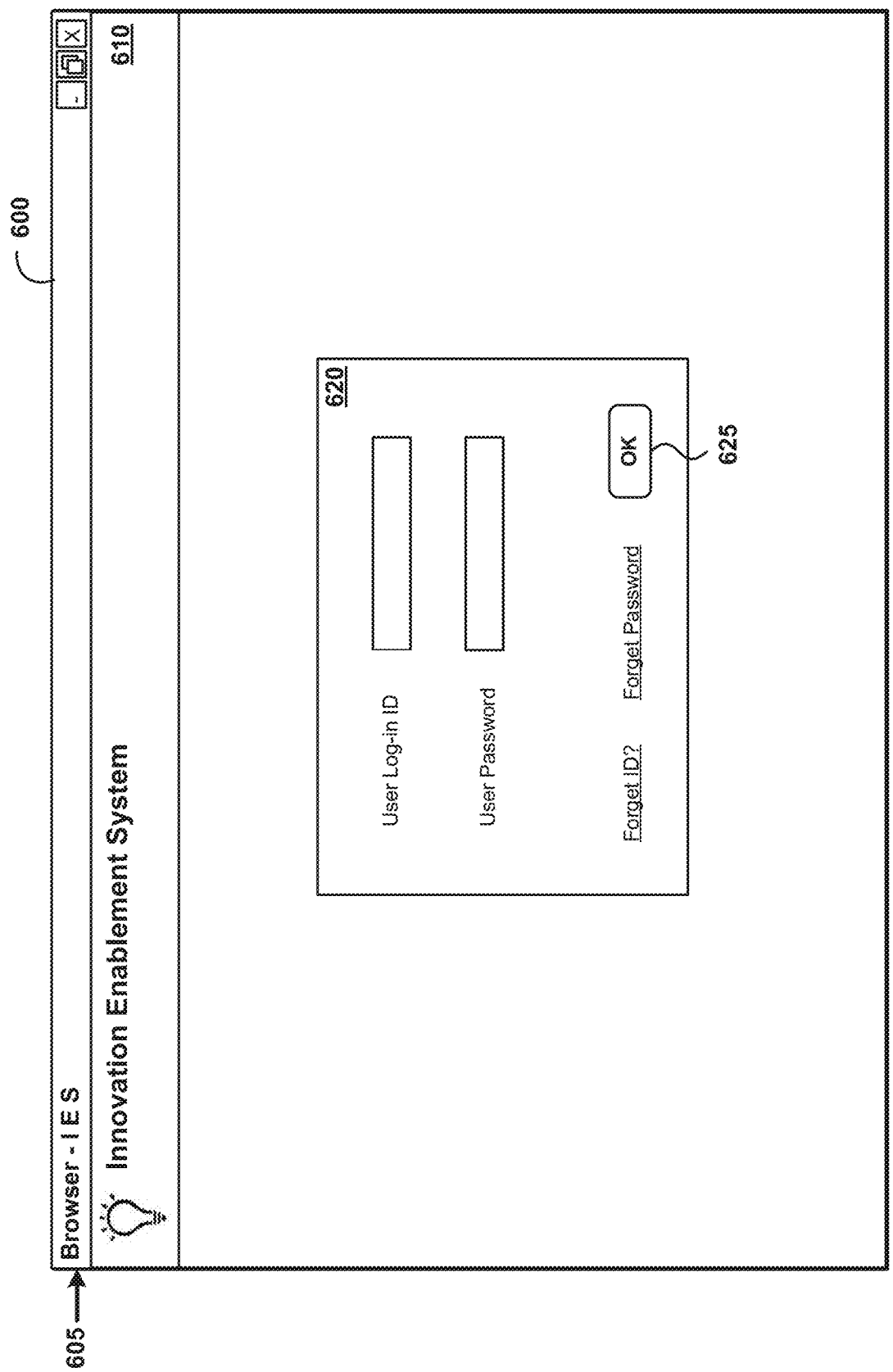
FIG. 6A depicts the manner in which IES 150 enables users to provide authentication in one embodiment.

FIG. 6A depicts the manner in which IES 150 enables users to provide authentication in one embodiment. Display area 600 depicts a portion of a user interface displayed in response to receiving a request for accessing IES 150. Text 605 indicates that the user interface is being displayed by a web browser, while display area 610 indicates that the displayed interface is part of an Innovation Enablement System. Display area 620 enables a user to provide his/her authentication information such as log-in ID and password and to send the provided information to IES 150 (by clicking button 625).

7. User Interfaces for Managing Subscriptions

FIGS. 6B-6E together depicts the manner in which IES 150 enables users to manage subscription in one embodiment. Each of the Figures is described in detail below.

FIG. 6B depicts the manner in which IES 150 enables a user to access subscriptions in one embodiment. Display area 630 depicts a portion of a user interface displayed by IES 150 in response to determining that the user provided authentication information (in display area 620 of FIG. 6A) is valid. IES 150 may perform the validation by checking whether the user provided log-in ID and password is present in the user login data maintained internally or on external systems (such as data stores 180A-180D). IES 150 may then provide the user interface of display area 630 if the information is present and another interface (not shown) indicating failure of logging into the system otherwise.

Display area 640 indicates the name "John Smith" of the authenticated user (hereafter referred to as "the User"), as well as provides links that enable the User to change his/her personal settings (e.g., the colors/themes in which the display elements such as text, links, buttons, etc. are to be displayed, the password to be provided during authentication, etc.), and also to log out of the system.

Display area 650 contains tabs corresponding to activities that may be performed in the innovation enablement system. A user may select the desired activity to be performed by clicking the corresponding tab. Display area 650 indicates that the User has selected the "Subscription Home" tab (shown in bold) for performing the activity of managing subscriptions. Display area 660 contains tabs corresponding to the specific activities that may be performed as part of managing subscriptions. Display area 660 indicates that the User has selected "Subscriptions" tab for viewing his/her subscriptions.

Display area 670 displays the subscriptions that user is subscribed to, that is, the groups in which the user is a member. The subscriptions are displayed in a tabular form, with column "Subscription Name" specifying the name of the subscription, and column "Subscription Type" specifying the type of the subscription (whether the subscription is for an organization, individual, etc.). Other columns specify additional information related to the subscription such as the last activity performed by the User, the expiration date, etc. It may be observed that display area 670 indicates that the User is part of two different organization groups (a company "ABC Company" and a society "IEEE Engineering"), and also has a subscription for individuals ("Trial Subscription").

Display area 690 is shown containing various buttons that a user may select to perform the corresponding activities. For example, the User may select button "Messages" for sending and receiving messages from other users present in the system, button "Notepad" for writing notes to keep track of important facts, button "Activities" for quickly seeing what the user's most recent activities in the system and button "Active Groups" to view active workgroups for the user. IES 150 may provide additional user interfaces to the user for performing the corresponding activities in response to selection of the buttons. Such user interfaces may be provided in a known way and are not shown and/or described here for conciseness.

It may be appreciated that the buttons shown in display area 690 may be context sensitive, that is, different sets of buttons may be displayed based on the specific user interface accessed/currently viewed by the user. For example, a "Download Reports" button, an "Instant Coaching" button, etc. may be displayed when the user accesses/views the interfaces related to project workspace (e.g. FIG. 11A). Similarly, another set of buttons may be displayed in display area 690 when the user accesses the interfaces related to workgroup (e.g. FIG. 14D). In one embodiment, users are enabled to access both the default set of buttons (described above) and the context sensitive set of buttons in display area 690 (by selecting appropriate tabs provided in display area 690).

Button 695 (labeled "Help Menu") may be selected by the user to view the help information associated with the corresponding activity sought to be performed. The help menu may include general options such as "Quick overview of the system", "Take a tour of the system", or activity specific options such as "Take a tour of {Activity}", "Welcome to {Activity}", "Download 2 Page Overview" (of activity), "Helpful hints to get started" (the activity), "{Activity} FAQs", etc. where {Activity}corresponds to one of Development Plan, Competency Modules, Project Workspace and Workgroups.

FIG. 6C depicts the manner in which IES 150 enables users to view the activities performed for subscription in one embodiment. Display area 675 depicts a portion of a user interface displayed by IES 150 in response to the User selecting an "Activity Report" link (corresponding to the "IEEE Engineering" subscription) shown in display area 670. Display area 675 indicates the date of performing the last activities and also the specific activity performed by the User for each of development plan, projects, workgroups and the competency modules. Display area 675 also displays the detail of the activities performed by the User for each competency module, such as whether assessments for the competency module has been taken by the User, the number of learning units accessed, etc.

Figure 6D:
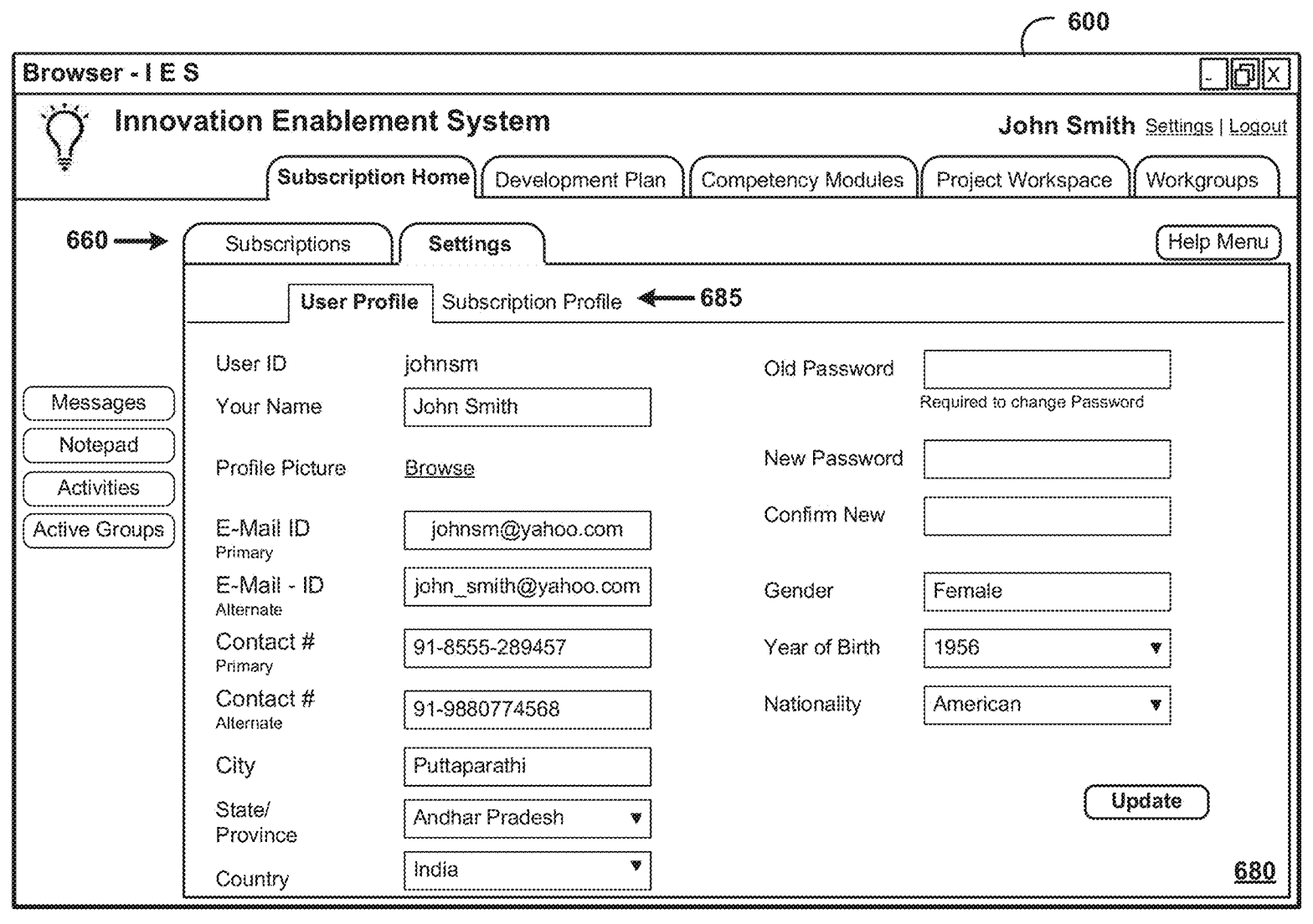
Figure 6E:

It may be observed that some of the display portions of FIGS. 6C-6E are similar to those shown in FIG. 6B. It is noted that for such similar display portions, also in the other Figures described below, the description of a display portion is provided only once when the display portion is referenced and is not repeated again for conciseness.

FIGS. 6D and 6E respectively depicts the manner in which IES 150 enables users to create individual and subscription specific profiles in one embodiment. Display areas 680 and 690 respectively depict portions of user interfaces that may be displayed by IES 150 in response to the User selecting "Settings" tab in display area 660 for viewing/modifying his/her individual and/or subscription profiles. Display area 680 (displayed when user further selects "User Profile" tab in display area 685) enables the User to view/ modify the details of his/her individual profile. Display area 690 (displayed when user further selects "Subscription Profile" tab in display area 685) enables the User to view/modify his/her subscription profile. Display area 690 is shown as displaying the profile for "IEEE Engineering" subscription.

It may be appreciated that some of the information provided in FIGS. 6D and 6E such as the industry type, business type, job title, job function, etc. may be used to identify the specific learning units and/or tool kits to be provided to the user. The other information may be used for generating demographic, cultural, technological trends for the users of the Innovation Enablement System.

Referring back to FIG. 6B, the User may select one of the subscriptions listed in display area 670 (by selecting the corresponding radio button shown along with the subscription name) and then click on the various tabs provided in display area 650 to perform the corresponding activity for that subscription. For example, the User may select "ABC Company" subscription and then select "Workgroups" tab in display area 650 to access the workgroups related to that subscription.

The description is continued assuming that the User first selected "IEEE Engineering" subscription (as indicated by the selected radio button) and then selected the various other tabs in display area 650. The user interfaces provided by IES 150 for enabling users to develop innovation competency related to the selected subscription "IEEE Engineering" is described below with examples.

8. User Interfaces for Developing Innovation Competency

FIGS. 7A-7I, 8A-8H, and 9A-9D together depicts the manner in which IES 150 enables users to develop innovation competency in one embodiment. Each of the Figures is described in detail below.

Figure 7A:
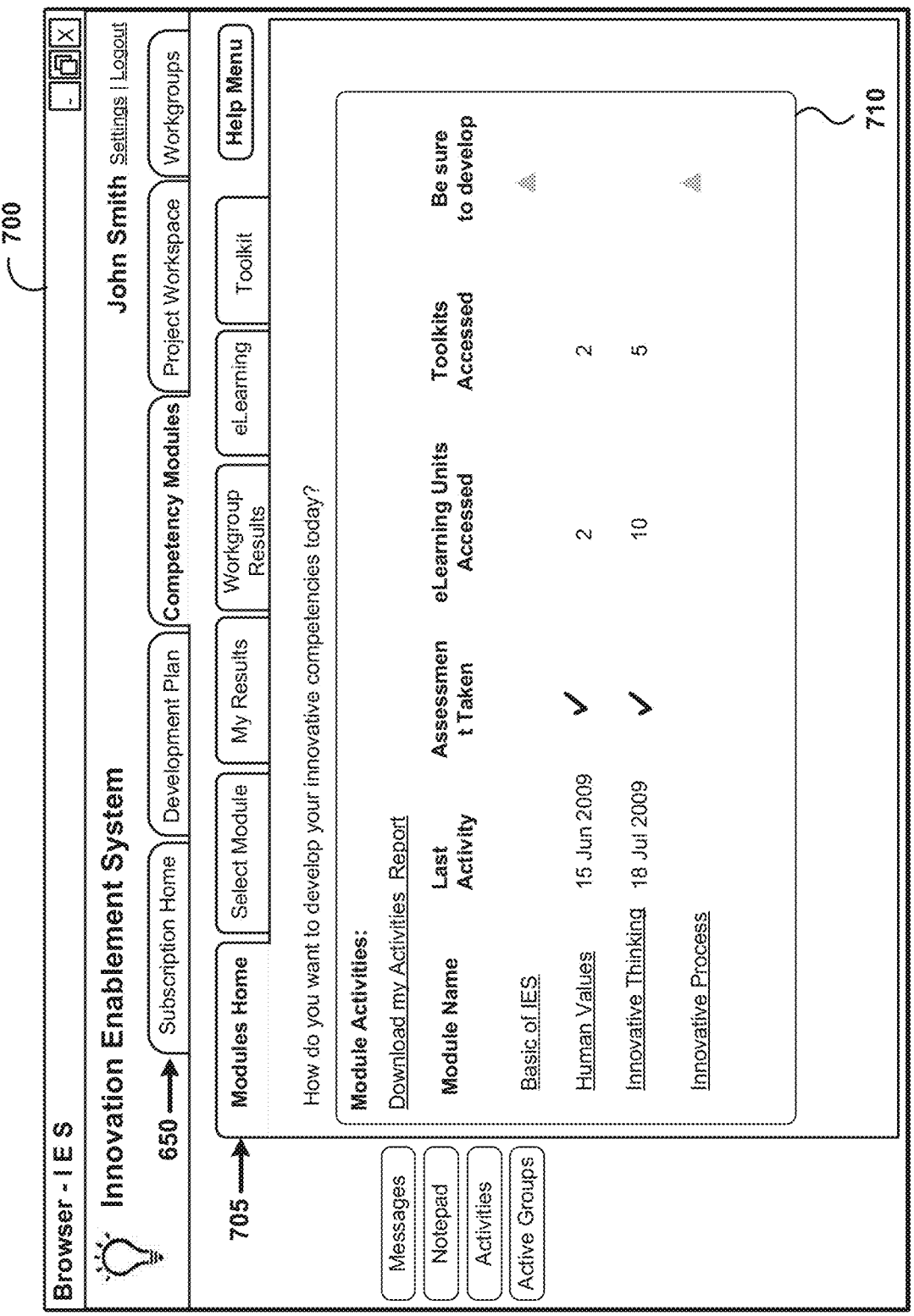
FIG. 7A depicts the manner in which IES 150 enables users to access competency modules in one embodiment.

FIG. 7A depicts the manner in which IES 150 enables users to access competency modules in one embodiment. Display area 700 depicts a portion of a user interface displayed by IES 150 in response to a user clicking the "Competency Modules" tab in display area 650 (after selecting the "IEEE Engineering" subscription in FIG. 6B) to develop innovation competency related to that subscription.

Display area 705 contains tabs corresponding to the specific activities that may be performed for developing innovation competency. A user may select the desired activity to be performed by clicking the corresponding tab. Display area 705 indicates that the User has selected the "Modules Home" tab (shown in bold) for performing the activity of viewing the overall progress of developing innovation competency.

Display area 710 displays the list of competency modules accessible by the User and the current status of the User with respect to the learning methodology for each of the competency modules. In particular, IES 150 provides to the user for each competency module (represented as a corresponding row in display area 710), the competency module name, the date of last activity in that competency module, whether the corresponding assessments for the competency module has been taken by the user, the number of module specific learning units accessed/studied, and the number of toolkits accessed/applied (shown in corresponding columns in display area 710). The triangular marker in the column "Be sure to develop" of some of the rows serves as a reminder to the user that the corresponding competency modules have not been accessed by the user.

Display area 710 also contains a link for downloading an activities report containing more comprehensive details of all the activities performed by the user. A user may also click on the desired one of the competency module names (provided as links) to select the competency module in which competency is sought to be developed. Alternatively, the user may select the "Select Module" tab in display area 705 for selecting the specific competency module. The description is continued assuming that user has selected to develop innovation competency in the Human Values competency module.

Figure 7B:
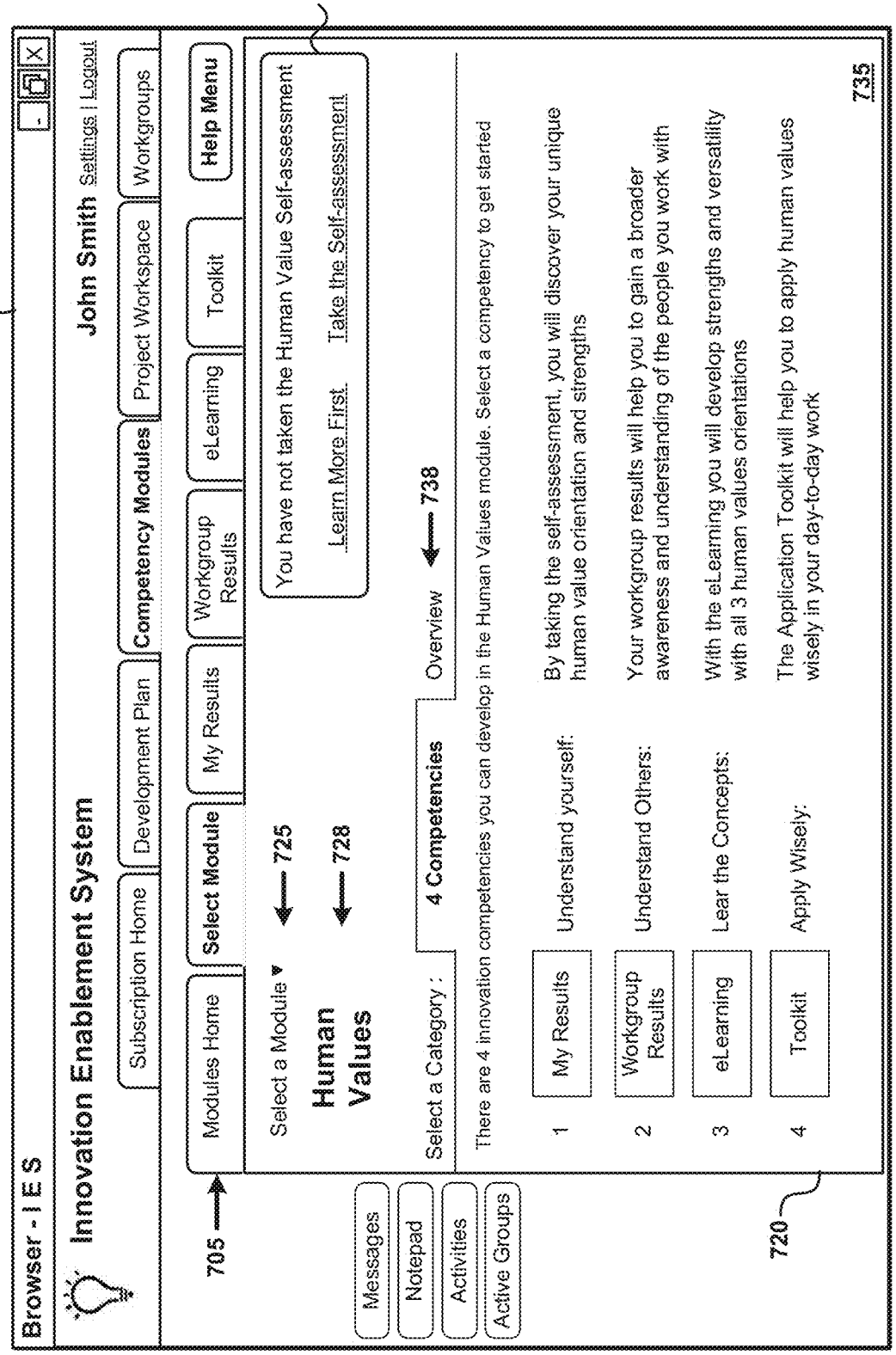
FIG. 7B depicts the manner in which IES 150 enables users to select a competency module in one embodiment.

FIG. 7B depicts the manner in which IES 150 enables users to select a competency module in one embodiment. Display area 720 depicts a portion of a user interface displayed by IES 150 in response to the User clicking on the "Human Values" link in display area 710 of FIG. 7A for selecting to develop competency in the Human Values competency module. Alternatively, display area 720 may be displayed when the User selects the "Select Module" tab in display area 705. The user may then use select field 725 to select the specific competency module (Human Values as indicated by text 728). Display area 730 (referred to as the 'personal dashboard' of the User) indicates that the assessment for the selected Human Values competency module has not been taken by the user and provides a link "Take the Self-assessment" for accessing the assessment.

Display area 735 depicts a portion of a user interfaces that may be displayed by IES 150 in response to the user further selecting "4 Competencies" tab in display area 738. Display area 735 enables the User to learn about the 4 steps of the learning methodology provided for each competency module, that is the steps of taking the self-assessment and viewing personal results, viewing group results, studying learning units and applying the learning to work tasks (by accessing and studying toolkits). Display area 735 may display an overview of the selected competency module (which may include the information shown in Appendix A) on a user selecting the "Overview" tab in display area 738. The user may then take the assessment for the selected competency module as described below with examples.

9. Taking Assessments

Figure 7C:
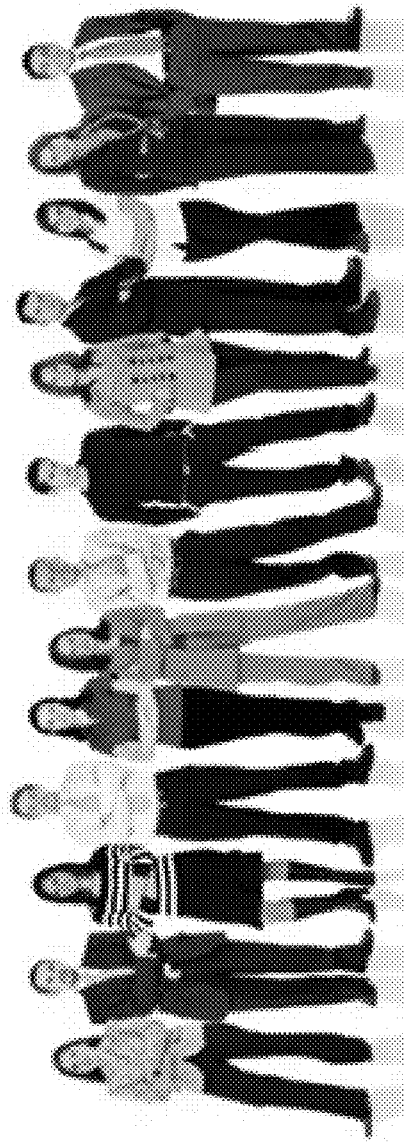

FIGS. 7C-7E together illustrates the manner in which IES 150 enables users to take assessments for a selected competency module in one embodiment. Referring to FIG. 7C, display area 740 depicts a portion of a user interface displayed by IES 150 in response to the User clicking on the "Take the Self-assessment" link in display area 730 of FIG. 7B for taking the assessment for the Human Values competency module. In one embodiment, the user interfaces for assessment (such as display areas 740, 745, and 750) are provided as a pop-up window overlaying the interface shown in FIG. 7B. The pop-up window may be created by a web browser in response to instructions embedded in the web page sent by IES 150, as is well known in the arts.

Display area 740 is shown displaying a single slide (from a set of slides) provided to the user as an introduction to the assessment. The set of slides may be played automatically after a pre-configured delay between the slides. Alternatively, a user may be provided with buttons/links for manually accessing the previous slide, the next slide, a specific slide from the set, etc.

Referring to FIG. 7D, display area 745 depicts a portion of a user interface displayed by IES 150 after the introduction to the assessment has been displayed to the user in display area 740 of FIG. 7C. Display area 745 provides the instructions for taking the self assessment for Human Values competency module (and in general, for the competency module selected by the User). Text 747 "Seeking Creative, Innovative Solutions" indicates the specific context for which the assessment is being performed. The text here indicates that this is the general context, in contrast to the specific context described below, where the context has a "Special:" prefix. A user may click button 749 "Take Assessment" after reading the instructions provided in display area 745.

Referring to FIG. 7E, display area 750 depicts a portion of a user interface displayed by IES 150 in response to a user clicking on button 749 of FIG. 7D. Display area 750 displays the details of a question provided to the user. The question is shown having three pairs of options 752-754, with each pair of options having a set of points in between. The user is required to select a point between the two options that represents the degree to which the specific objectives of the Human Values competency module are relevant to the user when performing innovative work (as also indicated by the instructions shown in display 745). A user may click on the "Next" or "Prev" buttons to access respectively the next or the previous question in the assessment. Display area 758 indicates the progress of the User as the question being the third in a set of ten questions. IES 150 then computes the orientations for the selected Human Values competency module after the User has answered all the questions in the assessment.

As noted above, IES 150 facilitates context-based assessments for the same competency module. IES 150 may accordingly display the specific context to the users and require the users to answer the same set of questions (provided in the general context and as shown in display a 750) in view of the specific context. Alternatively, IES 150 may provide instructions and a set of questions different from that shown in display areas 745 and 750 as described in detail below.

FIGS. 7F and 7G together illustrate the manner in which context based assessments are performed in one embodiment. Referring to FIG. 7F, display area 760 depicts a portion of a user interface displayed by IES 150 after the introduction to the assessment has been displayed to the user in display area 740 of FIG. 7C. Display area 760 may be displayed instead of display area 745, based on whether a user is designated to take the assessment for the general context (745) or the specific context (760). The specific assessment to be taken by the user may be configured by an administrator of the system. Text 762 indicates the specific context "Facing Stressful Situations" for which the user's views/approaches to human values is to be assessed.

Referring to FIG. 7G, display area 765 of FIG. 7G depicts a portion of a user interface displayed by IES 150 in response to a user clicking on button 763 of FIG. 7F. Display area 765 depicts a question and three pairs of options (767-769). As specified in the instructions shown in display area 760, a user is required to divide 4 points between the options in each pair. It may be appreciated that such a valuation by the user may be different from providing 6 points between the two options and asking the user to select one of the in-between points. The manner in which the orientations are computed for the general context is described below with examples.

10. Computing Orientations

Figure 7H:
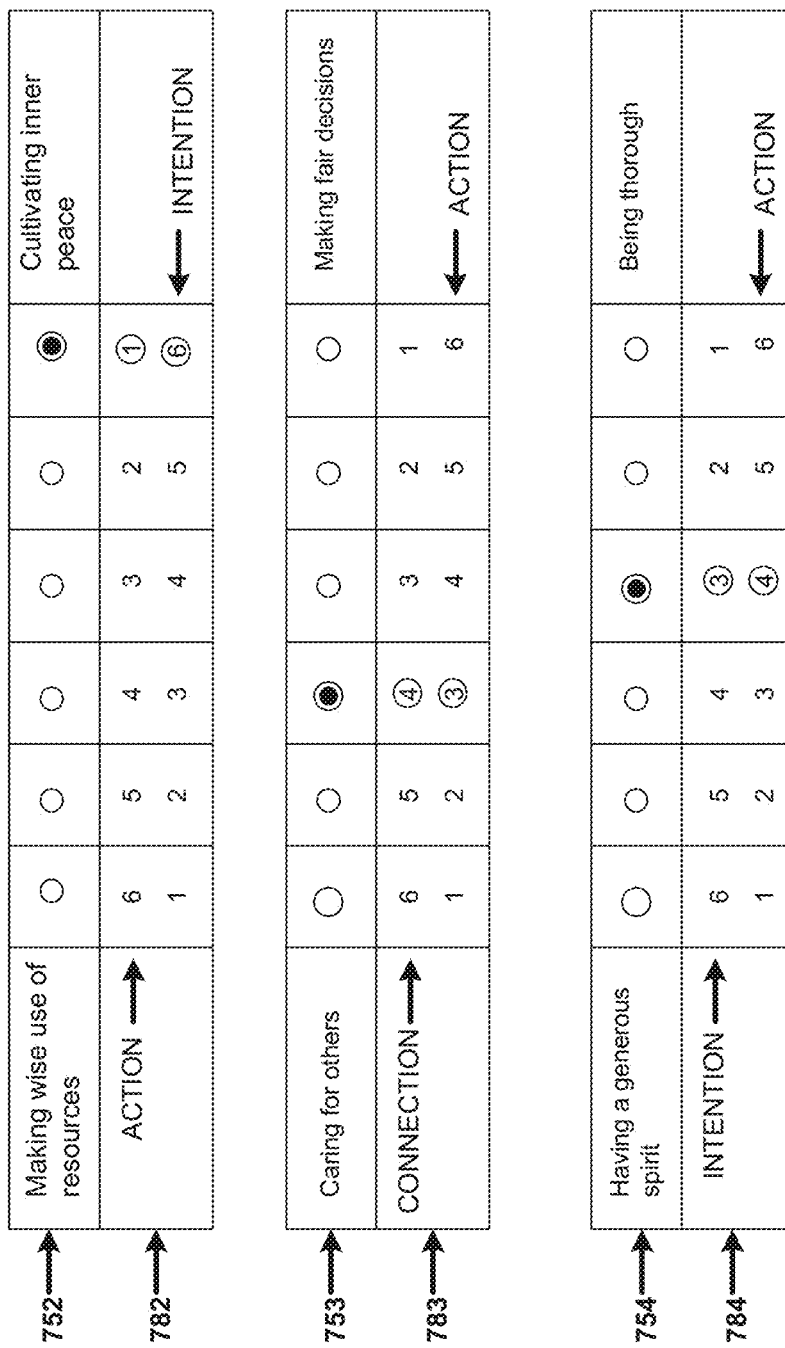
FIG. 7H depicts the manner in which IES 150 computes the orientations of a user for a competency module in one embodiment.

FIG. 7H depicts the manner in which IES 150 computes the orientations of a user for a competency module in one embodiment. The computation is performed based on the answers provided by the user for an assessment related to the competency module. The computation performed for a single question (as shown in display area 750) is described in detail below.

Broadly, the two options in each pair of options (e.g., row 752) are associated with two different orientations (action and intention), with each in-between point being associated with a corresponding value (1 to 6) for the different orientations (as indicated by row 782). The values for the different orientations for the pair are determined based on the in-between point selected by the user. Thus, for the user selection of the third in-between point from the left, the values of action and intention orientations are respectively determined to be 4 and 3. The different orientations associated with the other pairs of options (in rows 783 and 784) and the specific values for each orientation may be similarly determined (as shown respectively in rows 783 and 784). The specific values for each of the orientations in rows 782-784 is shown circled. For example, in row 784, the circles indicate that intention has a value of 3 and action has a value of 4 for the par of options shown in 754.

IES 150 may then compute the aggregate value for an orientation as the sum of the orientation values for all the pair of options in the assessment. For example, for the answers selected by the User for the question shown in display area 750, IES 150 may compute the aggregate values as 8 for Action, 9 for Intention and 4 for Connection (based on the values shown circled). Similarly, IES 150 may compute the aggregate orientation values for all the questions.

With respect to context based question shown in FIG. 7G, the two options in each pair (e.g. row 767) are associated with two different orientations. The values (out of 4) specified by the user for the options is taken to be scores for the orientations associated with the options. Accordingly, IES 150 may then compute the aggregate orientation values as the sum of the user specified values for the orientations for all the questions. IES 150 may then display the individual values for each orientation and a dominant orientation of the user as part of his/her personal results as described in detail below.

FIG. 7I depicts the manner in which IES 150 enables users to view their personal orientations for a selected competency module in one embodiment. Display area 720 of FIG. 7B is shown updated (in the form of a personal dashboard 730) to indicate the scores of the User for the assessment taken for Human Values competency module. IES 150 may perform the update in response to the User answering all the questions in the assessment, and after computing the orientation scores for the User (as described above).

Personal dashboard 730 indicates that the dominant orientation of the User is "Intention Action", indicating that the User has obtained considerably larger scores for both the orientations and accordingly there is no single orientation which is dominant. The strong orientation "Intention" (having the largest value) of the User is indicated by a filled circle, while the moderate orientation "Action" (having the second largest value) of the User is indicated by an unfilled circle. It should be noted that for some users, the score in one orientation may be considerably larger than the values computed for the other orientations, and accordingly only the orientation with the largest value may be determined to be the dominant orientation.

It may be appreciated that IES 150 may provide multiple assessments for the same competency module (with the same context, but different sets of questions). IES 150 may accordingly provided user interfaces (not shown) which enable users to take the different assessments for the same competency module and/or even the same assessment multiple times. IES 150 may also provide options to the users for selecting a specific assessment score to be displayed in personal dashboard 730. The User may then select the appropriate tabs in display area 705 to view the personal and workgroup results as described below with examples.

10. Viewing Personal Results

Figure 8A:
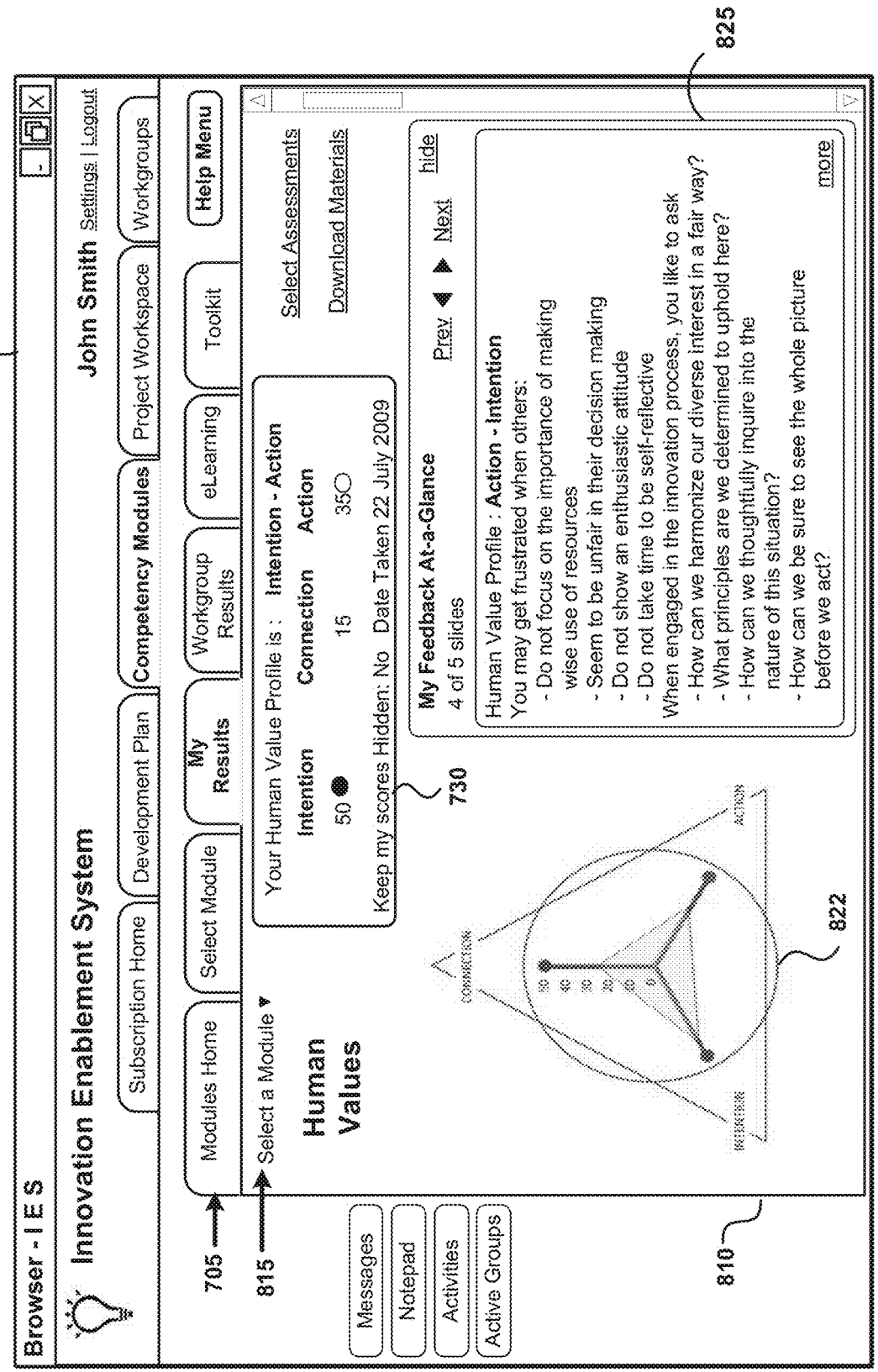
Figure 8B:
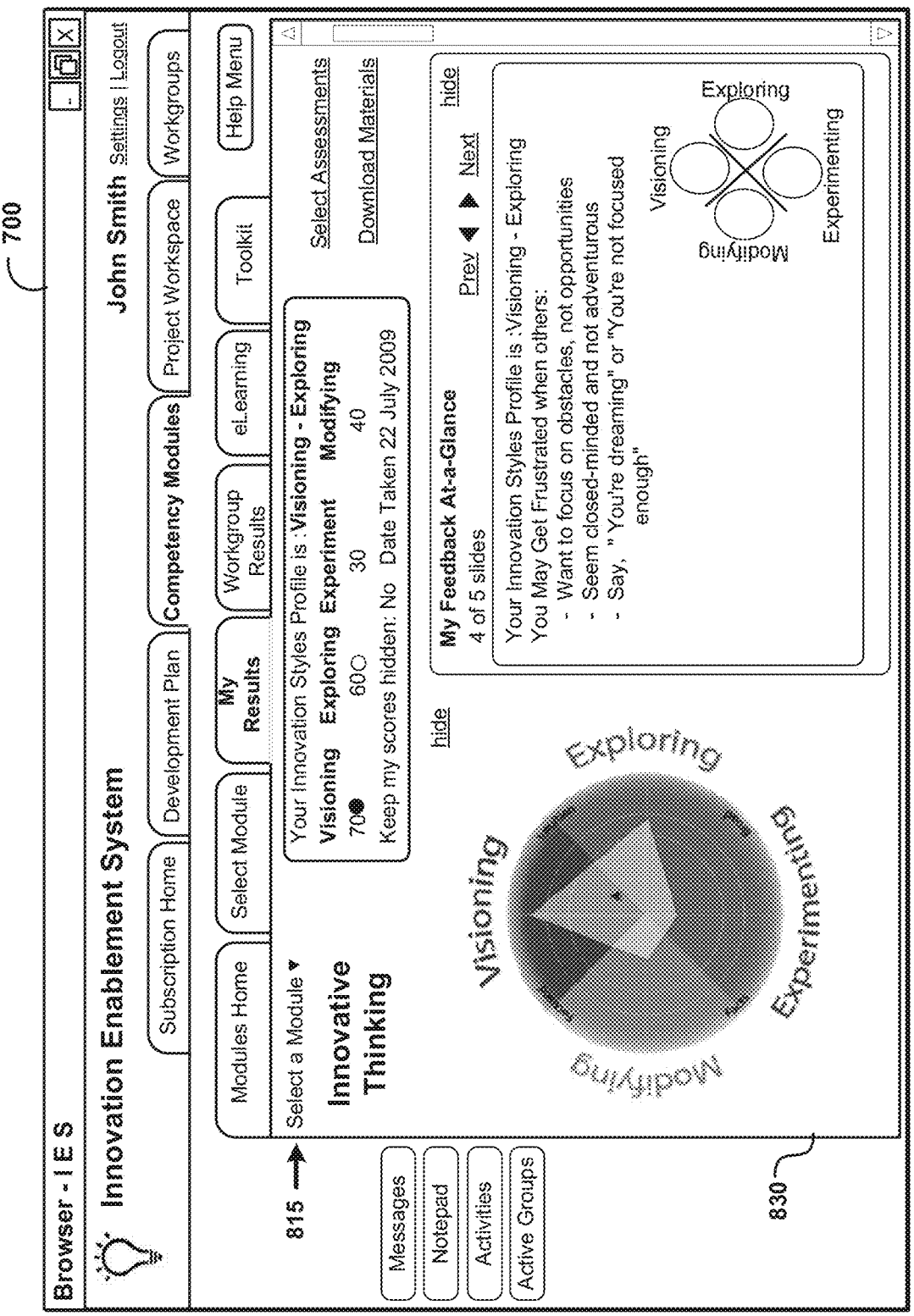

FIGS. 8A-8A1 and 8B-8B1 together illustrate the manner in which IES 150 enables users to view their personal results for different competency modules in one embodiment. Each of the Figures is described in detail below.

The description is continued assuming that a user has taken the assessment for the selected competency modules, and that some of the other users in a selected workgroup have also taken their assessments. However, the Figures may be appropriately modified to display warning/information messages to the user, in the scenario that the assessments for the selected competency module has not yet been taken by the user/group, as will be apparent to one skilled in the relevant arts by reading the disclosure herein.

Referring to FIGS. 8A and 8A1, display area 810 of FIG. 8A depicts a portion of a user interface displayed by IES 150 in response to the User selecting the "My Results" tab in display area 705 (after taking the assessment for the selected competency module). Display area 810 of FIG. 8A1 may be displayed when the user scrolls down the display area using the scrollbar shown there.

Display area 810 indicates the Human Values competency module selected by the User, and the corresponding personal dashboard showing the scores of the User for the selected competency module. Display area 810 is shown having the link "Select Assessments" for selecting the assessments to be viewed, and link "Download Materials" for downloading information such as the results of the assessment, an interpretation of the results, etc. Select field 815 enables a user to select and view the personal results for an assessment taken for another competency module.

Display area 822 shows the scores of the user in a graphical manner. Though the scores are shown as a kite diagram, in alternative embodiments, the scores may be displayed in any convenient graphical representation such as a bar graph, pie chart, pyramid chart, etc. Furthermore, different types of graphical representations may be used for displaying the scores for different competency modules. Display area 825 provides feedback on the dominant orientation computed for the user. The feedback is provided in the form of a set of slides that describes how the user may approach specific situations, such as performing innovative work, etc.

Display area 828 in FIG. 8A1 shows the human values that tend to be in the background of the User's mind when innovating. The specific human values shown there are determined by IES 150 based on the answers selected by the user in the assessments taken for the Human Values competency module. A user may select the tab "Foreground" shown at the bottom of display area 828 to view the details of the human values that tend to be in foreground of the User's mind when performing innovative work.

Thus, IES 150 enables a user to view his/her personal results for the selected competency module "Human Values". The user may similarly select another competency module (e.g., Innovation Thinking), take a self assessment for the selected competency module and then view the personal results of the assessment, as described below.

Referring to FIGS. 8B and 8B 1, display area 830 of FIG. 8B depicts a portion of a user interface displayed by IES 150 in response to the User selecting the "My Results" tab in display area 705 (after taking the assessment for the selected competency module) and then selecting competency module "Innovation Thinking" using select field 815. Display area 830 of FIG. 8B 1 may be displayed when the user scrolls down the display area using the scrollbar shown there.

Display area 830 shows the personal results of the User for the competency module Innovative Thinking. In particular, display area 835 in FIG. 8B1 depicts the manner in which users having different orientations of Innovative Thinking approach various tasks/react to specific situations. For example, display area 835 indicates that the stimulus for innovative thinking for users having Visioning and Exploring orientations is intuition, insights and images, in contrast to the facts, details and analysis for the other orientations. A user is accordingly able to get more insights into his personal preferences/approaches.

It may be observed that the orientations and accordingly the feedback for the competency module Innovation Thinking are different from that provided for the competency module Human Values. The dominant orientation and the specific orientation scores for the Innovation Thinking competency module may be computed similarly to the computed noted above for Human Values competency module, and may be based on an assessment provided similar to the assessment user interfaces (FIGS. 7D-7E) shown for the Human Values competency module. The description below continued illustrating the manner in which IES 150 enables users to view workgroup results.

11. Viewing Group Results

Figure 8C:
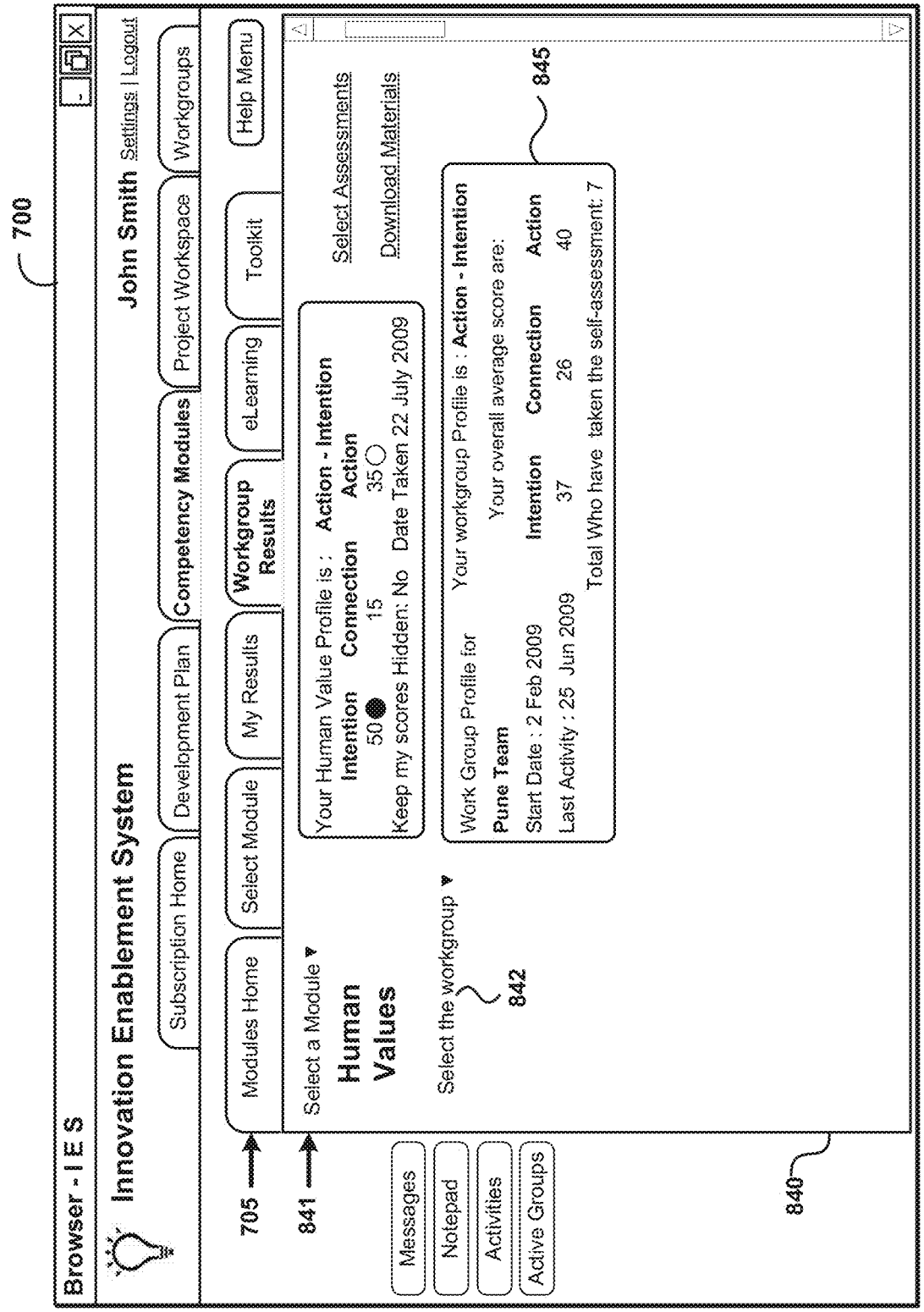
Figure 8D:
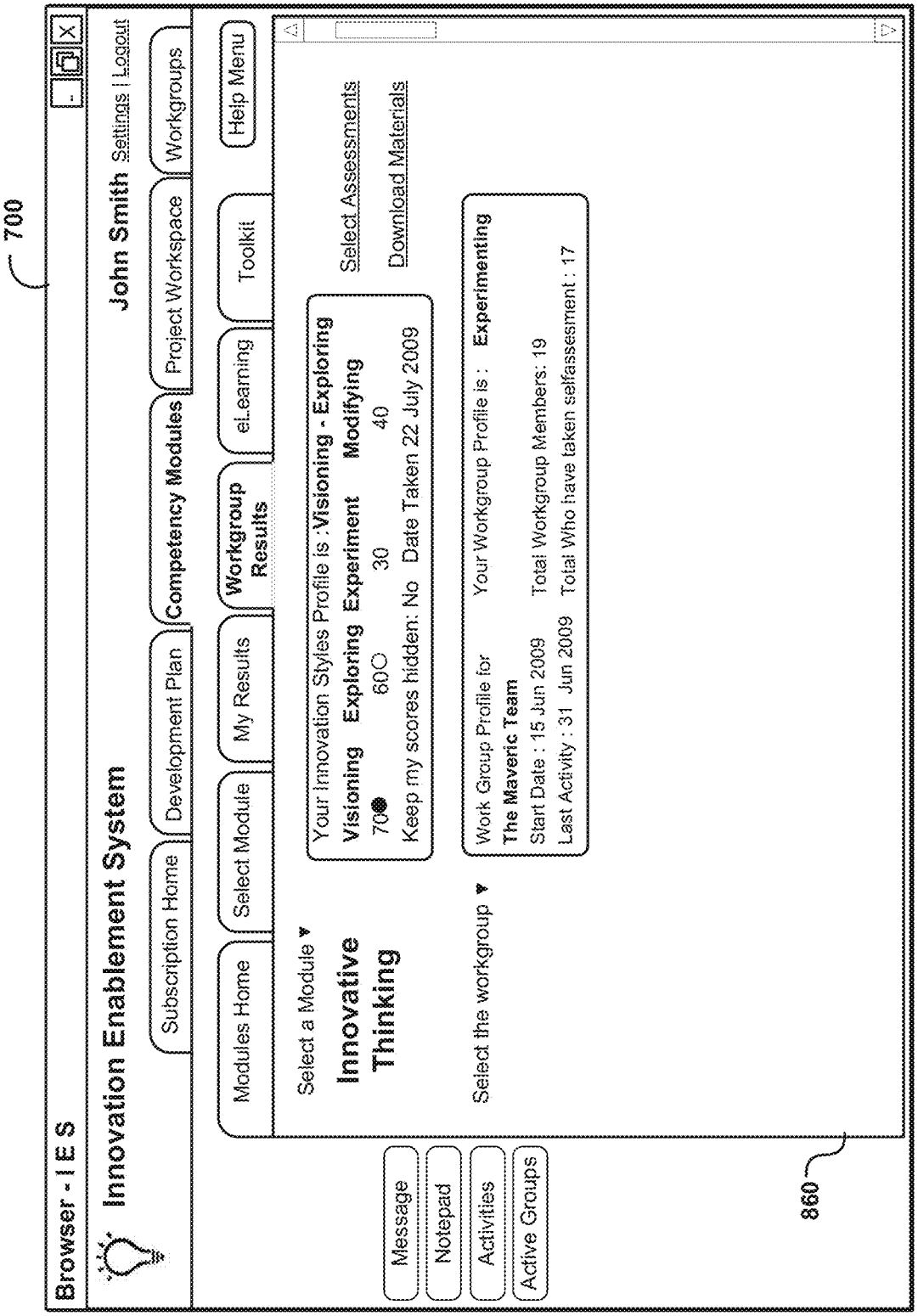

FIGS. 8C-8C2 and 8D-8D2 together illustrate the manner in which IES 150 enables users to view group results for different competency modules in one embodiment. Each of the Figures is described in detail below.

Referring to FIGS. 8C-8C2, display area 840 of FIG. 8C depicts a portion of a user interface displayed by IES 150 in response to the User selecting the "Workgroup Results" tab in display area 705. Display area 840 of FIGS. 8C1 and 8C2 may be respectively displayed when the user scrolls down the display area using the scrollbar shown there.

Select field 841 enables a user to select the desired competency module, while select field 842 enables a user to select the specific workgroup whose results are sought to be viewed. Display area 845 (referred to as "workgroup dashboard") indicates the average scores of the users of a workgroup selected in select field 842 (similar to the manner in which scores are shown in personal dashboard 730). IES 150 computes the average scores of the workgroup based on the scores obtained by the users in the assessments taken for Human Values competency module. Workgroup dashboard 845 also indicates that the average dominant orientation of the workgroup is "Action".

Display area 852 in FIG. 8C1 depicts the dominant orientations of the users belonging to the selected workgroup in a graphical manner. Though the scores are shown as a scatter diagram, in alternative embodiments, the scores may be displayed in any convenient graphical representation such as bar graphs, pie charts, and pyramid charts, etc. It may be observed that the graph indicates the personal orientation of the User, the orientation of the leader of the group, the members of the group with a strong/moderate orientations, etc. A user is accordingly able to compare his/her personal orientation with the group orientation (and the member orientations) for determining whether the personal orientation is in alignment with the group orientation.

Display area 855 in FIG. 8C1 provides feedback on the average dominant orientation computed for the workgroup, similar to display area 825 for the user. Display area 858 in FIG. 8C2 provides details of the human values that the members of the workgroup will tend to have in the background and foreground of the collective workgroup's mind when innovating, similar to display area 828 in FIG. 8A1. Display area 859 in FIG. 8C2 provides the complete scores of the members of the workgroup and also indicates the strong and moderate orientations for each of the members.

Thus, IES 150 enables a user to view the results of a desired workgroup for the selected competency module "Human Values". The user may similarly select another competency module (e.g., Innovation Thinking) and then view the corresponding results of the desired workgroups.

Referring to FIGS. 8D-8D2, display area 860 of FIG. 8D depicts a portion of a user interface displayed by IES 150 in response to the User selecting the "Workgroup Results" tab in display area 705 (after taking the assessment for the selected competency module) and then selecting competency module "Innovation Thinking" using select field 841. Display area 860 of FIGS. 8C1 and 8C2 may be respectively displayed when the user scrolls down the display area using the scrollbar shown there.

Display area 860 shows the results of the selected workgroup for the Innovation Thinking competency module. It may be observed that the orientations and accordingly the feedback shown for the Innovation Thinking competency module are different from that provided for the Human Values competency module. The assessment and computation of the results for the Innovation Thinking competency module may be performed similar to the assessment and computation for the Human Values competency module as described above and accordingly not repeated here for conciseness.

It may be appreciated that for context based assessments, the results provided to the user may be different from that shown in FIGS. 8A (personal) and 8C and 8C1 (workgroup). FIG. 8E depicts the manner in which IES 150 provides the results of a context based assessment in one embodiment. Graph 870 represents a graphical representation of the personal results of the User for the Human Values competency module for the context based assessment described above with respect to FIGS. 7F and 7G. Graph 870 may be displayed in display area 822 of FIG. 8A, if the user has taken the context based assessment. Similarly, graph 875 shows the results of the selected workgroup for the Human Values competency module for the context based assessment and may be displayed in display area 852 of FIG. 8C1.

Figure 8F:
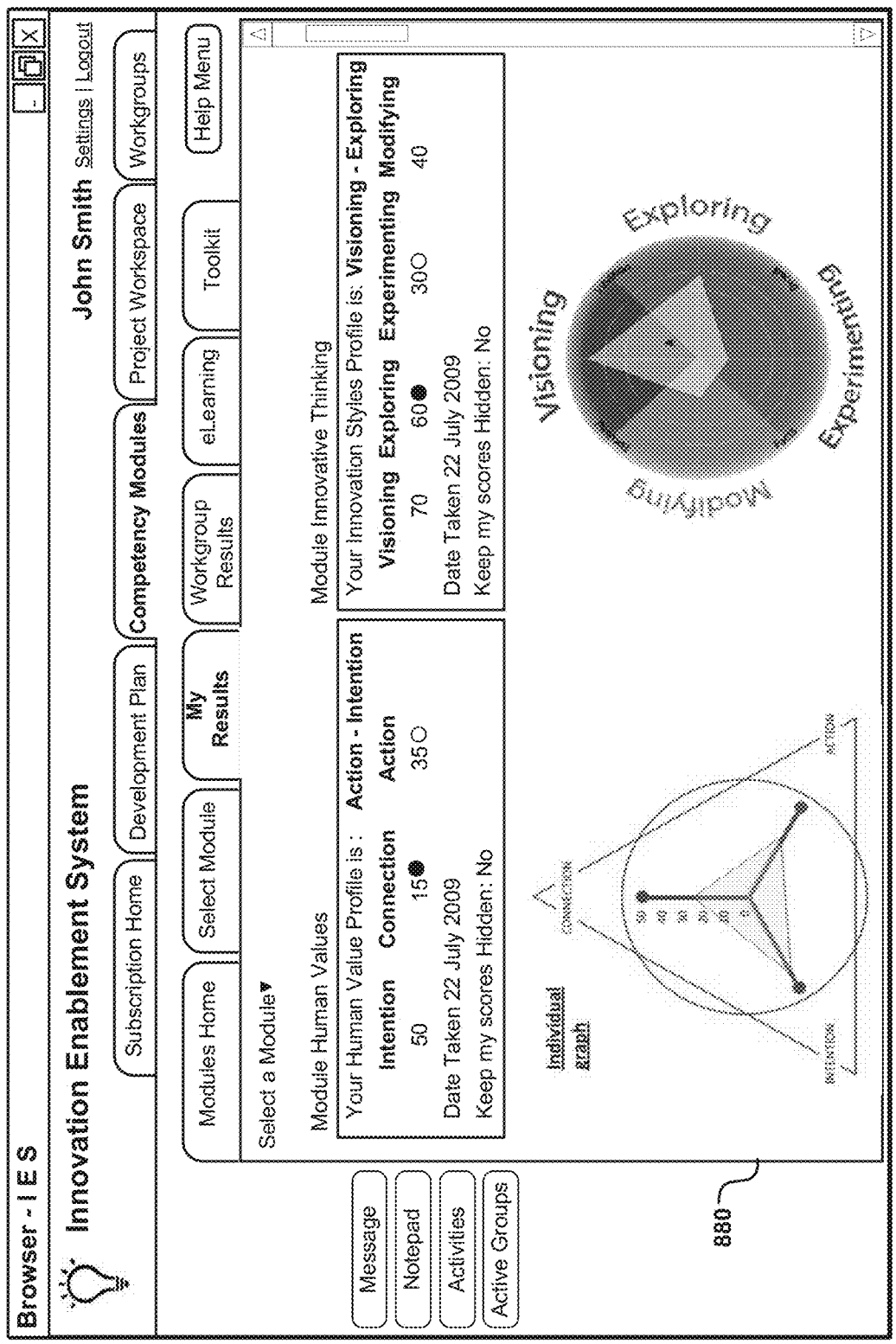
FIG. 8F depicts the manner in which IES 150 enables users to view the personal results of multiple competency modules at the same time in one embodiment.

An aspect of the present invention facilitates users to view the personal and group results of multiple competency modules at the same time. FIG. 8F depicts the manner in which IES 150 enables users to view the personal results of multiple competency modules at the same time in one embodiment. Display area 880 depicts a portion of a user interface displayed by IES 150 in response to a user clicking on the "Select Assessments" link in display area 810 and selecting the competency modules Human Values and Innovative Thinking whose results are sought to be viewed at the same time. Display area 880 is shown displaying the personal dashboard and the graphical representation of the scores for each of the selected competency modules.

Figure 8G:
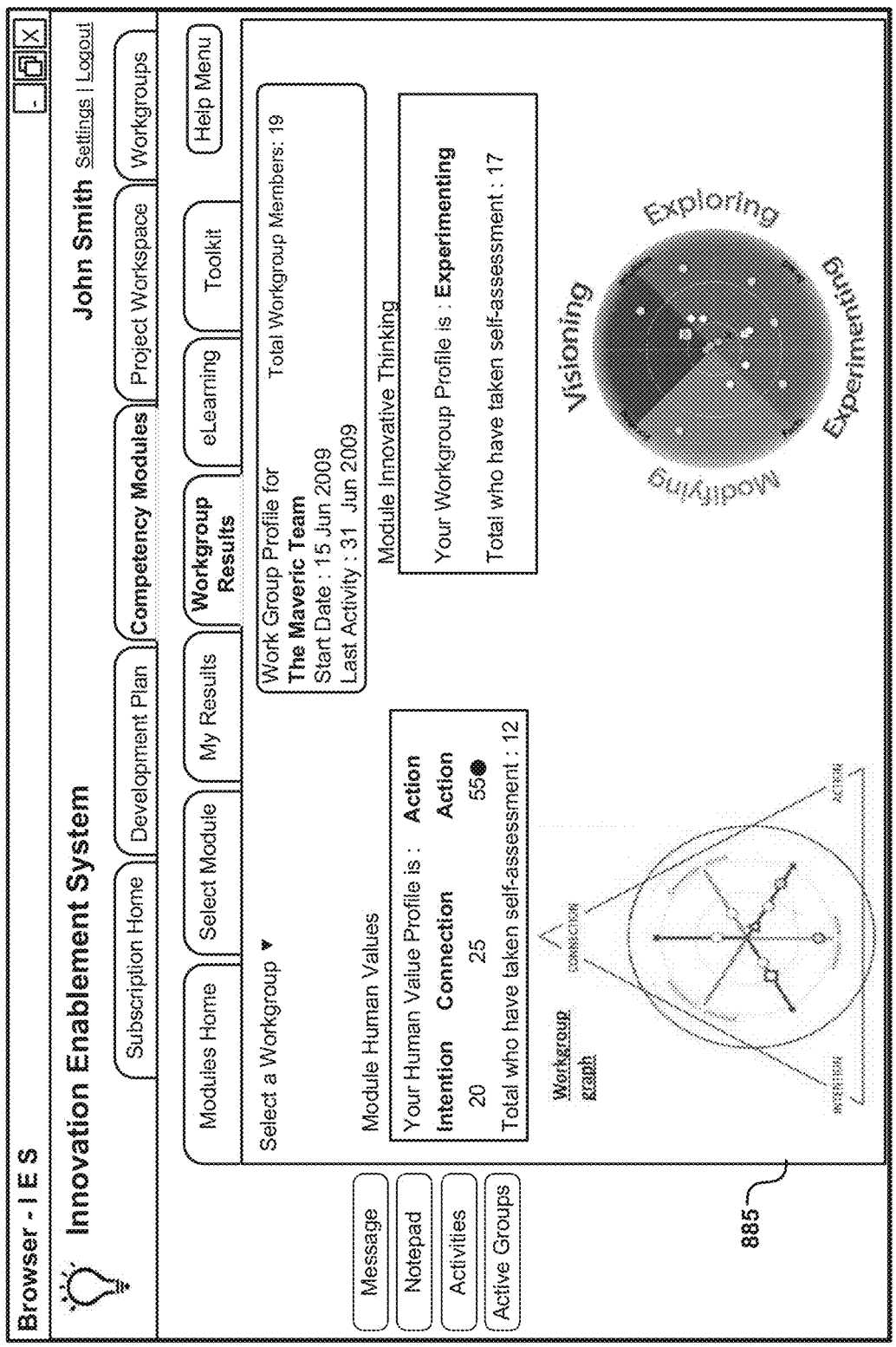
FIG. 8G depicts the manner in which IES 150 enables users to view the workgroup results of multiple competency modules at the same time in one embodiment.

FIG. 8G depicts the manner in which IES 150 enables users to view the workgroup results of multiple competency modules at the same time in one embodiment. Display area 885 depicts a portion of a user interface displayed by IES 150 in response to a user clicking on the "Select Assessments" link in display area 840 in FIG. 8D whose results for the selected workgroup (using select field 842) are sought to be viewed at the same time. Display area 885 is shown displaying the workgroup dashboard and the graphical representation of the scores/orientations of the other members of the selected workgroup for each of the selected competency modules.

An aspect of the present invention facilitates users to view the results co-related between a business organization (subscription) and a workgroup/team within the organization. FIG. 8H depicts the manner in which IES 150 enables users to view results co-related between a workgroup and a subscription in one embodiment. Graph 890 represents the graphical representation of the scores/orientations of a workgroup for the competency module "Human Values", while graph 895 shown the scores/orientation of the users of the organization or subscription (to which the workgroup belongs). IES 150 may provide graphs 890 and 895, along with the appropriate feedback as part of reports generated for the organization/workgroup. Alternatively, the graphs may be provided as user interfaces similar to FIGS. 8C-8C2 and may be accessed by clicking/selecting an additional tab provided in display area 705. The users may accordingly better align themselves with the orientations of both their team/workgroup and their organization/subscription.

After viewing the personal and group (team/organization) results, a user may select learning units to be studied and application of such learning to work tasks as described below with examples.

11. Studying Learning Units and Applying to Tasks

Figure 9A:
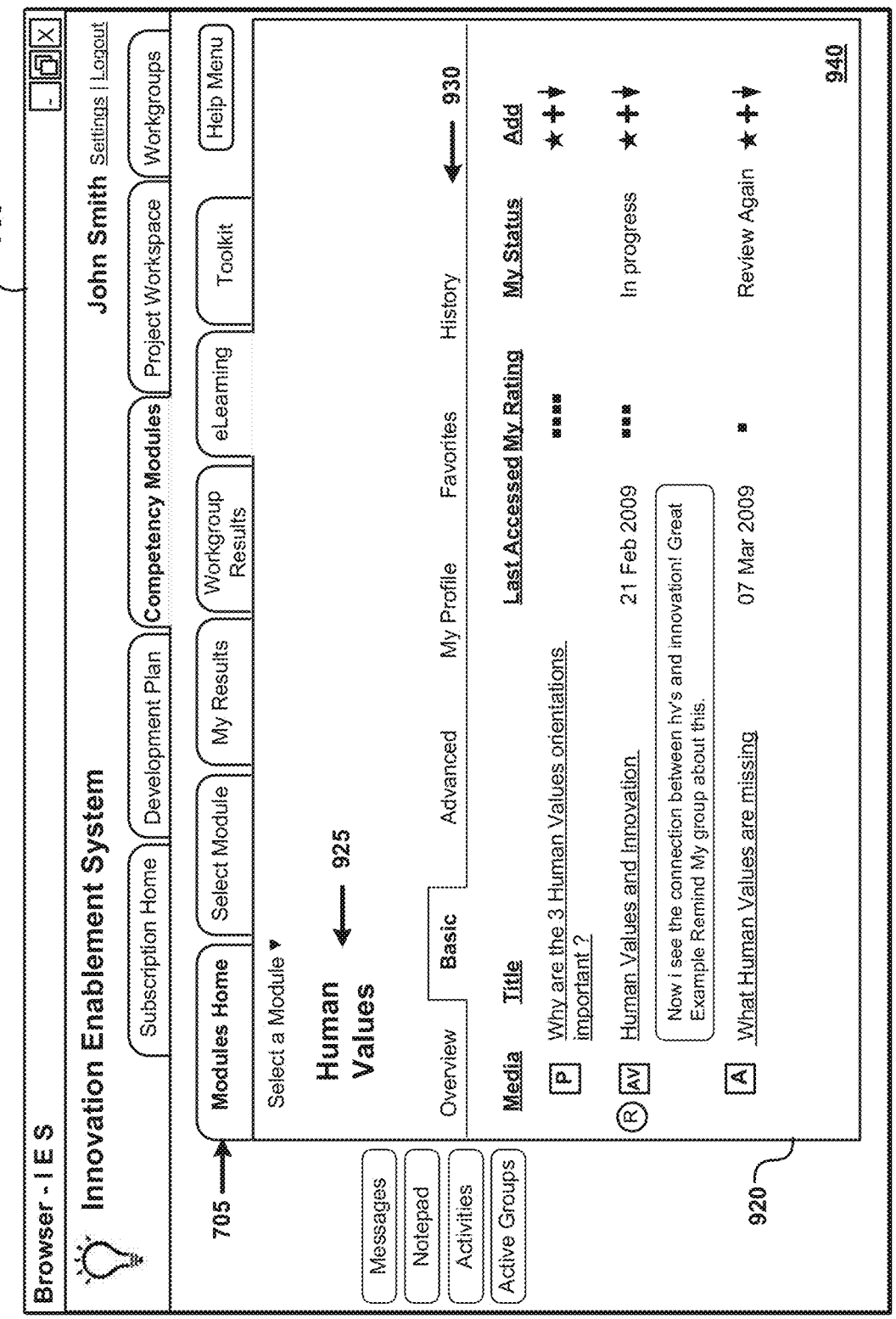
FIGS. 9A and 9B together illustrates the manner in which IES 150 enables users to access and study learning units related to a competency module in one embodiment.
Figure 9B:
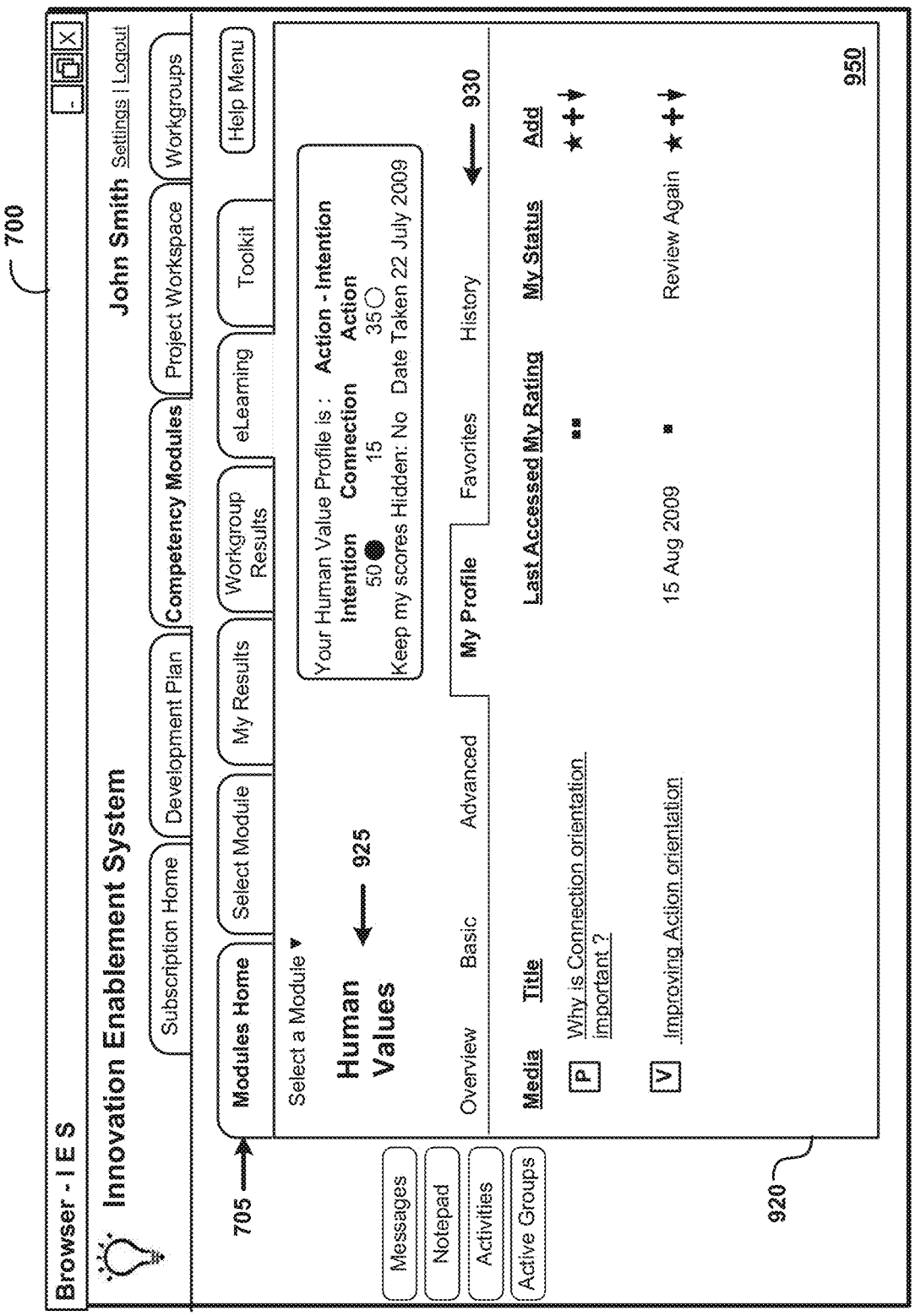

FIGS. 9A and 9B together illustrates the manner in which IES 150 enables users to access and study learning units related to a competency module in one embodiment. IES 150 may maintain a large number of learning units (and also the toolkits described below) in one or more data stores (e.g. 180A-180D). IES 150 may then select the specific learning units/tool kits based on one or more of the selected competency module, the orientations of the user for the selected competency module, the user/subscription profile (specified in FIGS. 6D and 6E), the set of learning units/toolkits accessible to the workgroup/subscription to which the user belongs, etc.

Referring to FIG. 9A, display area 920 depicts a portion of a user interface displayed by IES 150 in response to a user selecting the "eLearning" tab in display area 705 for accessing the learning units for the selected Human Values competency module (as indicated by text 925). Display area 930 enables the user to select the type (basic, advanced or profile specific) of learning units sought to be accessed/studied, to view the learning units that are personal favorites of the user, and to view the learning units that have already been accessed by the user (history tab). Display area 930 is shown indicating that the user has selected to access the basic learning units (as indicated in bold) for the Human Values competency module.

Display area 940 is accordingly shown displaying a list of basic learning units related to the selected Human Values competency module. The details of each learning unit such as the media type (A for audio, V for video, P for printed material, etc.), the title, the date when the user last accessed the unit, a rating provided by the user for the unit (indicated by the number of filled boxes), and a study status (e.g., complete, in progress, review again) are also shown provided in display area 940. The specific learning units that are recommended are also indicated (by the letter R in a circle) in display area 940.

A user is enabled to add personal notes (shown in the box below the title) to the learning units, add the desired units to his/her development plan (by clicking on the corresponding plus sign) or his/her favorites (by clicking on the corresponding star sign). The user may access and study the learning unit online by clicking the title link or download the desired units for offline studying (by clicking on the corresponding down arrow).

Referring to FIG. 9B, display area 950 is shown displaying a list of learning units specific to the "Human Values" orientations of the user, in response to the user selecting the "My Profile" tab in display area 930. The personal dashboard of the user (similar to display area 730 of FIG. 7I) is also shown to the user. It may be observed that the learning units shown in display area 950 are targeted to improving the "weaker" orientations of the user (determined based on the profile).

Thus, a user may study the basic, advanced or profile specific learning units related to the selected competency module Human Values. The user may then wish to understand how to apply the learning to specific work tasks. The user may accordingly access toolkits related to the selected competency module as described below with examples.

Figure 9C:
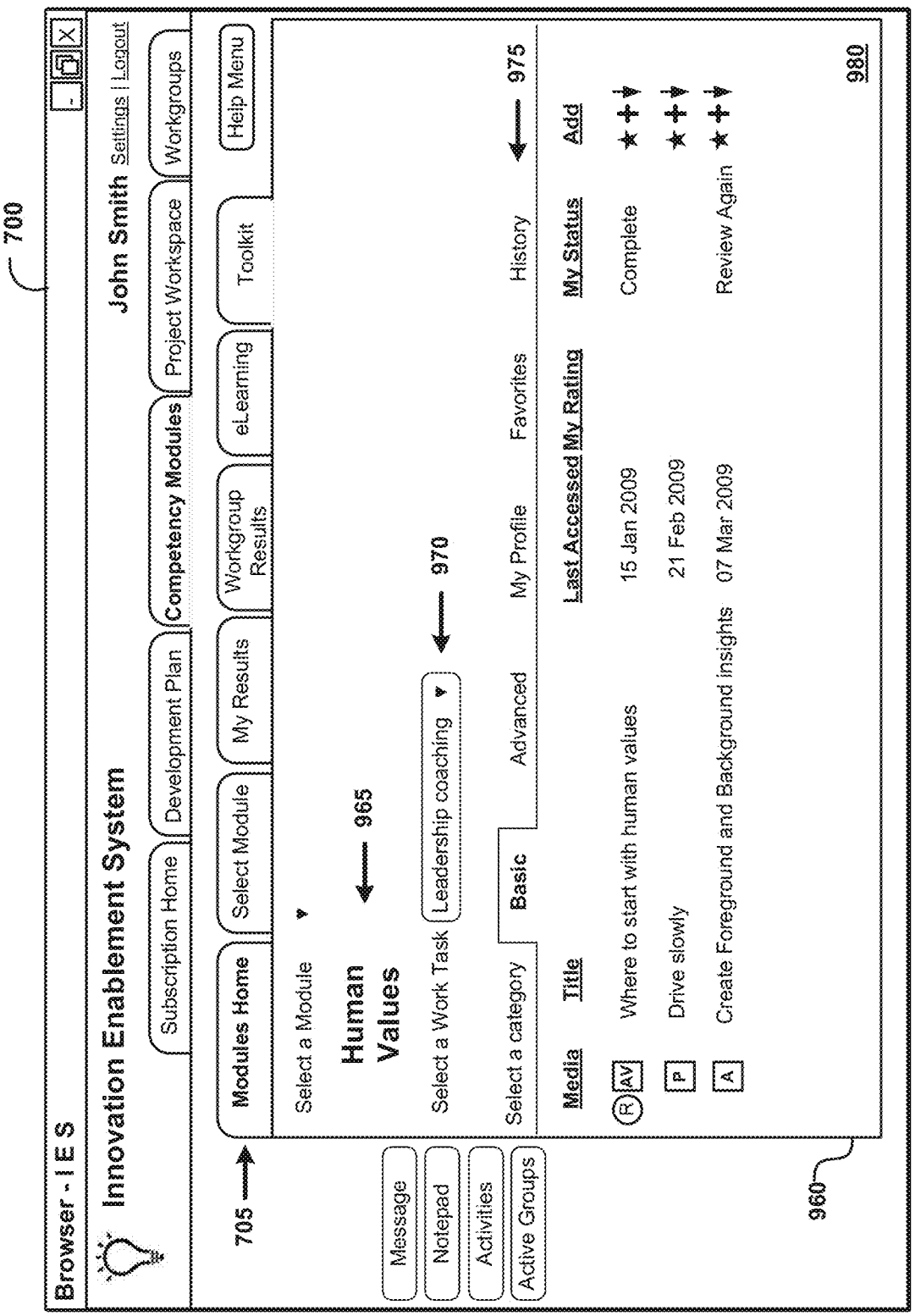
FIGS. 9C and 9D together illustrates the manner in which IES 150 enables users to apply the concepts of a selected competency module to desired work tasks in one embodiment.
Figure 9D:
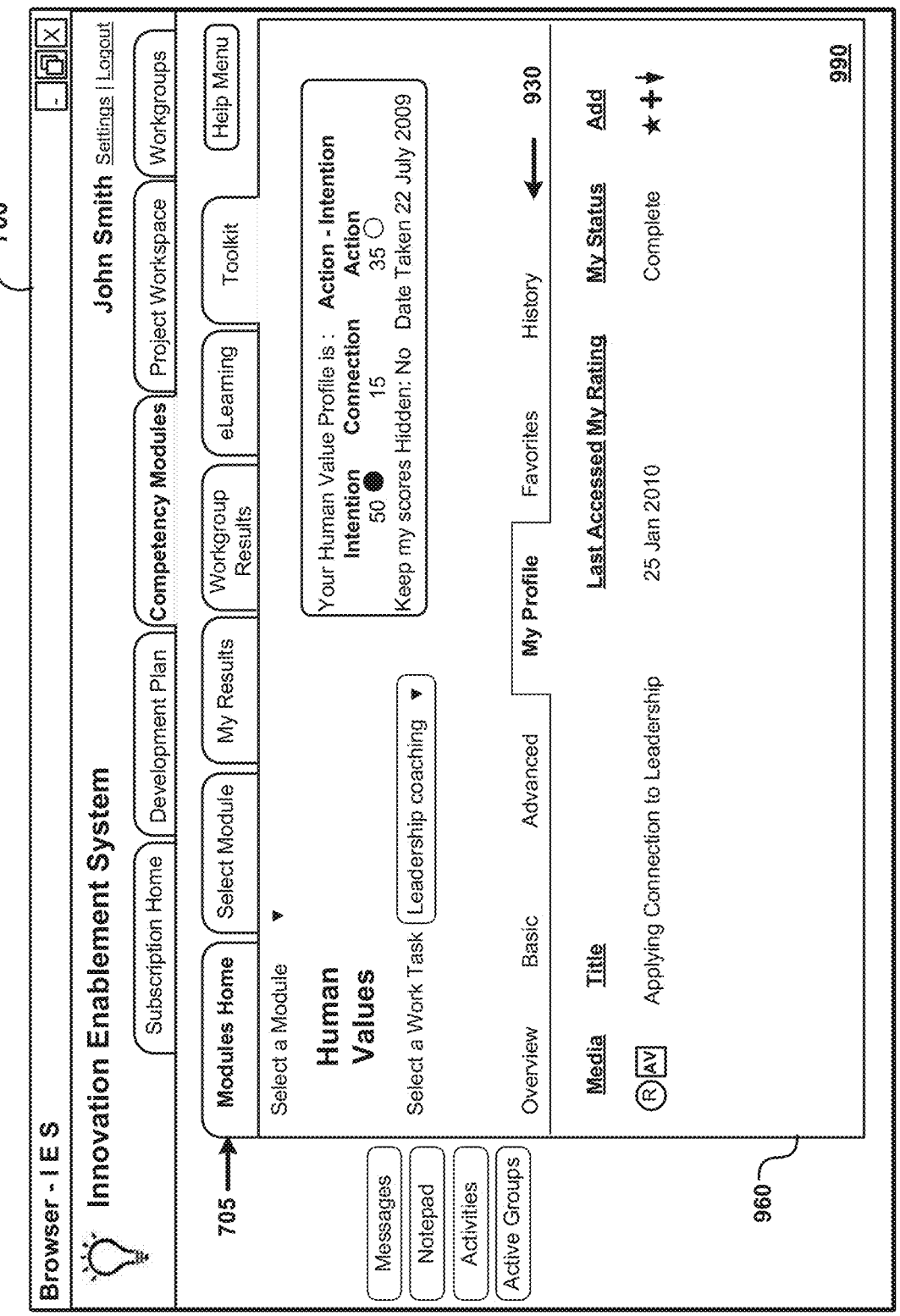

FIGS. 9C and 9D together illustrates the manner in which IES 150 enables users to apply the concepts of a selected competency module to desired work tasks in one embodiment. Referring to FIG. 9C, display area 960 depicts a portion of a user interface displayed by IES 150 in response to a user selecting the "Toolkit" tab in display area 705 for accessing the toolkits for the selected Human Values competency module (as indicated by text 965).

Select field 970 enables the user to select the specific work task for which toolkits are sought to be accessed and studied. Display area 975 enables the user to select the type (basic or advanced) of toolkits sought to be accessed/studied, to view personal favorite toolkits of the user, and to view history of the toolkits (already) accessed by the user. Select field 970 and display area 975 are shown indicating that the user has selected to access the basic toolkits (as indicated in bold) for "Leadership Coaching" for the Human Values competency module.

Display area 980 is accordingly shown displaying a list of basic toolkits related to the application of the selected Human Values competency module to the selected work task "Leadership Coaching". Display area 980 displays other details of the toolkits similar to display area 940 in FIG. 9A, and accordingly the description of the elements of the display 980 is not repeated here for conciseness.

Referring to FIG. 9D, display area 990 is shown displaying a list of toolkits specific to the "Human Values" orientations of the user, in response to the user selecting the "My Profile" tab in display area 975. The personal dashboard of the user (similar to display area 730 of FIG. 7I) is also shown to the user. It may be observed that the toolkits shown in display area 990 are targeted to improving the "weaker" orientations of the user (determined based on the profile).

Thus, a user may study the basic, advanced or profile specific toolkits related to the selected competency module Human Values. The user may similarly select and study the learning units and toolkits for the other competency modules.

It may be appreciated that IES 150 may also operate as an "expert" system that assists users in selecting the most suitable learning units and tool kits. For example, IES 150 may ask a (pre-defined) series of questions to that user and then, based on the answers provided by the user, recommend a possible selection of learning units and toolkits most suitable to the user needs. As noted earlier, the questions and answers may be performed in an interactive manner, with further questions being provided based on the previous answers. The access to such an "expert" option may be provided as respective tabs in display area 930 of FIG. 9A and display area 975 of FIG. 9C.

In one embodiment, IES 150 also facilitates users to save his/her answers (along with the questions asked) to his/her local user system, for example, in the form of a PDF file well known in the arts. Such a feature may be provided for any other activity (for example, when accessing learning units or toolkits) where there is an interaction between the user and IES 150. IES 150 accordingly enables users to keep track of their responses specified during a desired period.

Thus, IES 150 enables a user to develop his/her innovation competency by selecting a competency module, taking the assessments for the select competency module, viewing his/her personal and group results for the selected competency module, studying learning units related to the selected competency module and then understanding (studying toolkits on) how to apply the concepts of the selected competency module to specific work tasks.

12. User Interfaces for Performing Innovative Work

FIGS. 10A-10E, 11A-11H, and 12A-12J together depicts the manner in which IES 150 enables users to perform innovative work in one embodiment. Each of the Figures is described in detail below.

Figure 10A:
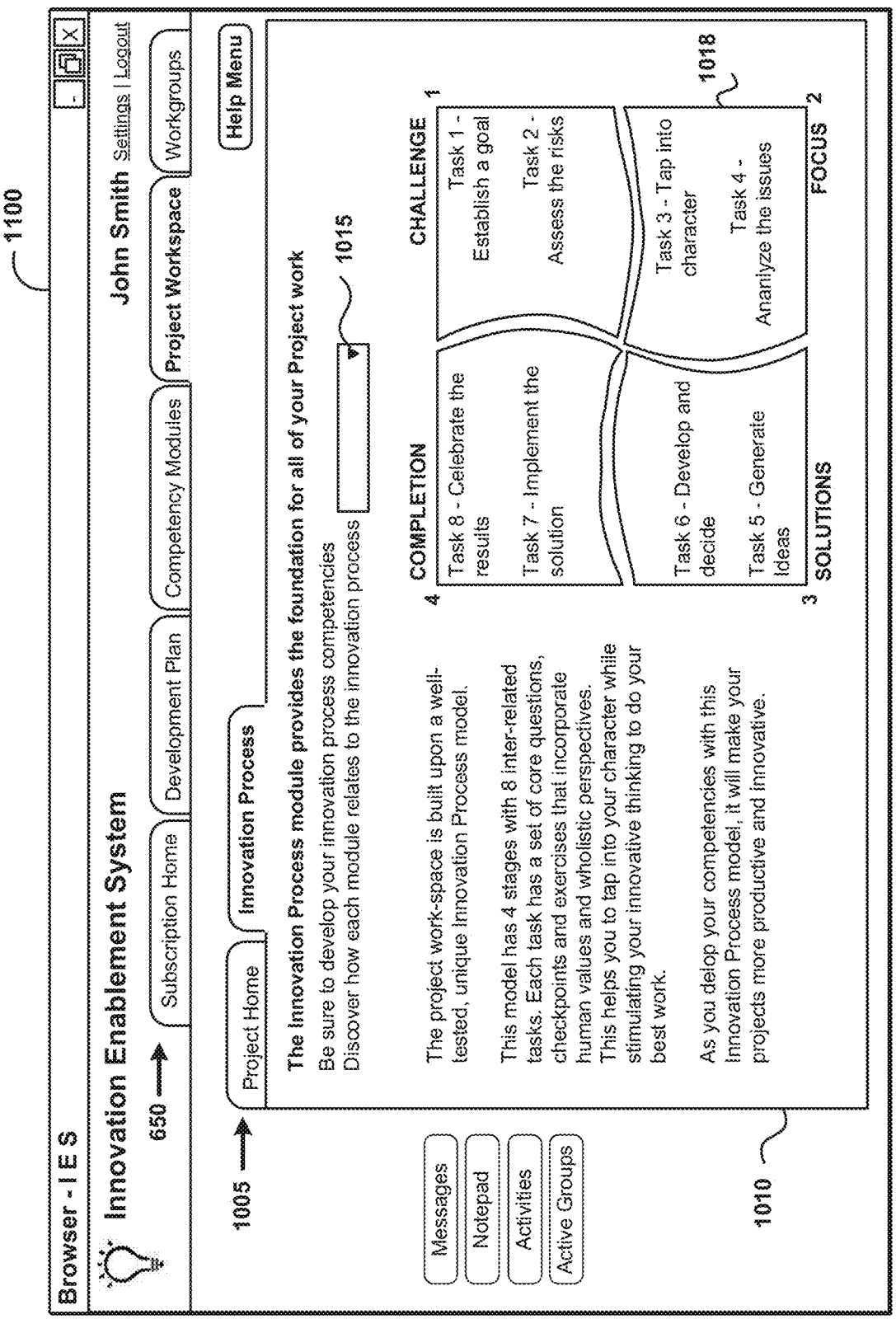
FIG. 10A depicts the manner in which IES 150 enables users to learn the Innovation Process Model (IPM) in one embodiment.

FIG. 10A depicts the manner in which IES 150 enables users to learn the Innovation Process Model (IPM) in one embodiment. Display area 1100 depicts a portion of a user interface displayed by IES 150 in response to a user clicking the "Project Workspace" tab in display area 650 (after selecting the "IEEE Engineering" subscription in FIG. 6B) to perform innovative work related to that subscription.

Display area 1005 contains tabs corresponding to the specific activities performed for performing innovative work. A user may select the desired activity to be performed by clicking the corresponding tab. Display area 1005 indicates that the User has selected the "Innovation Process" tab (shown in bold) for learning more about the Innovation Process Model (IPM) before performing innovative work. Display area 1010, accordingly, displays the details of the IPM. In particular, the 4 stages with the 8 inter-related tasks are shown in a graphical manner (1018). Select field 1015 enables a user to select a competency module and understand the relation between IPM and the selected competency module.

Figure 10B:
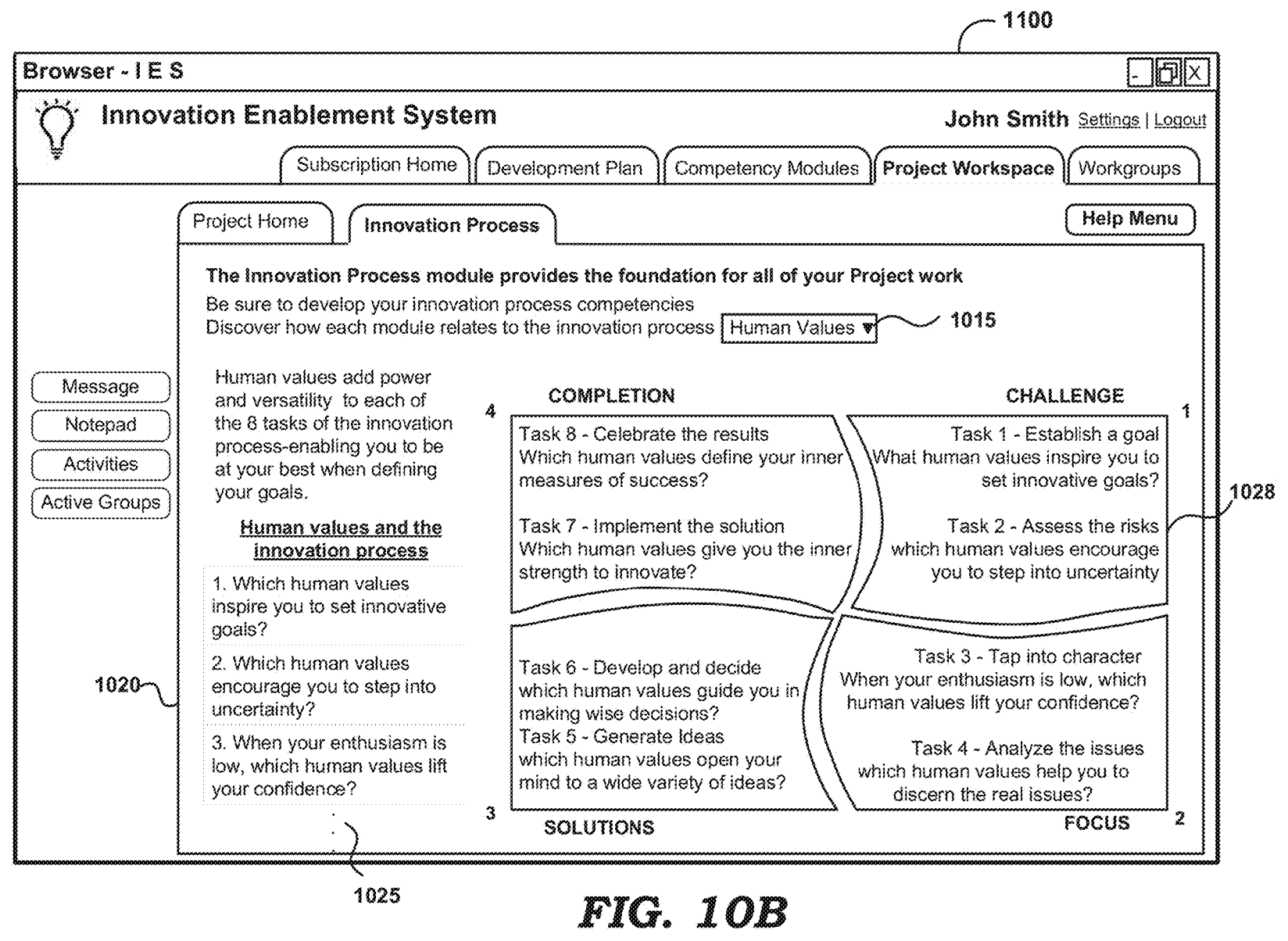

FIG. 10B depicts the manner in which IES 150 enables users to understand the relation between the tasks of the IPM and a competency module in one embodiment. Display area 1020 depicts a portion of a user interface displayed by IES 150 in response to a user selecting the competency module Human Values in select field 1015 for understanding the relation between the IPM and the Human Values competency module.

Display area 1020 is accordingly shown displaying the relation between each of the tasks of IPM and the Human Values competency module in a graphical manner (1028). For example, the relation between the eighth task of the IPM ("Celebrate the results") and the Human Values competency module is represented as the question "What human values define your inner measure of success?" Display area 1025 provides the same information shown in 1028 in the form of a list. A user may select any one of the tasks in the list shown in display area 1025 to view the manner in which each of the orientations of the selected Human Values competency module is relevant to the selected task.

Figure 10C:
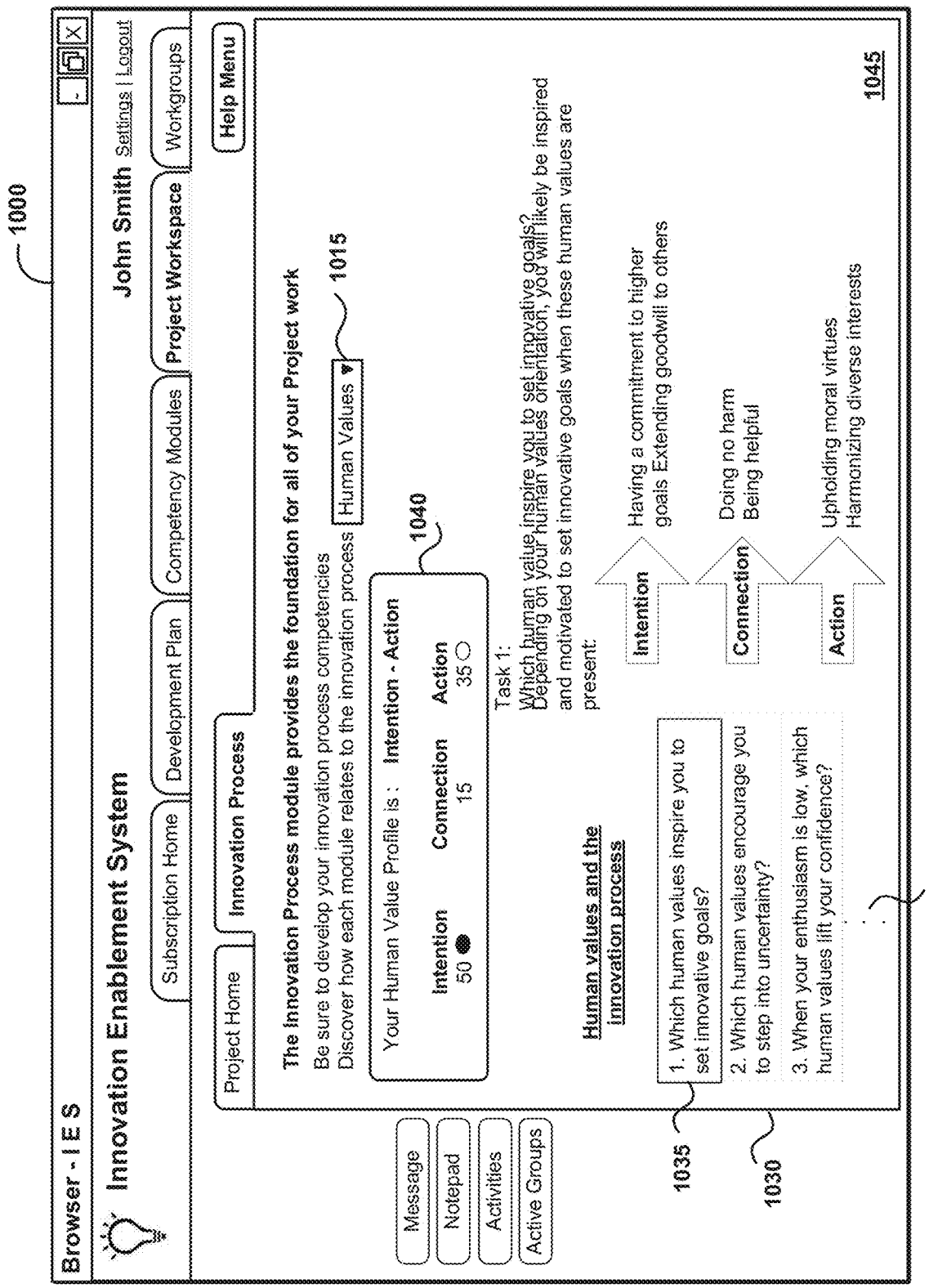
FIG. 10C depicts the manner in which IES 150 enables users to understand the relation between the tasks of the IPM and specific orientations of a competency module in one embodiment.

FIG. 10C depicts the manner in which IES 150 enables users to understand the relation between the tasks of the IPM and specific orientations of a competency module in one embodiment. Display area 1030 depicts a portion of a user interface as displayed by IES 150 in response to the user selecting the first task (as indicated by box 1035) from the list of tasks shown in display area 1025 for understanding the relation between the first task and the different orientations (Intention, Connection, Action) of the selected Human Values competency module.

Display area 1030 is accordingly shown displaying the personal dashboard (1040) of the user and a brief description of the relation between the selected (first) task and the different orientations of the selected Human Values competency module (display area 1045). Personal dashboard 140 enables the user to view his/her orientation scores for the assessment taken for the selected Human Values competency module (and accordingly is similar to display area 730 of FIG. 7I). Display area 1045 indicates that the relation between the first task of the IPM ("Establish a goal" or in relation to Human Values competency module "Which human values inspire you to set innovative goals?" as shown in 1028) and the orientation "Connection" is "Doing no harm" and "Being helpful". Display area 1045 similarly indicates the relation between the selected first task and the other orientations of the selected Human Values competency module.

A user may select different tasks from the list of tasks shown in display area 1025 and view the relation between the selected task of the IPM and the different orientations of the selected competency module. The user may similarly view the relation between the different tasks of the IPM to the specific orientations of other competency modules, by selecting the desired competency module in select field 1015 (and then selecting the task in display area 1025).

Thus, a user is enabled to better understand the relation between the tasks of the IPM and the various competency modules. Based on such understanding, a user may wish to perform innovative work and accordingly may create and implement personal projects for achieving specific/desired innovative works. The manner in which IES 150 may enable users to create personal projects is described in detail below.

Figure 10D:
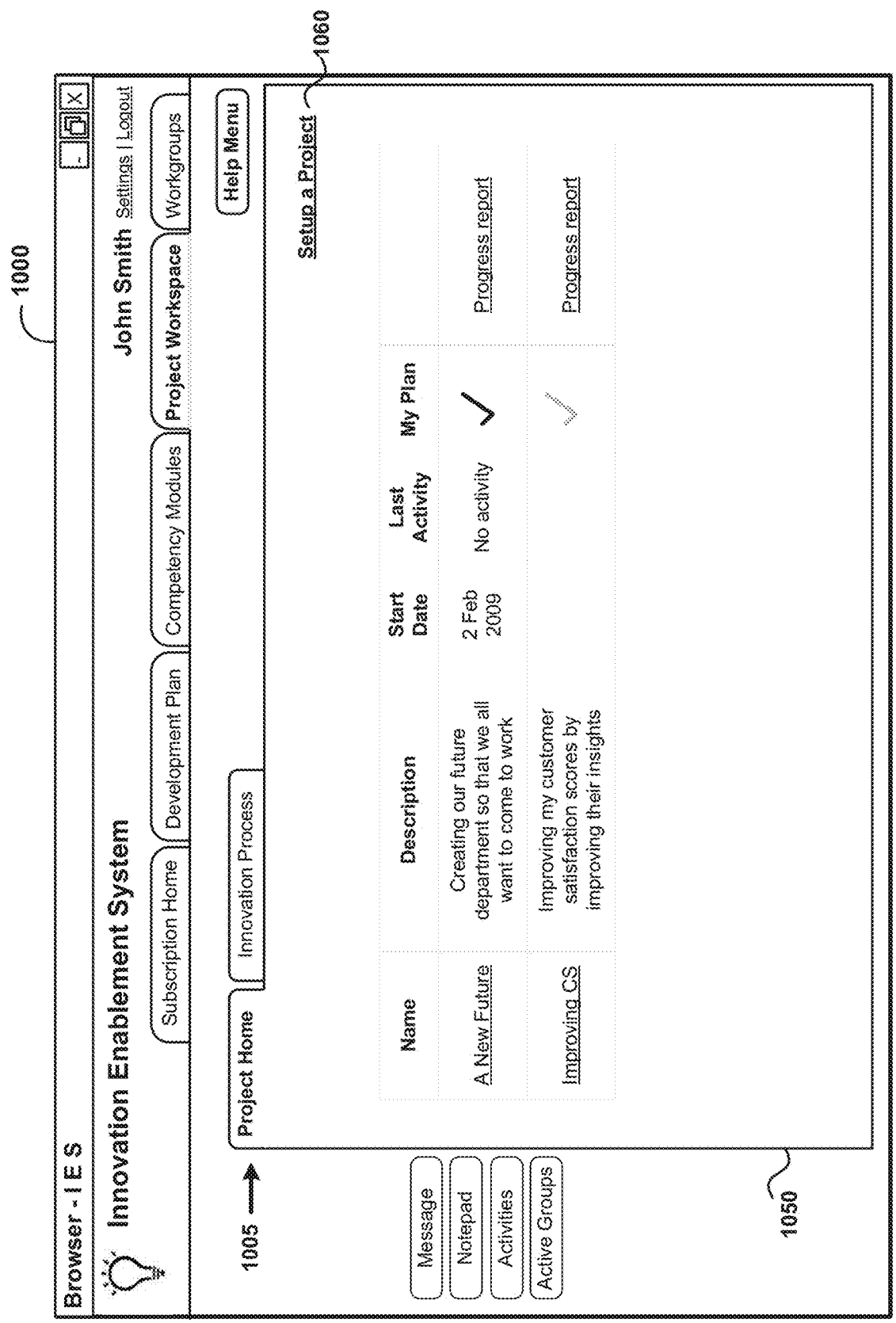
FIG. 10D depicts the manner in which IES 150 enables users to access personal projects in one embodiment.

FIG. 10D depicts the manner in which IES 150 enables users to access personal projects in one embodiment. Display area 1050 depicts a portion of a user interface displayed by IES 150 in response to the User selecting the "Project Home" tab in display area 1005.

Display area 1050 displays the list of personal projects sought to be implemented by the User. In particular, IES 150 provides to the user for each project (shown as a corresponding row in display area 1050), the project name, the project description, the start date of the project, last activity performed by the user, an icon for adding the project to the user's self development plan and a link for viewing the progress report of the project (shown in corresponding columns in display area 1050). A user may click on the corresponding progress report link to view the progress of executing the project, and in response IES 150 may display a user interface as shown in display area 1270 of FIG. 12I described in below sections. A user may create a new personal project by clicking on the "Setup a Project" link (1060).

Figure 10E:
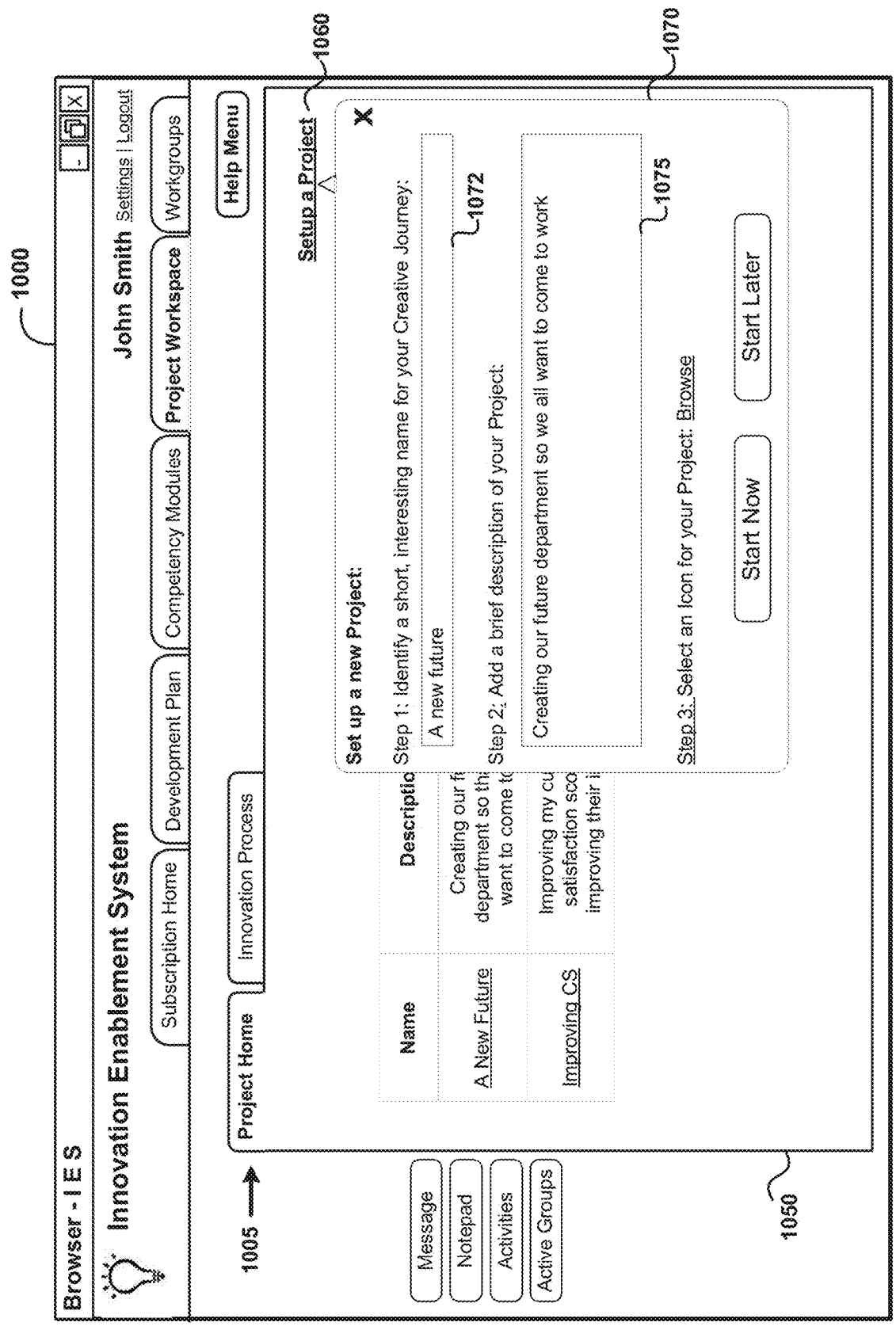
FIG. 10E depicts the manner in which IES 150 enables users to create new projects in one embodiment.
Figure 11A:
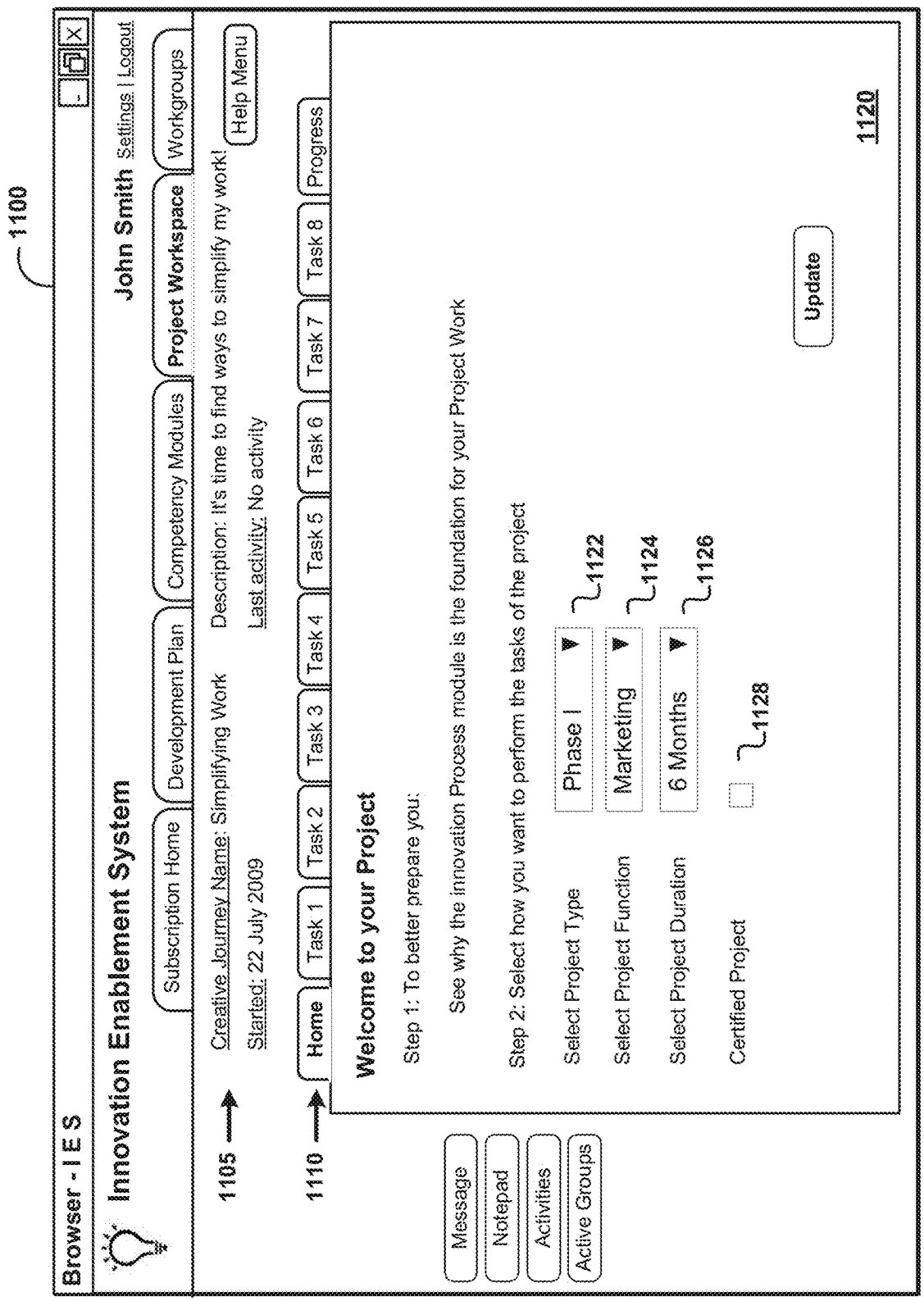
FIG. 11A depicts the manner in which IES 150 enables users to set the setting for a project in one embodiment.

FIG. 10E depicts the manner in which IES 150 enables users to create new projects in one embodiment. Display area 1070 depicts a portion of a user interface displayed by IES 150 in response to the User selecting link 1060 in display area 1050 for creating a new personal project. A user may specify a desired name and a corresponding desired description in the respective text fields 1072 and 1075 and then click on the "Start Now" or "Start Later" button to create the new personal project. In the scenario that the "Start Now" button is selected, the user interface of FIG. 11A is displayed to the user. When the "Start Later" button is selected, display area 1050 is again displayed to the user with the newly created project added to the display area. A user may then click on the desired one of the project names (provided as links) to select the project in which innovate work is sought to be executed. The manner in which IES 150 enables users to execute projects is described below with examples.

13. Executing Projects

FIGS. 11A-11H and 12A-12J together depict the manner in which IES 150 enables users to execute a project (perform the innovative work sought to be achieved) in one embodiment. Each of the Figures is described in detail below.

FIG. 11A depicts the manner in which IES 150 enables users to set the setting for a project in one embodiment. Display area 1100 depicts a portion of a user interface displayed by IES 150 in response to the User selecting a project (by clicking on the corresponding project name link) in display area 1050 for execution. Display area 1105 shows the details such as the name "Simplifying Work", description, started date, and last activity of the selected project.

Display area 1110 contains tabs corresponding to the specific activities performed for executing the project such as setting the properties of the selected project, performing the tasks of the IPM as part of the project and viewing the overall progress of the project. A user may select the desired activity to be performed by clicking the corresponding tab. Display area 1110 indicates that the User has selected the "Home" tab (shown in bold) for performing the activity of setting the properties of the selected project. IES 150 may accordingly display the portion of the user interface shown in display area 1120.

Display area 1120 enables the users to set the properties of the selected project such as the project type (select field 1122), the project function (select field 1124), the project duration (select field 1126) and whether the project is a certified project or not (checkbox 1128). The selection of the certified project checkbox indicates that all the tasks of the IPM are to be performed in strict order, that is, a subsequent (2-8) task can be performed only after the completion of the respective previous task (1-7). On the other hand, an unchecked checkbox 1128 indicated that the tasks of the IPM may be performed in any order (that is, a user may skip some of the tasks, or go back to some of the previous tasks after having started a subsequent task, etc.)

It may be appreciated that IES 150 may provide the various questions and exercises (described below) based on the options selected by the user in display area 1120. Referring to FIG. 11A, display area 1120 indicates the user has specified that the selected project "Simplifying Work" relates to "Phase I" and "Marketing", is of "6 months" duration and is not a certified project (that is, the tasks need not be performed in strict order). A user may then click on the "Update" button to set the properties of the selected project. The user may then select the tabs corresponding to the different tasks of the IPM and perform the corresponding work.

Figure 11B:
FIG. 11B depicts the manner in which IES 150 enables users to perform the first task of the IPM in one embodiment.

FIG. 11B depicts the manner in which IES 150 enables users to perform the first task of the IPM in one embodiment. Display area 1130 depicts a portion of a user interface displayed by IES 150 in response to a user selecting the "Task 1" tab in display area 1110 for performing the first task of the IPM as part of the selected project. Display area 1131 displays the checkpoints, task completion status and the final outcome for the first task. The checkpoints ensure that the user has performed the selected first task according to the IPM, while the task completion status (shown in the form of a progress bar) informs the user of the level of completion of the task. The final outcome of the task may be identified by the user in the text box provided based on the entries/themes (and their corresponding ratings) created by the user for the specific task.

Display area 1133 contains links that enable a user to view the themes or the entries created by him/her, while display area 1135 contains links which the user can select to create new entries. Display area 1133 indicates that the user has selected the link to view the entries (as indicated by the bold text).

Display area 1137 accordingly shows the details of the entries created by the user. In particular, IES 150 provides to the user for each entry (shown as a corresponding row in display area 1137), the theme to which the entry belongs (a blank indicating that the entry is not grouped with others), the entry text provided by the user, the entry type (free-form, question, exercise), the date the entry was made, the ratings for the entry (having a rating for the priority, meaning and the total of the two) and icons for adding additional information associated with the entry (shown in corresponding columns in display area 1137).

The icons shown for each entry enables a user to add insights (the plus icon), attach documents (the square icon, the number inside indicating the number of documents attached) and add website URLs (the round icon, the number inside indicating the number of URLs added) that are relevant to the entry. A user may also click on one of the numbers 1-5 shown in the ratings column for an entry to indicate a rating for the entry (shown in a bigger font).

Display area 1139 enables the user to create new themes (by clicking the "Add Themes" link provided there) and to select the user's favorite themes from the list of themes. The number in brackets shown along with each theme indicates the number of entries associated with the theme (included in the group). A user may view the themes and provide ratings for the themes as described in detail below.

Figure 11C:
FIG. 11C depicts the manner in which IES 150 enables users to provide rating for themes (groups of entries) in one embodiment.

FIG. 11C depicts the manner in which IES 150 enables users to provide rating for themes (groups of entries) in one embodiment. Display area 1140 depicts a portion of a user interface displayed by IES 150 in response to a user selecting the "Show Themes" link in display area 1133. Display area 1145 shows the details of the themes created by the user. In particular, IES 150 provides to the user for each theme (shown as a corresponding row in display area 1145), the theme text provided by the user, the entries belonging to the theme (by clicking the "Shown entries" link), the insights associated to the theme (as displayed), the ratings for the theme (having a rating for the priority, meaning and the total of the two) and icons (similar to that described above for entries) for adding additional information associated with the theme (shown in corresponding columns in display area 1145). Each insight may have the text entered by the user and the date that the insight was specified by the user.

Thus, a user is enabled to provide rating for each of the entries and also for each of the themes. The user may then form a conclusion/outcome based on these ratings, as well as the other related information (such as insights, attached documents/URLs, etc.). A user may create new entries by clicking on the links shown in display area 1135 as described in detail below.

14. Creating Entries

FIG. 11D depicts the manner in which IES 150 enables users to create entries of free-form type for tasks of the IPM in one embodiment. Display area 1150 depicts a portion of a user interface displayed by IES 150 in response to the User clicking on the "Free Form" link in display area 1135 of FIG. 11B/11C for creating an entry of free form type. In one embodiment, the user interfaces for entries (such as display areas 1150, 1160, 1170, 1180 and 1190) are provided as a pop-up window overlaying the interface shown in FIG. 11B/11C (similar to the pop-up windows described above). Display area 1150 enables the user to specify a desired text in text field 1155 and to add the specified text as an entry by clicking on the "Add this entry" button. The user may similarly specify various free-form entries for the selected task.

FIG. 11E depicts the manner in which IES 150 enables users to create entries of question type for the tasks of the IPM in one embodiment. Display area 1160 depicts a portion of a user interface displayed by IES 150 in response to the User clicking on the "Questions" link in display area 1135 of FIG. 11B/11C for creating an entry of question type. Select field 1162 provides a list of question types such as basic, advanced, module/profile specific, etc. from which a user may select the desired type. Select field 1162 indicates that the user has selected basic questions.

Display area 1165 is accordingly shown displaying a set of basic questions with a corresponding box provided below each of the questions. A user may add an answer text in the box provided and then click the "Add this entry" button provided within the box to add the answer text as an entry for the selected task (as shown in box 1168). A user may click on the "Clear all entries" to clear all the answer texts entered and/or the "Add all entries" to add all the specified answer texts as corresponding entries for the selected task.

FIG. 11F depicts the manner in which IES 150 enables users to create entries based on competency module specific questions for tasks of the IPM in one embodiment. Display area 1170 depicts a portion of a user interface displayed by IES 150 in response to the User clicking on the "Questions" link in display area 1135 of FIG. 11B/11C for creating an entry of question type. Select field 1162 indicates that the user has selected module/profile specific questions. A user may select the specific competency module "Innovation Thinking" according to which the questions are to be provided using select field 1172. IES 150 may accordingly display personal dashboard 1174 of the user for the competency module selected in select field 1172.

Display area 1175 is accordingly shown displaying a set of questions related to each of the orientations of the selected Innovation Thinking competency module with a corresponding box provided below each of the questions. A user may add an answer text in the box provided and then click the "Add this entry" button provided within the box to add the answer text as an entry for the selected task (as shown in box 1178).

FIGS. 11G and 11H together depicts the manner in which IES 150 enables users to create entries of exercise type for tasks of the IPM in one embodiment. Display area 1180 of FIG. 11G depicts a portion of a user interface displayed by IES 150 in response to the User clicking on the "Exercises" link in display area 1135 of FIG. 11B/11C for creating an entry of exercise type. Select field 1162 indicates that the user has selected exercise questions. In response, IES 150 displays a set of slides containing a series of question which guides/assists the user in formulating an entry text.

Thus, display area 1185 is shown displaying an intermediate set of questions (4 and 5) to which answers are to be written in the corresponding text boxes shown over the inverted triangle (indicating that the answers to questions 1 to 5 are to be written from the top to bottom). The user may then click on the "Next" button to view the interface of display area 1190. Display area 1190 enables the user to formulate and specify a goal/purpose statement (in text field 1192) based on the answers provided by the user for the previous steps (shown in the text boxes), and then add the formulated/specified goal statements as the entry to the selected task (by selecting one of buttons 1196 and 1198). The selection of button 1198 causes the addition of the specified goal (in 1192) to the selected task and also the saving of the data specified by the user during the exercise (e.g. in the interfaces of FIGS. 11G and 11H), while selection of button 1196 causes only the specified goal to be added to the selected task. A user may similarly be guided by a series of questions (provided by IES 150) to formulate the entry text in exercise type of entries.

Thus, a user is enabled to create entries, to group the created entries into themes, to provide a rating for each of the entries and/or themes and accordingly come to a conclusion/outcome for the selected first task "Establish the goal or purpose" of the IPM. The user may then select the other tasks by clicking on the corresponding tasks in display area 1110 as described below with examples.

15. Performing Different Tasks

Figure 12A:
FIG. 12A depicts the manner in which IES 150 enables users to perform the second task of the IPM in one embodiment.

FIG. 12A depicts the manner in which IES 150 enables users to perform the second task of the IPM in one embodiment. Referring to FIG. 12A, display area 1210 depicts a portion of a user interface displayed by IES 150 in response to a user selecting the "Task 2" tab in display area 1110 for performing the second task "Assess the risks" of the IPM as part of the selected project. Display area 1211 displays the checkpoints, task completion status and the final outcome for the second task, while display area 1215 displays the entries created by the user for the second task.

Display area 1210 is shown containing interface elements similar to display area 1130 of FIG. 11B, and accordingly their description is not repeated here for conciseness. A user may create entries and/or themes, provide a rating for the created entries/themes and come to a conclusion/outcome for the second task based on the entries/themes and the associated ratings.

FIG. 12B depicts the manner in which IES 150 enables users to create entries of question type specifically for the second task of the IPM in one embodiment. Display area 1220 depicts a portion of a user interface displayed (as a pop-up window) by IES 150 in response to the User clicking on the "Questions" link in display area 1210 of FIG. 12A for creating an entry of question type for the second task of the IPM. Display area 1220 is provided similar to display area 1160 of FIG. 11E, though the basic questions (as indicated by select field 1222) displayed in display area 1220 are related to the second task "Assess the risks" selected by the user. Though not shown, user interfaces for creating free-form and exercise type of questions for the second task may be provided similar to those shown for the first task (FIGS. 11D-11F). A user accordingly may create the desired entries for the second task, which are then displayed in display area 1215 in FIG. 12A.

Figure 12C:
FIG. 12C depicts the manner in which IES 150 enables users to perform the fifth task of the IPM in one embodiment.

FIG. 12C depicts the manner in which IES 150 enables users to perform the fifth task of the IPM in one embodiment. Display area 1230 depicts a portion of a user interface displayed by IES 150 in response to the User selecting the "Task 5" tab in display area 1110 for performing the fifth task "Generate creative ideas" of the IPM as part of the selected project. Display area 1231 displays the checkpoints, task completion status and the final outcome for the fifth task, while display area 1235 displays the entries created by the user for the fifth task.

It may be observed that box 1238 indicates that the ratings are turned off (that is, the user cannot rate the entries for this task). On a user clicking box 1238, IES 150 may inform the user that the purpose of task 5 is to generate as many creative ideas as possible (as corresponding entries) without evaluating or judging them, and that the evaluation of the creative ideas/entries added in task 5 is to be performed as part of task 6 "Develop and decide". Thus, a user may create as many entries as required, organize them as themes, and also come to a conclusion/outcome based on the entries/themes created for task 5.

Figure 12D:
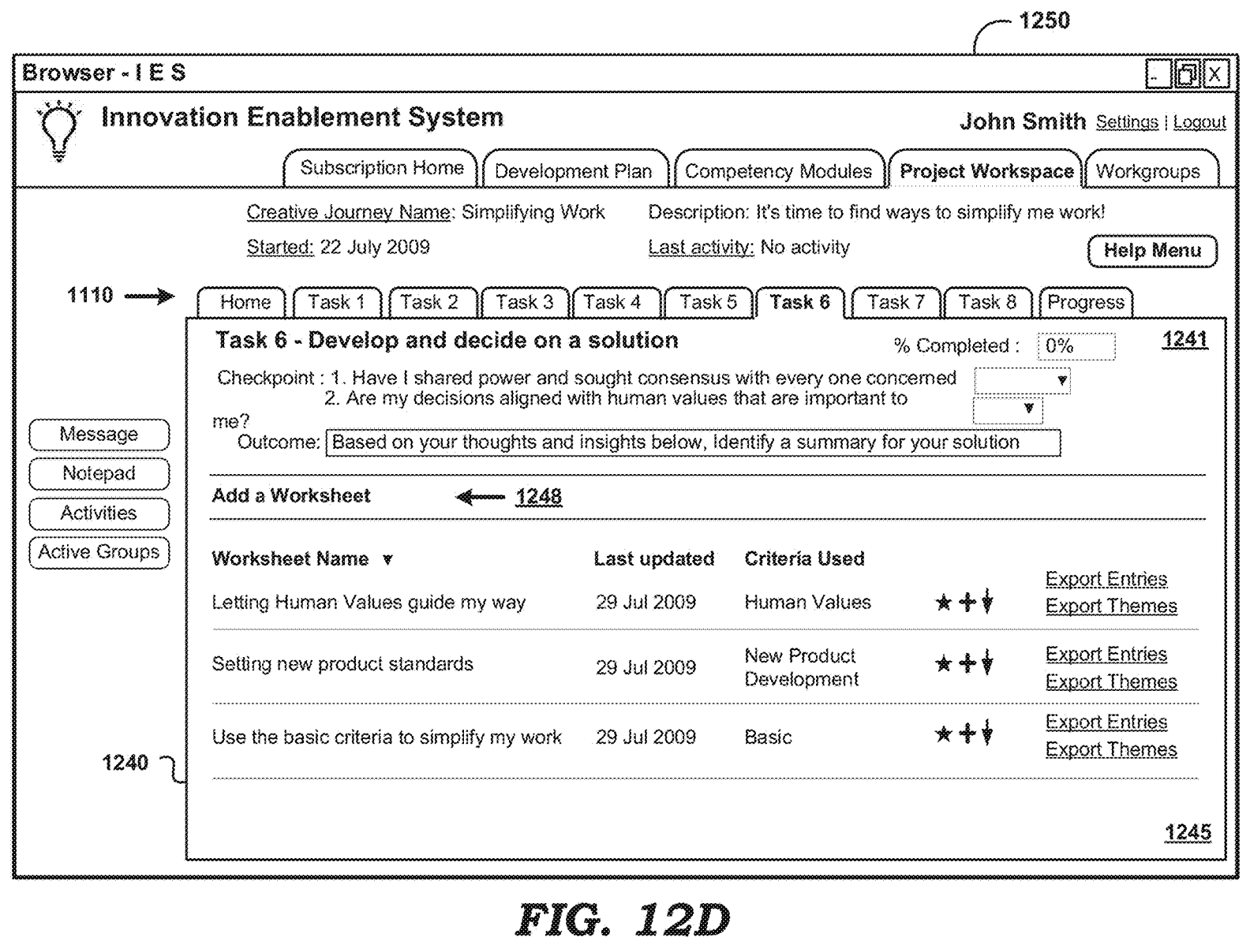
Figure 12D1:
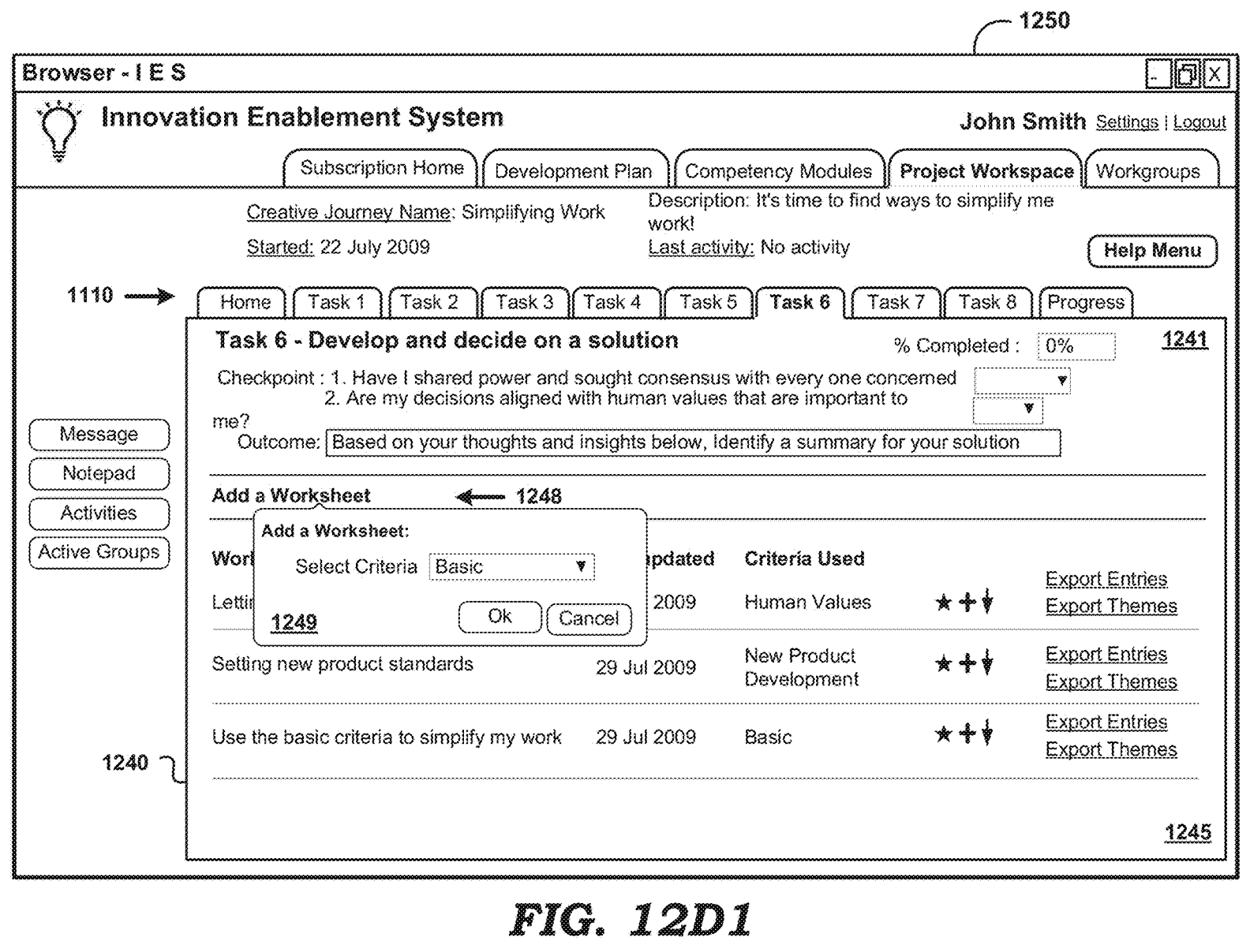

FIG. 12D depicts the manner in which IES 150 enables users to perform the sixth task of the IPM in one embodiment. Display area 1240 depicts a portion of a user interface displayed by IES 150 in response to the User selecting the "Task 6" tab in display area 1110 for performing the sixth task "Develop and decide" of the IPM as part of the selected project. Display area 1241 displays the checkpoints, task completion status and the final outcome for the sixth task.

Display area 1245 displays a list of worksheets (in contrast to similar display areas for the other tasks which displays entries created by the user). Each worksheet represents a set of entries that have been included/shortlisted for development/decision making (task 6) from the entries created by the user in task 5 "Generate creative ideas". IES 150 provides to the user for each worksheet (shown as a corresponding row in display area 1245), the worksheet name, the date of last update, the criteria used for evaluating the ideas/entries included in the worksheet, and icons for adding insights, attachments and URLs to the worksheet (shown in corresponding columns in display area 1245). A user may add a new worksheet by clicking on "Add a worksheet" link 1248 as described below with examples.

FIGS. 12D1, 12E and 12F together depicts the manner in which IES 150 enables users to create worksheets for the sixth task of the IPM in one embodiment. Referring to FIG. 12D1, display area 1249 depicts a portion of a user interface displayed (as a pop-up window) by IES 150 in response to the User selecting link 1248 for creating a new worksheet as part of the sixth task "Develop and decide" of the IPM. A user may select the desired criteria (e.g. "Basic" as shown) for evaluating the ideas/entries included in the new worksheet and then click on the "Ok" button to create the new worksheet.

Referring to FIG. 12E, display area 1250 depicts a portion of a user interface displayed (as a pop-up window) by IES 150 in response to the User clicking on "Ok" button in display area 1249 of FIG. 12D1. Display area 1252 displays the list of entries that have been included from the entries created in task 5, and the criteria "Basic" selected by the user in display area 1249. Display area 1252 indicates that no entries have been included and instructs the user to bring the entries from task 5 by clicking on link 1254. On the user clicking on link 1254, IES 150 may bring the entries created in task 5 and display them in display area 1252. It may be observed that display area 1252 is similar to display area 1130 (except there is an expanded rating criteria that was chosen by the user) and accordingly may enable the user to group the included entries using themes, view only the themes, and provide ratings for each of the themes.

Referring to FIG. 12F, display area 1255 depicts a portion of a user interface displayed by IES 150 in response to the User clicking on link 1254 for bringing the entries from task 5 into the worksheet. Each of the entries is shown as a corresponding row in display area 1255 and is shown associated with a corresponding checkbox, which enables the user to select the specific entries to be included in the worksheet. Display area 1255 also enables the users to provide a rating (a number between 1 and 5) for each of the entries based on a criteria. Display area 1255 indicates that the "Basic" criteria (selected in display area 1249) are used for rating the entries according to whether the ideas/entries are bold/sustainable, realistic/quick, hidden gems, human values, personal meaning and a user defined criteria ("Your Criteria"). However, a user may wish to change the criteria used for rating the ideas/entries, and accordingly may select a desired criteria using select field 1257.

An aspect of the present invention facilitates users to select a criteria based on one of the competency modules. FIG. 12G depicts the manner in which IES 150 enables users to select competency-module based criteria for the sixth task of IPM in one embodiment. Display area 1260 depicts a portion of a user interface displayed (as a pop-up window) by IES 150 in response to a user selecting a competency-module based criteria in select field 1257 of FIGS. 12E/12F. Display area 1260 displays a corresponding set of criteria for each competency module (shown as a corresponding row). It may be observed that the set of criteria are different for different competency modules. A user may select the desired competency module (for example, Human Values 1262) by clicking on the "Select this criteria" link shown (below the competency module name) in the corresponding row. IES 150 may accordingly show the selected criteria in display area 1255 in FIG. 12F (instead of the basic criteria), thereby enabling a user to provide ratings for the different ideas/entries based on the selected competency module based criteria.

Another aspect of the present invention facilitates users to select a criteria based on one of the business tasks/processes (sought to be achieved by the innovative work) such as business development, strategic thinking, new product development, quality improvement, marketing etc. FIG. 12H depicts the manner in which IES 150 enables users to select a business task/process based criteria for the sixth task of IPM in one embodiment. Display area 1265 depicts a portion of a user interface displayed (as a pop-up window) by IES 150 in response to a user selecting a business process based criteria in select field 1257 of FIGS. 12E/12F. Display area 1265 displays a corresponding set of criteria for each business task/process (shown as a corresponding row) and enables users to select the desired business process criteria (for example, New Product Development 1268) by clicking on the "Select this criteria" link shown (below the process name) in the corresponding row. A user may accordingly provide ratings for the different ideas/entries based on the selected business process based criteria (in display area 1255 of FIG. 12F).

A user may then use the worksheets (having the selected entries and created themes) and the corresponding ratings provided to the entries/themes based on the criteria to come to a conclusion/outcome of the sixth task. The outcome of the sixth task is typically the selection of an idea for implementation (task 7).

It should be noted that the other tasks not described above such as task 3 "Tap into character", task 4 "Analyze the issues", task 7 "Implement the solutions" and task 8 "Celebrate the results" may be performed similarly to task 1 by creating entries and/or themes related to the specific task, and then using entries/themes and associated information (such as ratings, insights, etc.) to arrive at an outcome for the task. IES 150 enables users to view his/her overall progress for each of the tasks of the selected project as described below with examples.

16. Tracking Progress

Figure 12I:
FIG. 12I depicts the manner in which IES 150 enables users to view the progress of a project in one embodiment.

FIG. 12I depicts the manner in which IES 150 enables users to view the progress of a project in one embodiment. Display area 1270 depicts a portion of a user interface displayed by IES 150 in response to a user selecting "Progress" tab in display area 1110 for viewing the overall progress of the selected project. IES 150 provides to the user for each task (shown as a corresponding row in display area 1270), the number of entries created for the task, the number of themes created for the task, whether each of checkpoints 1 and 2 have been achieved, the percentage completion status, and whether a outcome has been reached (shown in corresponding columns in display area 1270). It may be observed that IES 150 has allowed the user to perform task 5 after task 1 (skipping tasks 2, 3 and 4), since the selected project "Simplifying Work" was specified to be not a certified project (see display area 1120 of FIG. 11A).

Thus, a user may view (display area 1270) the progress of individual projects by either selecting the "Progress" tab in display area 1110 or by clicking the "Progress Report" link shown corresponding to the project in the user interface of FIG. 10D.

It may be appreciated that in the scenario that a selected project is sought to be a certified project (that is, checkbox 1128 in FIG. 11A is selected/enabled), IES 150 may enforce that each task is performed in a strict order. IES 150 may accordingly ensure that a subsequent task (such as task 7) is not performed unless the previous tasks are completed (which may be determined based on the completion status).

FIG. 12J depicts the manner in which IES 150 prevents users from performing out-of-sequence tasks for certified projects in one embodiment. Display area 1280 depicts a portion of a user interface displayed by IES 150 in response to a user selecting "Tab 7" tab in display area 1110 for performing the seventh task "Implement the solution" of the IPM for a selected project and IES 150 determining that the selected project is a certified project and that previous tasks are not completed by the user. Text 1285 indicates to the user that the selected project "Simplifying work" is a certified project requiring the user to follow the tasks in strict order, and that there are still some previous tasks that have not been completed. In other words, the text 1285 indicates that the selection of the Task 7 is out-of-sequence for the certified project.

An aspect of the present invention facilitates an administrator to determine the impact achieved by IPM on an organization or a desired group of users. In one embodiment, the results of IPM are categorized based on the intellectual outputs that can be produced by the innovation process. Each user completing the final task of the IPM may then be required to select one or more types of results they achieved according to the categorization noted above. The administrator may then view individual or composite results (based on the categorization) to determine the impact achieved by IPM.

Thus, IES 150 enables users to perform innovative work by creating personal projects, and then executing the tasks of the IPM as part of the created projects for performing the specific innovative works. The manner in which IES 150 enables users to execute group projects is described below with examples.

17. Executing Group Projects

Figure 13A:

FIGS. 13A-13C together illustrates the manner in which IES 150 enables users to execute group projects in one embodiment. Display area 1300 depicts a portion of a user interface displayed by IES 150 in response to a user selecting tab "Task 1" in display area 1110 for performing the first task of the IPM for a group project. Display area 1310 shows the details of the selected group project such as the name "Simplifying Work", description, started date, last activity and the workgroup contact.

Display area 1320 is shown containing interface elements similar to display area 1130 of FIG. 11B, and accordingly their description is not repeated here for conciseness. However, it may be observed that each entry has a value for an additional column "Contributor" which indicates the user who contributed the entry to the task. Furthermore, two ratings are shown for each entry, a rating provided by the user (as indicated by the "My" text) and an average rating provided by all the users of the workgroup (as indicated by the "All" text). Similar to a personal project, a user may create new entries, group them by themes, provide ratings for the entries/themes and then come to a conclusion/outcome based on the entries/themes, their corresponding ratings as well as the average ratings displayed for the entry. A user may rate the entries contributed by others, thereby collaborating with other users to arrive at the outcome. However, unlike a personal project, each task may have multiple outcomes, as indicated by the number in box 1330 shown alongside the outcome text field.

Referring to FIG. 13B, display area 1350 depicts a user interface for creating worksheets for a group project as part of the sixth task of IPM. Display area 1350 is similar to display area 1250 of FIG. 12F (for a personal project) and provides the same functionality. In addition, display area 1350 enables the user to rate the entries contributed by others and also displays the average rating of the group.

It may be appreciated that an administrator creating the workgroup project may have selected/enabled only some of the tasks of the IPM to be performed as part of the project. IES 150 accordingly enforces that the users do not perform the tasks that have not been enabled by the administrator. Referring to FIG. 13C, display area 1380 depicts a portion of a user interface displayed by IES 150 in response to a user selecting "Tab 7" tab in display area 1110 for performing the seventh task "Implement the solution" of the IPM for a selected group project and IES 150 determining that the selected task is not enabled for the selected group project. Text 1385 indicates to the user that the selected task has not been enabled by the administrator of the workgroup, who created the selected group project.

Thus, IES 150 enables a user to perform innovative work by creating and executing projects according to the innovation process model (IPM). In accordance with one embodiment, the IES uses an 8-task innovation process model, although a greater or lesser number of tasks may be employed. It may be appreciated that the guidance provided by the IPM enables even non-specialist users to be more innovative. The manner in which IES 150 enables users to collaborate with other users using workgroups is described below with examples.

18. User Interfaces for Collaborating with Other Users

FIGS. 14A-14G and 15A-15J1 together depicts the manner in which IES 150 enables users to collaborate with other users in one embodiment. Each of the Figures is described in detail below.

Figure 14A:
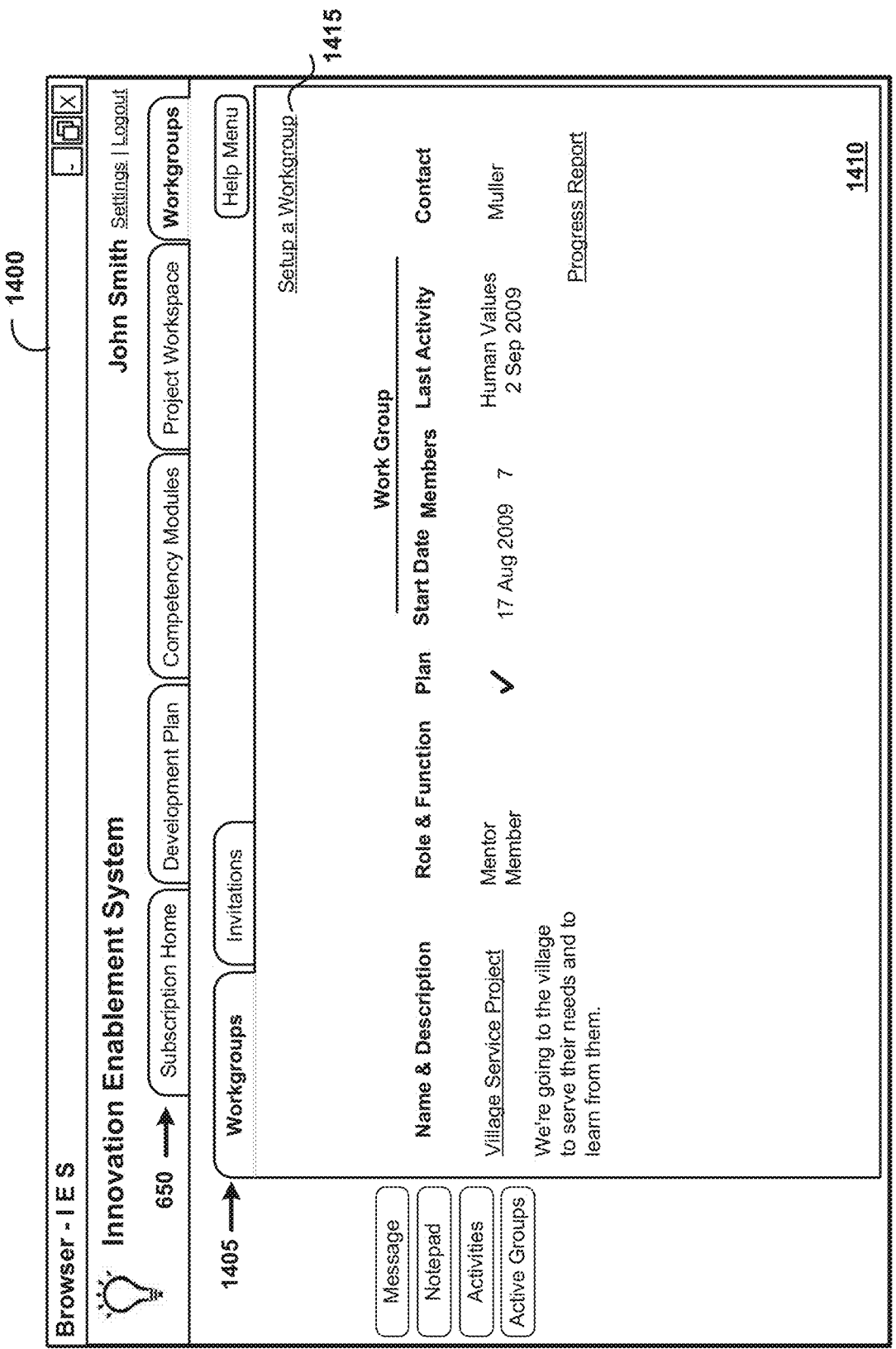
FIG. 14A depicts the manner in which IES 150 enables users to access personal workgroups in one embodiment.

FIG. 14A depicts the manner in which IES 150 enables users to access personal workgroups in one embodiment. Display area 1400 there depicts a portion of a user interface displayed by IES 150 in response to a user clicking the "Workgroups" tab in display area 650 (after selecting the "IEEE Engineering" subscription in FIG. 6B) for collaborating with other users.

Display area 1405 contains tabs corresponding to the specific activities that may be performed for performing collaborative work. A user may select the desired activity to be performed by clicking the corresponding tab. Display area 1405 indicates that the User has selected the "Workgroups" tab (shown in bold) for managing workgroups.

Display area 1410 displays the list of workgroups in which the User is a member. In particular, IES 150 provides to the user for each workgroup (shown as a corresponding row in display area 1410), the workgroup name and description, the role and function of the user in the workgroup, an icon for adding the workgroup to the user's self development plan, the date when the workgroup was started, the number of current members of the workgroup, the last activity performed by the user for the workgroup, the contact person for the workgroup and a link for viewing the progress report of the workgroup (shown in corresponding columns in display area 1410). A user may click on the corresponding progress report link to view the progress of workgroup in performing various activities, and in response IES 150 may display a user interface as shown in 1590 of FIG. 15J and in 15J1 described in below sections. A user may create a new workgroup by clicking on the "Setup a Workgroup" link (1415).

Figure 14B:
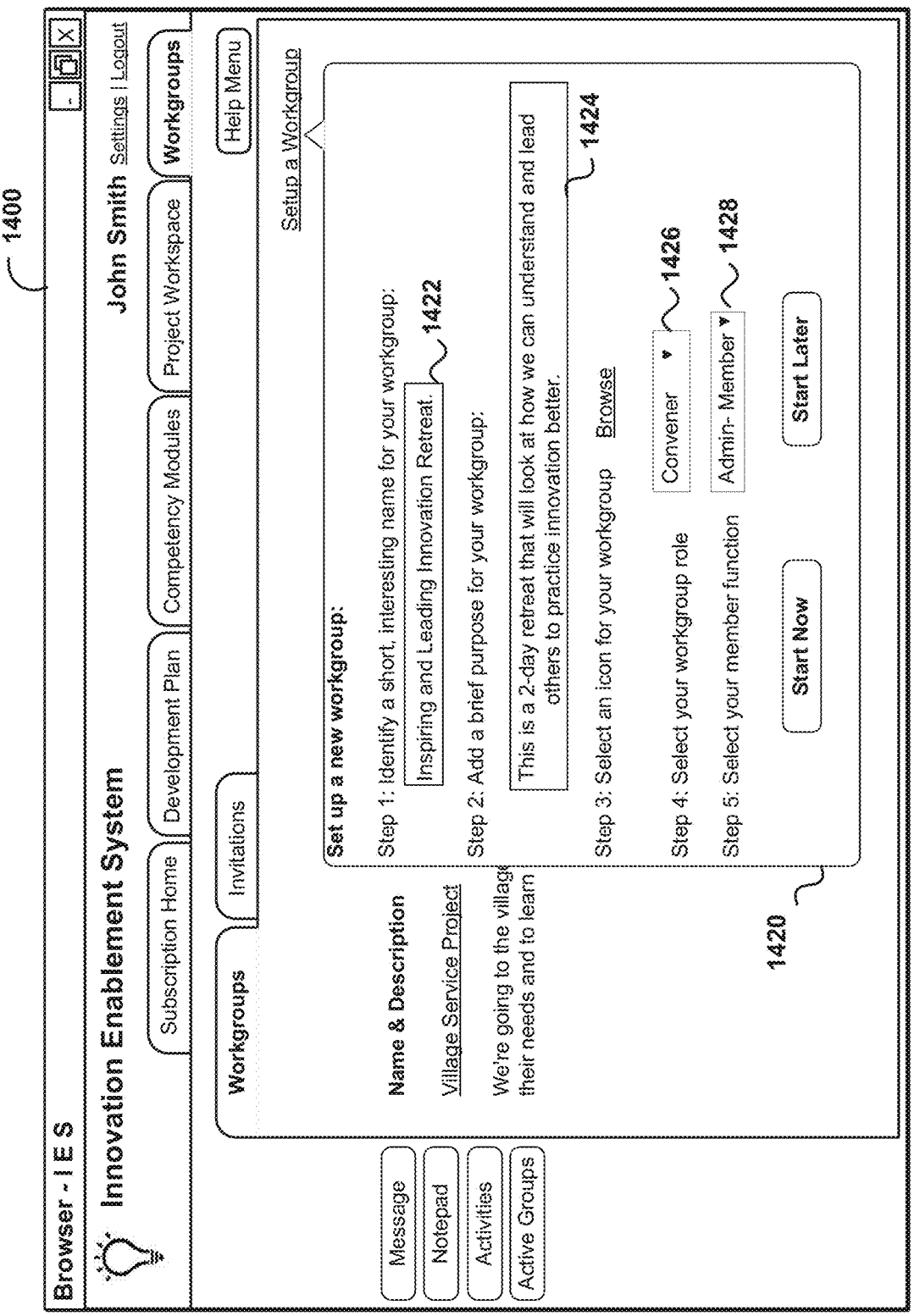
FIG. 14B depicts the manner in which IES 150 enables users to create new workgroups in one embodiment.

FIG. 14B depicts the manner in which IES 150 enables users to create new workgroups in one embodiment. Display area 1420 depicts a portion of a user interface displayed by IES 150 in response to the User selecting link 1415 in display area 1410 for creating a new workgroup. A user may specify a desired name (text field 1422) and a desired purpose (text field 1424) and also select the role and function of the user in the workgroup (select fields 1426 and 1428). The role of the user indicates the manner in which the user participates in the workgroup and may be one of (but not limited to) a member, manager, convener, coach, project leader, developer, decision maker, mentor, researcher, etc. The function of the user may be one of (but not limited to) a member (who takes part in the activities of the group), a viewer (who only views the status of the activities), an administrator (who manages the workgroup), etc.

The user may then click on the "Start Now" or "Start Later" button to create the new workgroup. In the scenario that the "Start Now" button is selected, the user interface of FIG. 14D is displayed to the user. When the "Start Later" button is selected, display area 1410 of FIG. 14A is again displayed to the user with the newly created workgroup added to the display area. A user may then click on the desired one of the workgroup (provided as links) to select the workgroup in which innovate work is sought to be executed.

It is noted that a user creating a workgroup is also a member of the group. A user may also receive invitations to join other workgroups, the invitations typically being received from the corresponding administrators, and then accept or decline the invitations based on which specific workgroups the user wishes to join as described in detail below.

Figure 14C:
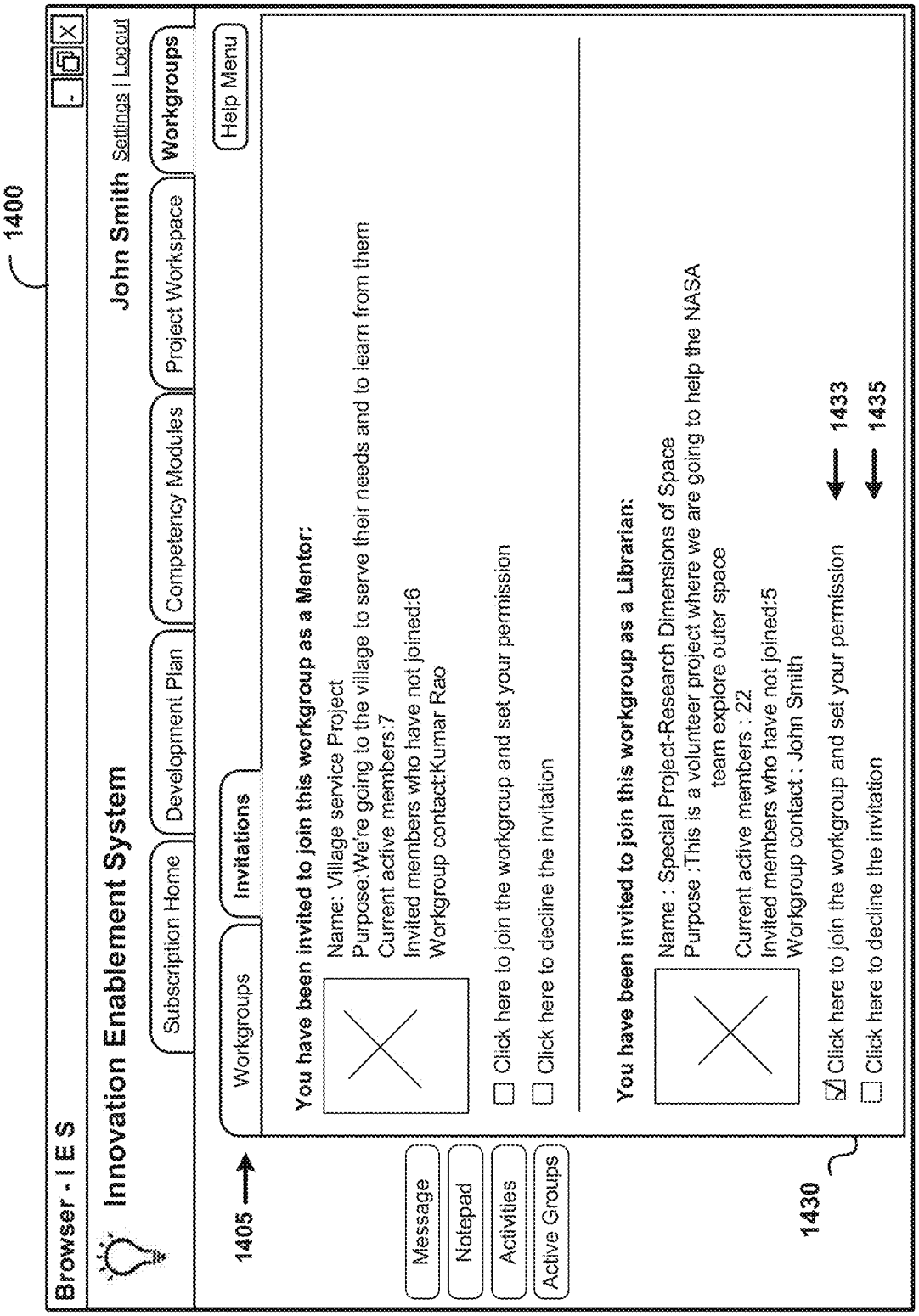
FIG. 14C depicts the manner in which IES 150 enables users to join workgroups created by other users in one embodiment.
Figure 14D:
FIG. 14D depicts the manner in which IES 150 enables users to set the setting for a workgroup in one embodiment.

FIG. 14C depicts the manner in which IES 150 enables users to join workgroups created by other users in one embodiment. Display area 1430 depicts a portion of a user interface displayed by IES 150 in response to a user selecting "Invitations" tab in display area 1405 for viewing the invitations received from other workgroups (not including the workgroups created by the user). Display area 1430 is shown displaying two invitations received for joining two different groups. The user may either accept or decline each invitation by clicking on the respective links 1433 and 1435 shown below each invitation. Display area 1430 indicates that the user has accepted the invitation for the workgroup named "Special Project—Research Dimensions of Space". In response, IES 150 may display the display area 1468 (described in detail below) as a pop-up window to enable the user to set the user's personal settings for the newly joined workgroup. The accepted workgroups may also be displayed in display area 1410 in FIG. 14A.

A user may click on the desired one of the workgroup names (provided as links) to select the workgroup in which the user wishes to participate and/or manage. The manner in which IES 150 enables users to collaborate with other users by participating and/or managing workgroups is described below with examples.

FIG. 14D depicts the manner in which IES 150 enables users to set the settings for a workgroup in one embodiment. Display area 1440 depicts a portion of a user interface displayed by IES 150 in response to the User selecting a workgroup (by clicking on the corresponding workgroup name link) in display area 1410 of FIG. 14A for participation/management. Display area 1445 shows the details such as the name "Village Service Project", the purpose, the total number of members, and the contact member of the selected workgroup.

Display area 1450 contains tabs corresponding to the specific activities that may be performed for the selected workgroup such as the setting the personal/group properties of the selected workgroup, managing the members of the workgroup, configuring and/or performing group activities, and viewing the overall progress of the workgroup. A user may select the desired activity to be performed by clicking the corresponding tab. Display area 1450 indicates that the User has selected the "Settings" tab (shown in bold) for performing the activity of setting the properties of the selected workgroup. IES 150 may accordingly display the portion of the user interface shown in display area 1460.

Display area 1460 enables the users to set the personal/group properties for the selected workgroup. In particular, display area 1464 enables the user to modify the settings of the workgroup created by the user/administrator such as the maximum number of members allowed, whether the members can send invitations for the workgroup, can update goals of the workgroup, can select and manage group activities, etc. Display area 1468 enables the user to set the user's personal settings for the selected workgroup such as whether other users can view the user's group progress, can view the user's assessment results (personal dashboard) for each of the competency modules, etc. It may be appreciated that the settings of display area 1464 may be displayed only to administrators of the workgroup, while members and viewers may be shown only the settings of display area 1468. A user may accordingly set the appropriate settings for the selected workgroup.

Figure 14E:
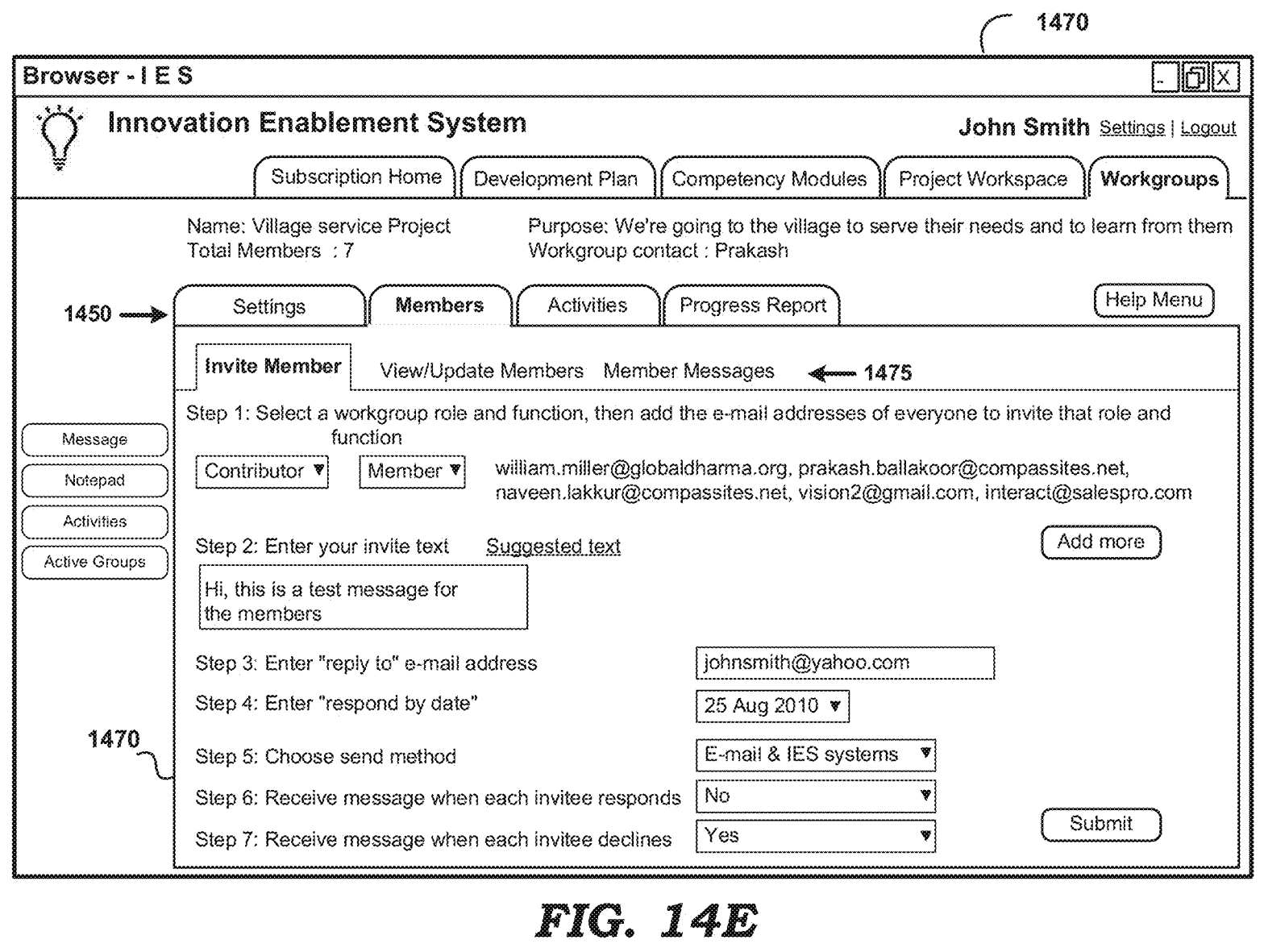

FIG. 14E depicts the manner in which IES 150 enables users to invite other users to join a workgroup in one embodiment. Display area 1470 depicts a portion of a user interface displayed by IES 150 in response to a user selecting the "Members" tab in display area 1450 for managing members of the selected workgroup. Display area 1475 contains tabs corresponding to the specific activities that may be performed as part of managing users, such as inviting members, view/update members, and send/receive messages from other members.

Display area 1475 indicates that the user has selected the "Invite Members", and accordingly display area 1470 provides an interface for inviting users to join the selected workgroup. In particular, IES 150 enables the user to specify the users to be invited (by their respective email ids) for a specific role and/or function, a text message to be sent as the invitation, whether the invitations are to be sent by email and/or by IES (which then displays the invitations in display area 1430 of FIG. 14C), a date before which a response (accept/decline) to the invitation is to be provided by the users, etc. An administrator of the group (or a member of the workgroup based on the workgroup settings specified in display area 1464) may specify the desired set of users and then click on the "Submit" button in display area 1470 to send the invitations to the desired users. The administrator may then wish to view (and/or update) the members of the selected workgroup.

Figure 14F:
FIG. 14F depicts the manner in which IES 150 enables users to view and/or manage members of a workgroup in one embodiment.

FIG. 14F depicts the manner in which IES 150 enables users to view and/or manage members of a workgroup in one embodiment. Display area 1480 depicts a portion of a user interface displayed by IES 150 in response to a user selecting the "View/Update Members" tab in display area 1475 for viewing/updating the members of the selected workgroup. Display area 1480 displays a list of members of the selected workgroup and the details of each member such as the name, email id, the role, function, status, date of joining, etc. Though not shown for conciseness, display area 1480 enables an administrator of the selected workgroup to change the details such as the role, function and status of the members.

FIG. 14G depicts the manner in which IES 150 enables users to view and/or send messages to other members of a workgroup in one embodiment. Display area 1490 depicts a portion of a user interface displayed by IES 150 in response to a user selecting the "Member Messages" tab in display area 1475 for sending/receiving messages from/to other members of the selected workgroup. Display area 1475 accordingly provides fields for selecting the member to whom a message is sought to be sent, the subject line of the message, the content of the message, to indicate whether the messages are to be sent by email and/or by IES, a date before which a response to the message is requested, etc. A user may click on the "Submit" button to send the message to the desired members of the workgroup.

Thus, a user/administrator is enabled to form the desired groups of users by invitations and then managing the members (users who have accepted the invitations) of the groups. IES 150 also enables users/administrators to configure the activities to the performed by the members as a group, as described below with examples.

19. Configuring Activities for a Workgroup

Figure 15A:
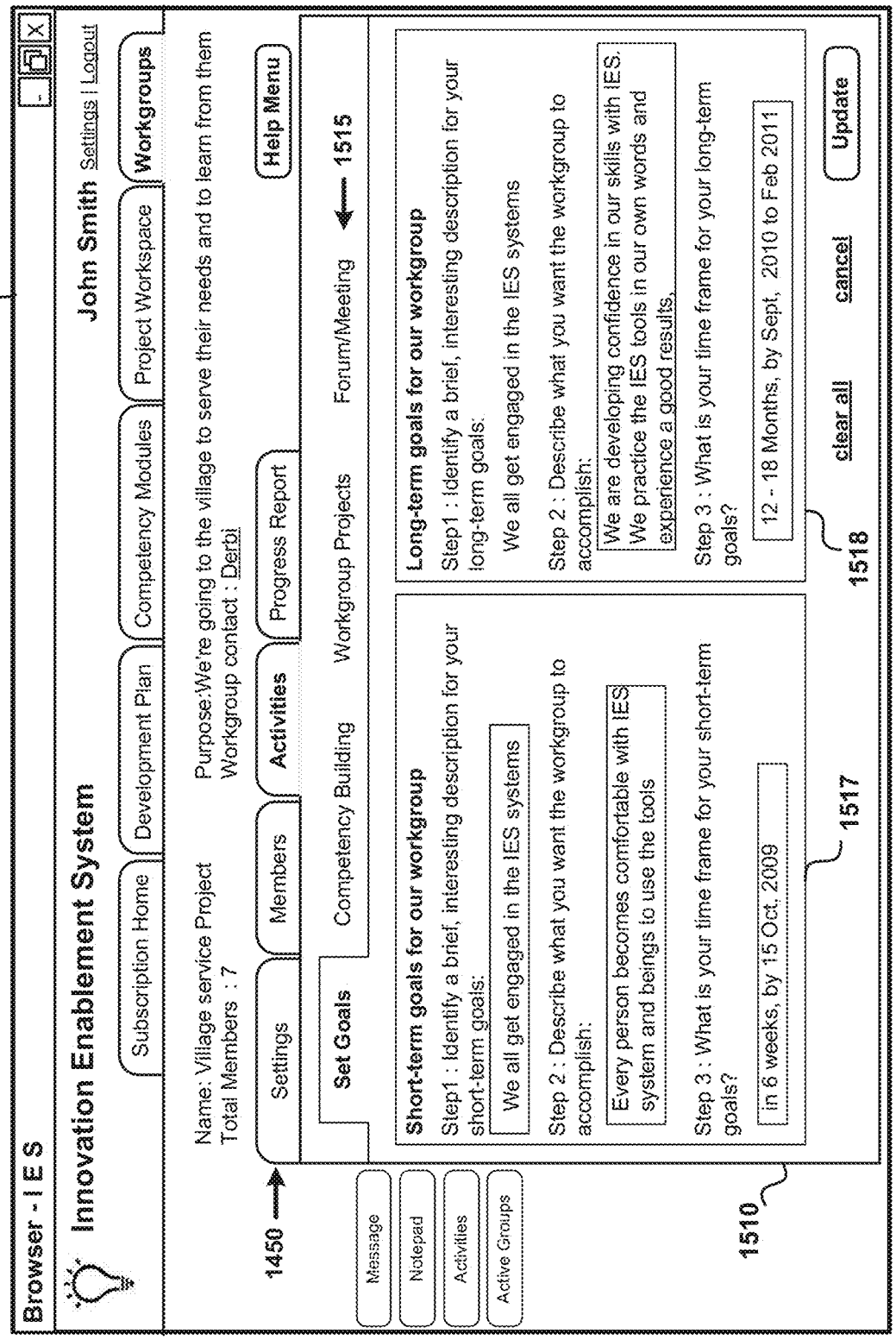
FIG. 15A depicts the manner in which IES 150 enables an administrator to set goals for a workgroup in one embodiment.

FIGS. 15A-15J1 together depicts the manner in which IES 150 enables an administrator to configure the activities to be performed by the members of a workgroup in one embodiment. Each of the Figures is described in detail below.

FIG. 15A depicts the manner in which IES 150 enables an administrator to set goals for a workgroup in one embodiment. Display area 1510 depicts a portion of a user interface displayed by IES 150 in response to a user selecting the "Activities" tab in display area 1450 for configuring the activities to be the performed by members of the selected workgroup. Display area 1515 contains tabs corresponding to the specific configurations that may be performed for the selected workgroup.

Display area 1515 indicates that the user has selected the "Set Goals" tab, and accordingly display area 1510 provides an interface for setting the goals of the workgroup. A administrator may specify the desired short term goals (in display area 1517) and the desired long term goals (in display area 1518) and then click on "Update" button, to set the goals of the selected workgroup.

Figure 15B:
FIG. 15B depicts the manner in which IES 150 enables an administrator to configure the competencies to be developed as a group in one embodiment.

FIG. 15B depicts the manner in which IES 150 enables an administrator to configure the competencies to be developed as a group in one embodiment. Display area 1520 depicts a portion of a user interface displayed by IES 150 in response to a user selecting the "Competency Building" tab in display area 1515. Display area 1520 shows a list of the competency modules accessible in the system, and enables the administrator to select the desired competency modules and also select the specific activities (take assessments, view results, study learning units, apply to tasks) to be performed for each of the competency modules.

Display area 1520 indicates that the administrator has configured that the members of the group have to perform two assessment activities (e.g., take two assessments or take personal assessment and view the group results), 4 learning unit activities (e.g., study four learning units), and 3 application task activities (e.g., do three toolkits) for the Human Values competency module. The administrator has similarly configured activities for the other competency modules as well. The administrator may select the desired competency module to configure the activities by clicking on the corresponding name.

FIGS. 15C and 15D depict the manner in which IES 150 enables an administrator to select the specific activities to be performed for a competency module in one embodiment. Display area 1530 of FIG. 15C depicts a portion of a user interface displayed (as a pop-up window) by IES 150 in response to the User clicking on the "Human Values" competency module link in display area 1520. Display area 1535 contains tabs that enable the user/administrator to either manage/configure the activities or engage in/perform the configured activities. Display area 1535 indicates that the user has selected the "Manage activities" for configuring the activities of the workgroup for the Human Value competency module. It should be noted that the "Manage activities" tab may not be provided/enabled for members who are not administrators, and accordingly cannot configure the activities for other members of the group.

Display area 1538 accordingly enables the administrator to select the specific activities such as whether the members need to take the assessment for the Human Values competency module, need to view the workgroup results, etc. The selected checkboxes in display area 1538 indicate that the specific activities that have to be performed by the members of the group. It may be appreciated the above configured activities are related to the second step of the learning methodology, namely, view (personal and) group results.

An administrator may similarly configure the learning units that have to be studied by the members of the group. Referring to FIG. 15D, display area 1540 depicts a portion of a user interface display by IES 150 for enabling an administrator to configure the learning units to be studied for a selected competency module (Human Values). Display area 1545 enables the user to recommend learning units and to enable/check the corresponding checkbox to ensure that all the members of the groups access/study the recommended learning units.

Though not shown, IES 150 may provide interfaces similar to that shown in FIGS. 15C and 15D for configuring the other activities (such as the specific toolkits to be accessed) of the selected competency module.

Figure 15E:
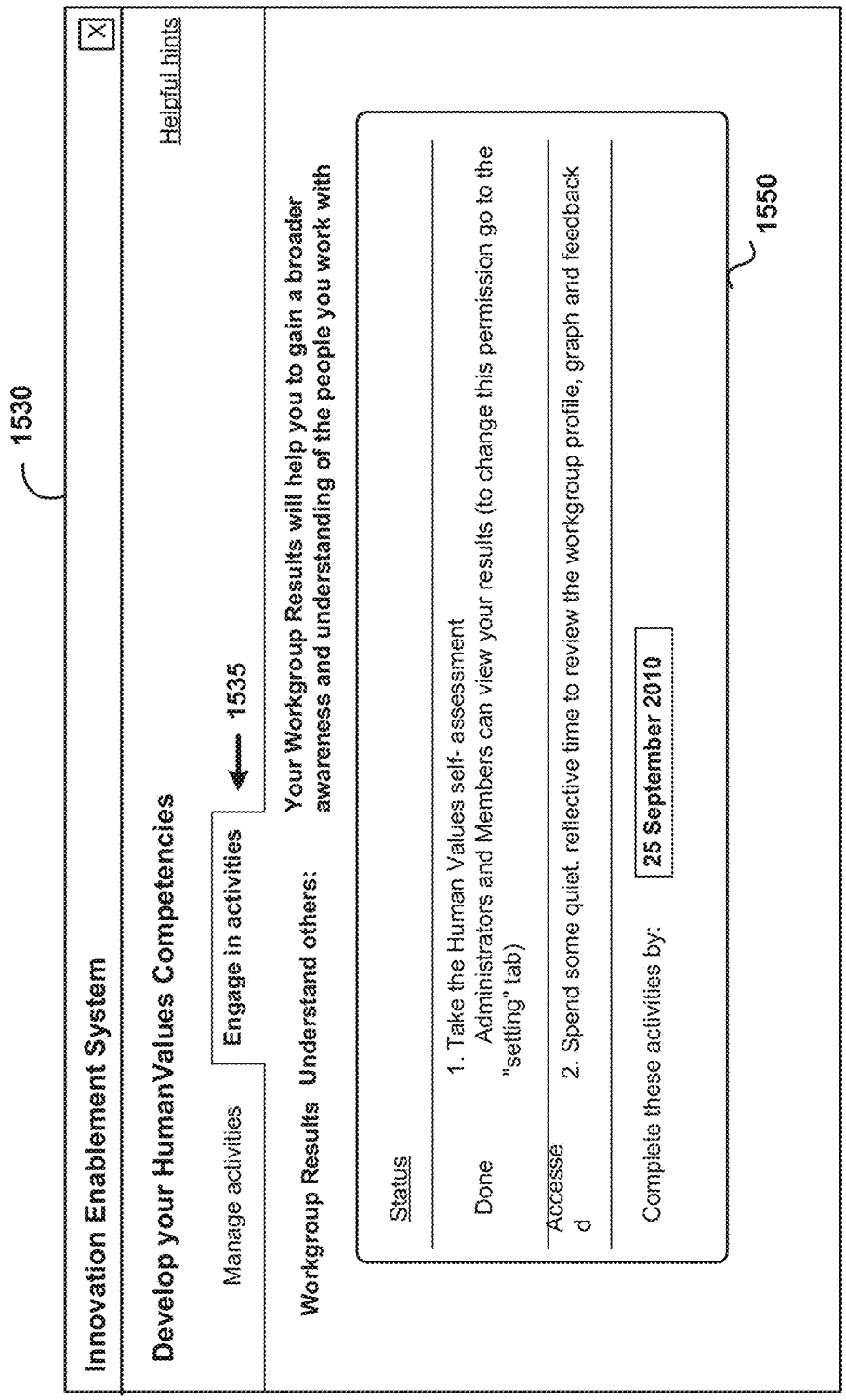
FIG. 15E depicts the manner in which IES 150 enables members of a workgroup to perform the configured competency activities in one embodiment.

FIG. 15E depicts the manner in which IES 150 enables members of a workgroup to perform the configured competency activities in one embodiment. Display area 1550 depicts a portion of a user interface displayed by IES 150 in response to a user selecting the "Engage in activities" tab in display area 1535. It may be observed that the set of activities configured in display area 1538 in FIG. 15C and 1545 in FIG. 15D are now displayed as selectable items in display area 1550 along with the current status (such as done, accessed, etc.) of the activity. A member may select one of the activities and IES 150 in response may provide user interfaces similar to that described above with respect to developing innovation competency to enable the user to perform the selected activity. For example, in response to the member selecting the first activity (shown with the serial number 1), IES 150 may provide the interfaces of FIGS. 7C-7E to enable the member to take the assessment for the Human Values competency module.

Figure 15F:
FIG. 15F depicts the manner in which IES 150 enables an administrator to configure the innovative work to be performed by the members of a workgroup in one embodiment.

FIG. 15F depicts the manner in which IES 150 enables an administrator to configure the innovative work to be performed by the members of a workgroup in one embodiment. Display area 1560 depicts a portion of a user interface displayed by IES 150 in response to a user selecting the "Workgroup Projects" tab in display area 1515 for creating group projects. Display area 1560 displays the list of the group projects already created and also enable a user/administrator to create a new project by clicking the "Setup a project" link 1565.

FIGS. 15G and 15H together depict the manner in which IES 150 enables an administrator to create a group project (for performing innovative work) in one embodiment. Display area 1570 of FIG. 15G depicts a portion of a user interface displayed (as a pop-up window) by IES 150 in response to a user clicking on link 1565 for creating a group project. The administrator may specify a name and a corresponding description for the new project in the text fields shown in display area 1570. The administrator may then click on the "Set the workgroup permission link" (step 4) to set the permissions for the new project. In response, IES 150 may show display area 1575, which enables the administrator to configure the permissions for the new project.

Referring to FIG. 15H, display area 1578 depicts a portion of a user interface displayed by IES 150 in response to the administrator clicking the "Set the project tasks you want your workgroup to perform" (step 5) in display area 1570. Display area 1578 enables the administrator to select the specific sub-set of tasks (from the set of 8 tasks) of the IPM that are to be performed by the members of the group for the new project. It may be observed that display area 1578 indicates that only the first 4 tasks of the IPM are to be performed for the newly created project. IES 150 may accordingly ensure that the unselected/disabled tasks are not performed by the members of the workgroup. IES 150 accordingly may display the user interface of FIG. 13C when a user of the workgroup tries to access the disabled tasks when executing the newly created group project.

Figure 15I:
FIG. 15I depicts the manner in which IES 150 enables an administrator to configure forums/meetings for the members of a workgroup in one embodiment.
Figure 15J:
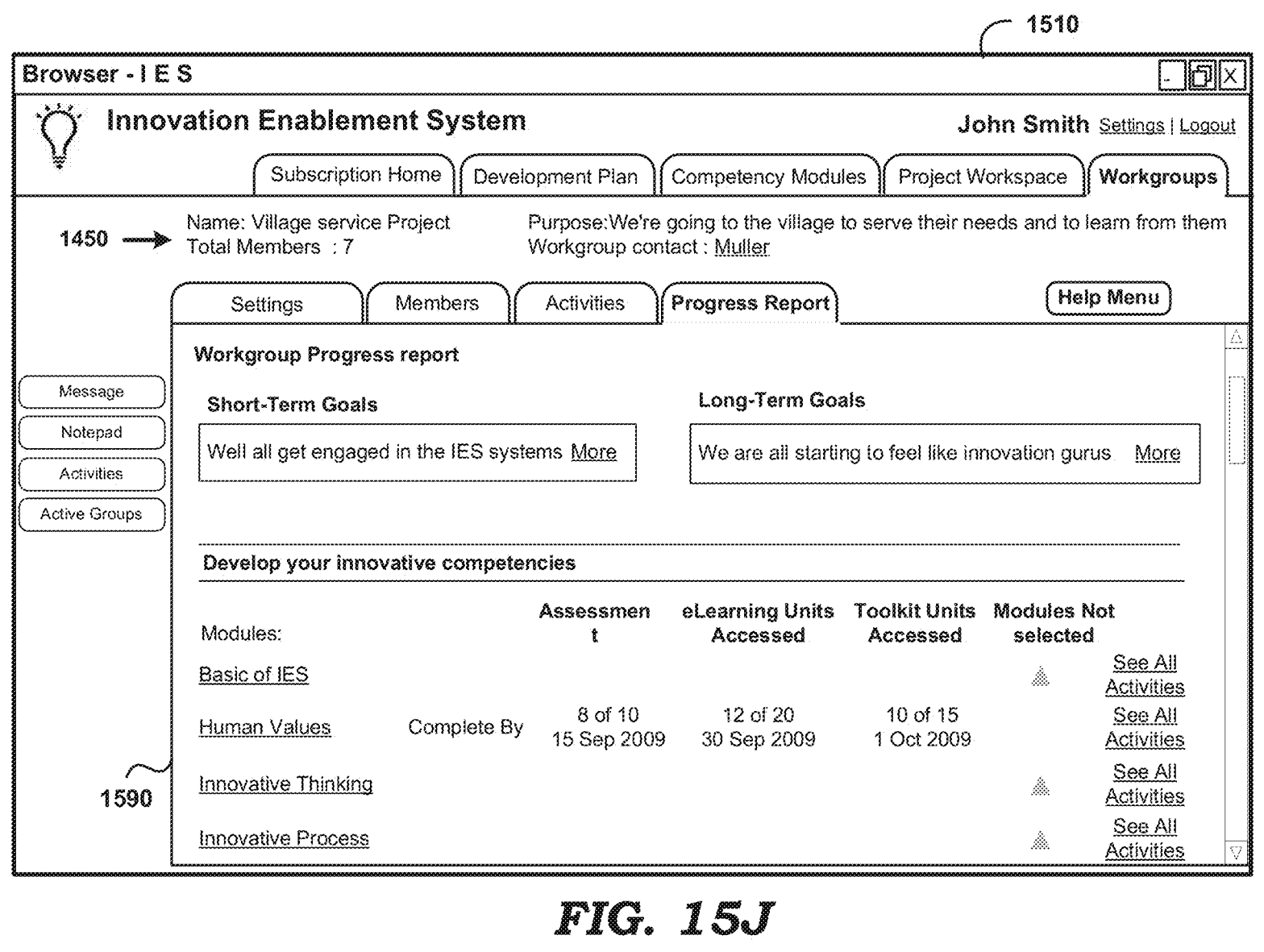

FIG. 15I depicts the manner in which IES 150 enables an administrator to configure forums/meetings for the members of a workgroup in one embodiment. Display area 1580 depicts a portion of a user interface displayed by IES 150 in response to a user selecting the "Forum/Meeting" tab in display area 1515. Display area 1580 accordingly is shown providing various fields for setting up a workgroup meeting. Similar interfaces may be provided by IES for creating a forum, as will be apparent to one skilled in the arts.

FIGS. 15J and 15J1 together depicts the manner in which IES 150 enables an administrator to view the progress of the configured activities for the workgroup in one embodiment. Display area 1590 of FIG. 15J depicts a portion of a user interface displayed by IES 150 in response to a user selecting the "Progress Report" tab in display area 1450 for viewing the progress of the workgroup. Display area 1590 of FIG. 15J1 may be displayed when the user scrolls down the display area using the scrollbar shown there.

Display area 1590 displays the status of each of the activities configured by the administrator such as the number of members who have completed each of the activities (such as the text "8 of 10" for assessments taken for the Human Values competency module). Display area 1590 also indicates the number of entries made by the members for each of the group projects, and also the status of the workgroup meeting setup by the administrator.

Thus, IES 150 enables users to collaborate with other users by forming workgroups, configuring activities to be performed as a group, performing the configured activities and keeping track of the progress of the group. The manner in which IES 150 enables users to implement self development plans is described below with examples.

20. User Interfaces for Implementing Self Development Plans

Figure 16B:
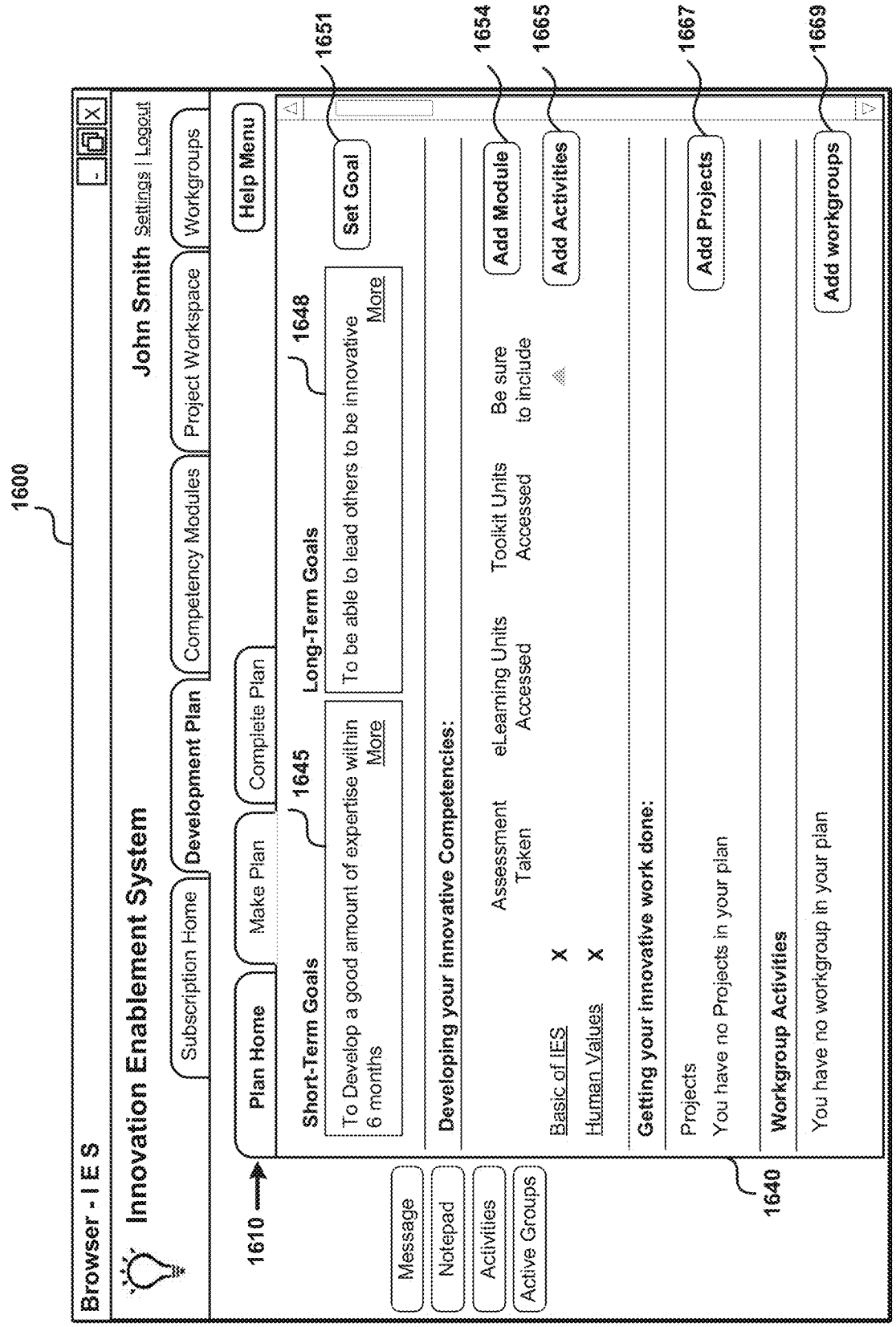
Figure 16C:
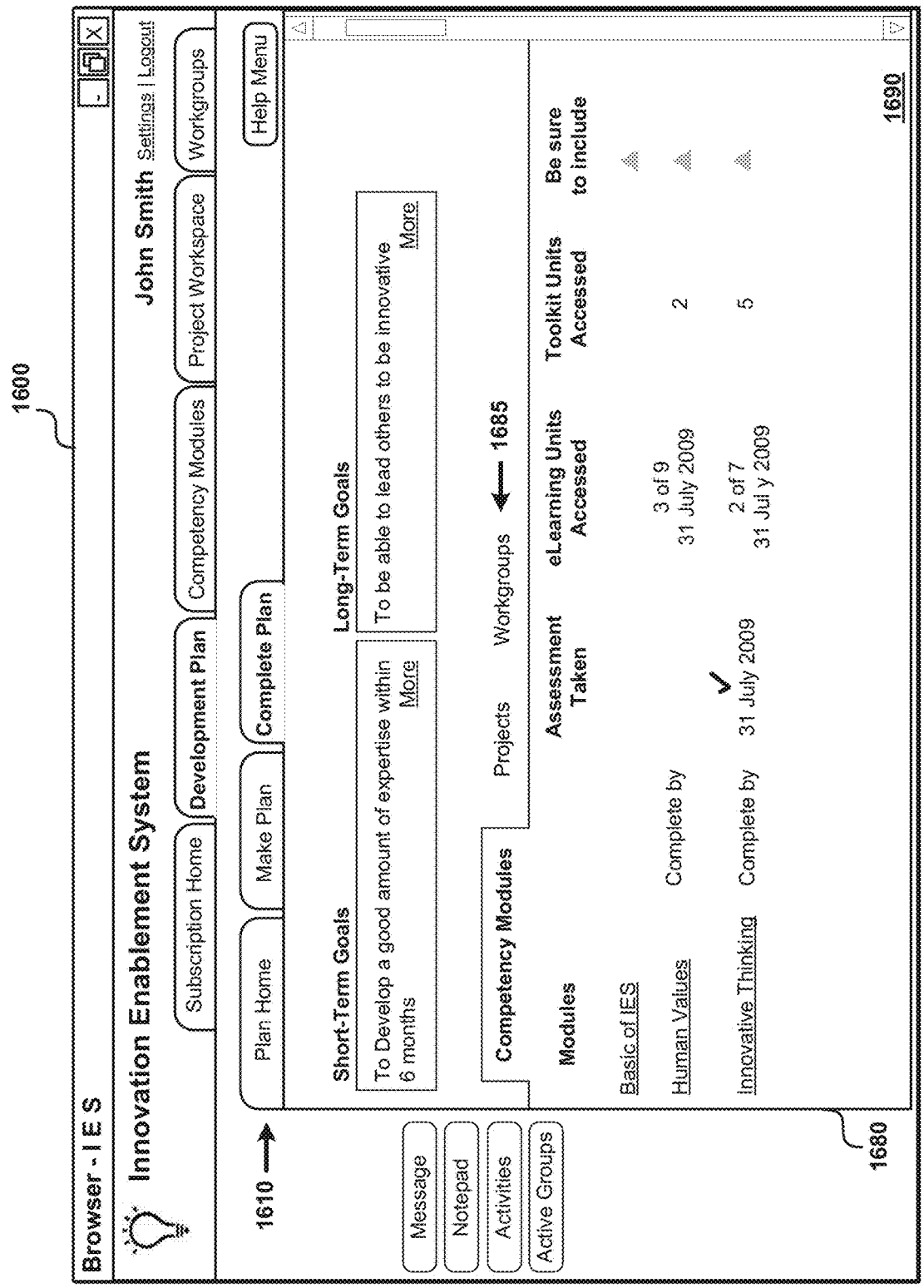

FIGS. 16A-16C together illustrates the manner in which IES 150 enables users to implement (make and complete) a self development plan in one embodiment. Each of the Figures is described in detail below.

Referring to FIGS. 16A and 16A1, display area 1600 of FIG. 16A depicts a portion of a user interface displayed by IES 150 in response to a user clicking the "Development Plan" tab in display area 650 (after selecting the "IEEE Engineering" subscription in FIG. 6B) for implementing a self development plan related to that subscription.

Display area 1610 contains tabs corresponding to the specific activities that may be performed for implementing a self development plan. A user may select the desired activity to be performed by clicking the corresponding tab. Display area 1610 indicates that the User has selected the "Plan Home" tab (shown in bold) for performing the activity of viewing the overall progress of the self development plan (made earlier by the user).

Display area 1620 of FIG. 16A depicts a portion of the user interface displayed by IES 150 in response to the selection of the "Plan Home" tab. Display area 1620 of FIG. 16A1 may be displayed when the user scrolls down the display area using the scrollbar shown there.

Broadly, a self development plan for a user may include activities for developing desired innovation competencies (display area 1630), for performing innovative works (display area 1635), and for taking part in desired workgroups (display area 1638). The activities may be targeted to achieving specific personal goals of the user, as indicated by the short-term/long-term goals shown in display areas 1625 and 1628. Display areas 1630, 1635 and 1638 are respectively similar to display area 710 of FIG. 7A, display area 1050 of FIG. 10D, display area 1410 of FIG. 14A and accordingly their description is not repeated here for conciseness.

Referring to FIG. 16B, display area 1640 depicts a portion of a user interface displayed by IES 150 in response to a user clicking the "Make Plan" tab in display area 1610 for making the self development plan. Display area 1640 provides an interface similar to display area 1620 in FIG. 16A and in addition provides various buttons for adding/removing activities from the self development plan of the user.

Thus, a user may specify his/her short term/long term goals in text fields 1645 and 1648 and then click on "Set Goal" button 1651 to set the goals for the development plan. The user may add the desired competency modules by clicking on "Add Modules" button 1654 (which may display an interface similar to display area 1538 in FIG. 15C), add activities for each competency module by clicking "Add Activities" button 1655 (which may display a interface similar to display area 1545 in FIG. 15D), and remove competency modules from the plan by clicking on the "X" button shown along with the competency module names. The user may similarly add desired projects by clicking the "Add Projects" button 1667 (which may display 1070 in FIG. 10E) and add desired workgroups by clicking the "Add Workgroups" button 1669 (which may display 1420 in FIG. 14B).

Thus, a user is enabled to create a self development plan. The user may then perform the activities included in the development plan as described in detail below.

Referring to FIG. 16C, display area 1680 depicts a portion of a user interface displayed by IES 150 in response to a user clicking the "Complete Plan" tab in display area 1610 for performing the activities included in the self development plan. Display area 1680 is shown displaying the short term and long term goals of the user.

Display area 1685 contains tabs for performing the activities of accessing competency modules (for developing innovation competency), doing projects (for performing innovative work) and accessing workgroups (for collaborating with other users). Display area 1685 indicates that the user has selected (as indicated in bold) the tag "Competency Modules" for developing innovation competency.

Display area 1690 accordingly enables the user to select the desired competency modules and to perform the learning methodology (take assessment, view personal/group results, study learning units, apply to work tasks) for the selected competency module. A user may be enabled to similarly access projects for performing the innovative work and access workgroups for collaborating with other users.

Thus, IES 150 enables the user "John Smith" to perform the activities of developing innovation competency, performing innovative work, collaborating with other users and implementing self-development plans for the selected subscription "IEEE Engineering". The user may select another subscription from the list of subscription shown in display area 670 of FIG. 6B (by selecting the corresponding radio button shown along with the subscription name) and then perform the different activities similar to that described above.

It should be further appreciated that the features described above can be implemented in various embodiments as a desired combination of one or more of hardware, executable modules, and firmware. The description is continued with respect to an embodiment in which various features are operative when executable modules are executed.

21. Digital Processing System

Figure 17:
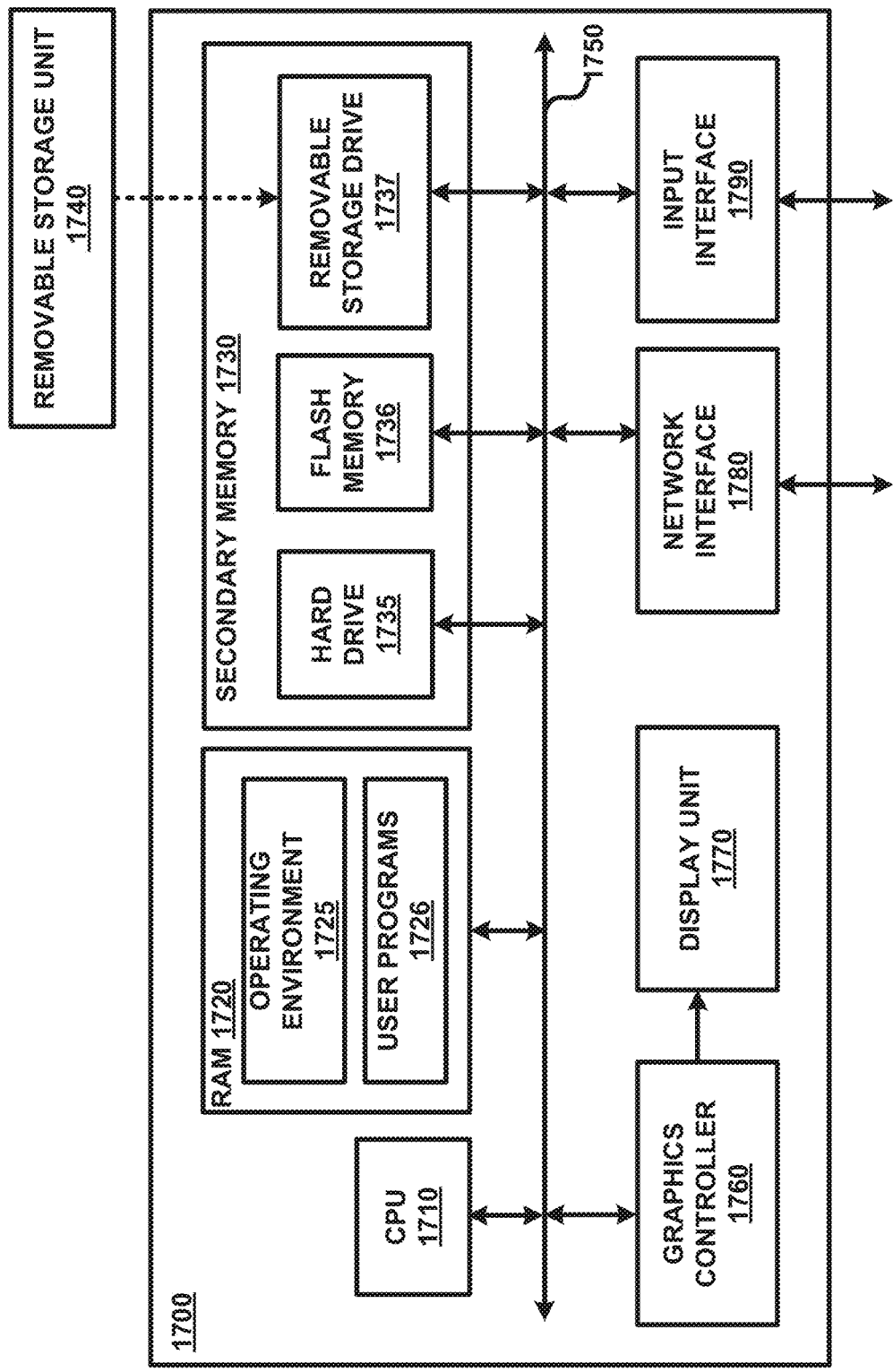
FIG. 17 is a block diagram illustrating the details of a digital processing system in which various aspects of the present invention are operative by execution of appropriate executable modules.

FIG. 17 is a block diagram illustrating the details of an example of a digital processing system 1700 in which various aspects of the present invention are operative by execution of appropriate executable modules. Digital processing system 1700 may correspond to innovation enablement system (IES) 150 or any system (such as server system 160A-160F) implementing the features described above.

Digital processing system 1700 may contain one or more processors such as a central processing unit (CPU) 1710, random access memory (RAM) 1720, secondary memory 1730, graphics controller 1760, display unit 1770, network interface 1780, and input interface 1790. All the components except display unit 1770 may communicate with each other over communication path 1750, which may contain several buses as is well known in the relevant arts. The components of FIG. 17 are described below in further detail.

CPU 1710 may execute instructions stored in RAM 1720 to provide several features of the present invention. CPU 1710 may contain multiple processing units, with each processing unit potentially being designed for a specific task. Alternatively, CPU 1710 may contain only a single general-purpose processing unit.

RAM 1720 may receive instructions from secondary memory 1730 using communication path 1750. RAM 1720 is shown currently containing software instructions constituting operating environment 1725 and/or other user programs 1726 (such as applications, web/application server software, RDBMS, etc.). In addition to operating environment 1725, RAM 1720 may contain other software programs such as device drivers, virtual machines, etc., which provide a (common) run time environment for execution of other/user programs.

Graphics controller 1760 generates display signals (e.g., in RGB format) to display unit 1770 based on data/instructions received from CPU 1710. Display unit 1770 contains a display screen to display the images defined by the display signals (for example, portions of the user interfaces shown in FIGS. 6A through 16C). Input interface 1790 may correspond to a keyboard and a pointing device (e.g., touchpad, mouse) and may be used to provide inputs (for example, the inputs shown in FIGS. 6A through 16C). Network interface 1780 provides connectivity to a network (e.g., using Internet Protocol), and may be used to communicate with other systems connected to network 120 such as user systems 120A-120X, server systems 160A-160F and data stores 180A-180D.

Secondary memory 1730 may contain hard drive 1735, flash memory 1736, and removable storage drive 1737. Secondary memory 1730 may store the data (for example, the details of the competency modules, assessments, learning units, toolkits, etc.) and software instructions (for example, implementing the program logic of the flowcharts shown in FIGS. 2, 3, 4 and 5), which enable digital processing system 1700 to provide several features in accordance with the present invention.

Some or all of the data and instructions may be provided on removable storage unit 1740, and the data and instructions may be read and provided by removable storage drive 1737 to CPU 1710. Floppy drive, magnetic tape drive, CD-ROM drive, DVD Drive, Flash memory, removable memory chip (PCMCIA Card, EPROM) are examples of such removable storage drive 1737.

Removable storage unit 1740 may be implemented using medium and storage format compatible with removable storage drive 1737 such that removable storage drive 1737 can read the data and instructions. Thus, removable storage unit 1740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1740 or hard disk installed in hard drive 1735. These computer program products are means for providing software to digital processing system 1700. CPU 1710 may retrieve the software instructions, and execute the instructions to provide various features of the present invention described above. It should also be noted that the terms "computer" and "computer system" used herein encompass "smart" phones, electronic tablets and other such devices capable of loading and processing computer applications.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

22. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

A "dynamic system" describes "a regularly interacting or interdependent group of items forming a unified whole, a group of related forces" that is "marked by usually continuous and productive activity or change" (Merriam Webster 11th Collegiate Dictionary). Within a dynamic system, there can be a myriad of those items/forces, defined as variables. One or more persons may define one or more optimum outcomes from the interaction of those forces/variables.

In a further embodiment, the IES 150 is a dynamic system that enables the innovativeness of individuals or groups of people to achieve valued, innovative outcomes when there is the complexity of x-number of variables regarding types and measures of innovation, individual/group preferences for innovative behaviors, organizational culture, strategic considerations, etc.). Each of the x-number of variables has y-number of dimensions and is represented by a vector with y-number of coordinates (in accord with the y-number of dimensions) depicting magnitude and direction of a vector that is an "object" to be stored in the data base and processed with the CPU. The total n-number of dimensions for the x-number of variables is the sum of all the y-number of dimensions of all those x-number of variables. Likewise, the total n-number of coordinates of the x-number of vectors is the sum of all the y-number of coordinates of the x-number of vectors.

A specific problem that the IES system is directed towards is: for the IES 150 with x-number of variables within which to optimize user-defined innovative outcomes, improve the computer-related technology that enables the data base management to provide the fastest computer processing with the minimum memory requirements, while incorporating an expert system to process the data such that it enables a user, or users, to prioritize and select interventions real-time that produce optimized, innovative outcomes within the IES 150.

Figure 18:
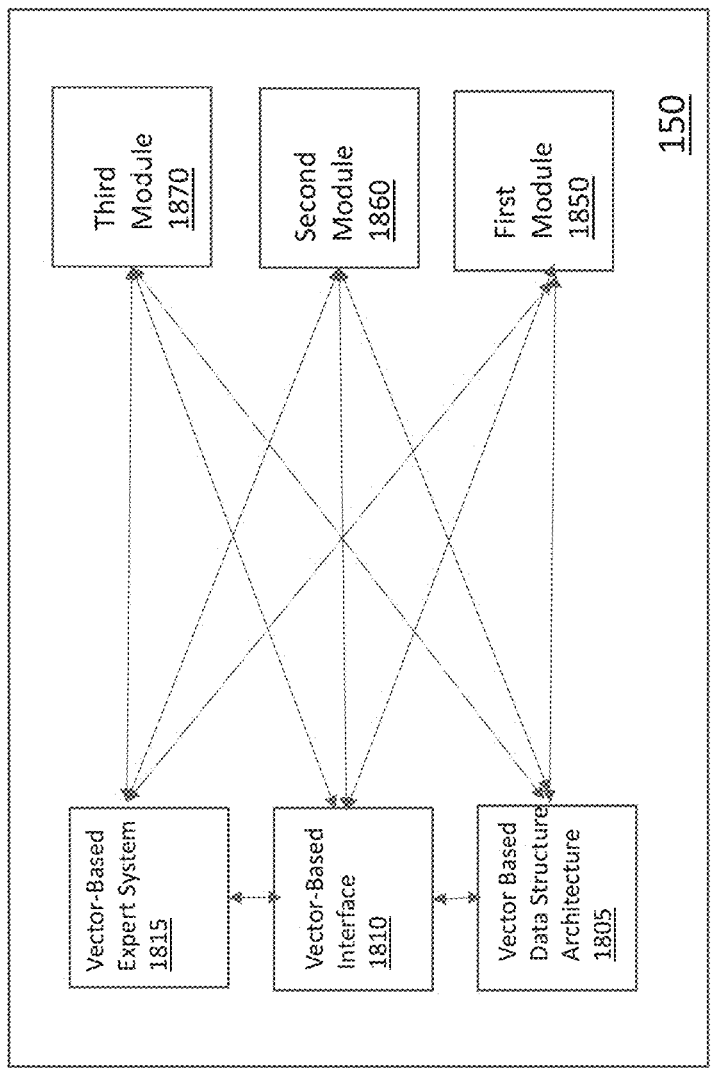
FIG. 18 is a block diagram of the IES 150 for use with vector processes.

Turning now to FIG. 18, illustrated within the IES 150 are emphasized the at least three important approaches for an improvement of how the computer-related technology is improved for the IES 150.

- a vector-based data structure/architecture 1805 of the IES 150 that enables higher speed by which the computer can access needed data across x-number of vectors and carry out computations with the complex relationships among the x-number of variables with y-number of dimensions, while decreasing the memory needed to store data and to conduct computations with x-number of vectors
- a vector-based user interface 1810 that enables a user to scroll the different segments of a dynamic, ideal, or displacement vector through a "digital magnifying glass" to see a segment's coordinates and manipulate those coordinates either separately or in accord with the input from the expert system, by scalar or Euclidean algebraic calculations, and either alone or in relationship with other of the x-number of vectors, sequentially and/or simultaneously, in order to identify interventions that optimize the innovative outcomes within the IES 150.
- a vector-based expert system 1815 applied to the complexity of data from the vector-based data structure/architecture as well as from supplemental data bases, in order to guide the production of optimized, innovative outcomes All this can be brought to bear upon a specific problem:
In illustrative embodiment, as applied to a dynamic IES 150 with x-number of variables, this allows an improvement in the computer-related technology that enables the data base management to improve and increase the speed of computer processing while reducing and minimizing the memory requirements, and incorporating a user interface along with an expert system to process the data such that it enables a user, or users, to prioritize and select interventions real-time that produce optimized, innovative outcomes within the IES 150.

The efficacy of the IES 150 is enhanced by solving this specific problem while improving computer-related technology through the data base management structure itself as well as in combination with a novel user interface and a novel expert-system resourcing from various supplemental data bases.

The vector-based architecture 1815 is related specifically to the following:
- Requiring less computer memory storage by more effectively compressing data
- Enabling the processor to more precisely access the data it needs rather than scanning and discarding unwanted data in rows
- Enabling the loading of data into the processor cache
- Increasing query performance, particularly in very large data sets.
- Processing chunks of cache-fitting vectors of data
- Reducing overheads found in traditional "row-at-a-time processing" (found in such relational data base management systems such as SQL).

The vector-based data structure architecture 1805 of the IES system 150 is generally directed to a data base constructed around the storage of x-number of vectors each with magnitude and direction in y-number of dimensions, and in total comprising a dynamic IES system of n-dimensions where n is the sum of all the y-number of dimensions for all the x-number of vectors.

The IES 150 is able to access large quantities of data with the fewest queries and in shortest period of time, with the most efficient use of available computer memory and the fewest instructions needed for processing the data. The data includes tendencies and preferences that indicate a "direction" for the variables being measured—a potential to know or at least predict future change as they pertain to the system.

As appreciated by the inventors, such vector knowledge and implementation can allow for the following:

A first module 1850 of the IES 150, wherein the first set of tasks allow for evaluation of a person's tendencies and skills regarding innovativeness. Also, training for the core classes of competency for innovation occurs within the first module 1850 so that the user can be more innovative. Each evaluation from the first module 1850 is input through the user interface and constitutes a variable with y-number of dimensions, and thus is represented by a vector with y-number of coordinates as determined by a vector-based expert system. The user interface enables a weighting of the relative importance of each dimension of each variable, thus constituting an "ideal" vector relative to the actual vector for an individual user. The training in the core classes of competency enables the user to manipulate the vectors in response to interventions suggested by the expert system in a third module 1870.

A second module 1860 of the IES 150, wherein innovative-conducive behaviors are determined and applied as applied to focus and result on a particular, concrete result of these tasks together form an innovation. Each behavior is identified through a user's input through the user interface, and is vectorized and tracked by a vector-based expert system in relation to one or more of the x-number of variables with y-number of dimensions.

The third module 1870 is an integration and feedback module between the first two modules. The third module 1870 uses expert-system-based artificial intelligence for which the user first utilizes the vector-based user interface to identify an ideal outcome represented by an "ideal" vector with n-number of coordinates. The vector-based expert system computes the magnitude and direction of the user's interaction with the $1^{st}$ and $2^{nd}$ modules of the IES system as a "dynamic" vector, determines the "displacement" vector that would transform the dynamic vector into the ideal vector, and suggests interventions that the user could employ (based on the training in the $1^{st}$ module) to accomplish such transformation and thus achieve an optimized, innovative outcome.

Vector Based Data Structure Architecture 1805

In the IES 150, the data of the vector-based data structure architecture 1805 is comprised of x-number of variables, each represented by a vector. Each variable has y-number of dimensions. The vector representing a variable has y-number of coordinates (in accord with the y-number of dimensions) depicting magnitude and direction of a vector that is an "object" to be stored and processed. Dimensions/coordinates can be added or deleted over time. The vector based data structure is used by the first module 1850, the second module 1860 and third modules 1870.

For example, a variable of the IES 150 is called "Innovative Thinking Styles" has 9 dimensions: Facts, Insights, Focused, Broad, Visioning, Experimenting, Modifying, Exploring, Versatility). The vector representing the variable "Innovative Thinking Styles" thus has 9 coordinates that are stored and processed as a single vector.

The data for each variable can be represented by its own "component" vector $^>OA$ with y-number of dimensions of that variable. A component vector has the reference point coordinates designated as $O(0_1, 0_2, 0_3, \ldots 0_y)$ and end point coordinates designated as $A(a_1, a_2, a_3, \ldots a_y)$. Given that component vectors are rooted in the reference point coordinates of zero, a component vector can be represented by $^>A$ as well as $^>OA$.

When there are x-number of variables, each with its own component vector with y-number of dimensions, the vector sum of those x-number of component vectors is called an "dynamic" vector having n-number of dimensions (where n is the sum of all the y-number of dimensions/coordinates related to the x-number of variables). Each dynamic vector is located in vector space between two "points" where each point has n-number of coordinates: vector $^>OV$ (or $^>V$) is defined by two points $O(0_1, 0_2, 0_3, \ldots 0_n)$ and $V(v_1, v_2, v_3, \ldots v_n)$ where V has the set of all component vectors coordinates for all the x-number of variables.

Each of the x-number of component vectors has a position within the dynamic vector and adds its y-number of coordinates to the overall set of n-number of dynamic vector coordinates according to its position. Thus, each variable has a "position" within the structure of the dynamic vectors, and all dynamic vectors have the same number of dimensions/coordinates; if there is no data for a particular dimension/coordinate, it will be assigned the value of zero (0). By analogy, the structure of sequence of dynamic vectors and their coordinates can be likened to the structure of a DNA molecule, whereby different variables—each with its own component vectors that comprise segments of the dynamic vector—have the same position within the dynamic vector.

Each dynamic vector's coordinates are stored as a column in a data table, where each row represents one of the y-number of dimensions for each of the x-number of variables and therefore the cell for each column/row represents the coordinates of a component vector. As a vector, when the CPU accesses a vector for computation, it accesses the entire column of coordinates for that vector at once. Thus, each dynamic vector contains all the objects of data from all the x-number of component vectors that comprise that dynamic vector of n-dimensions. And each dynamic vector itself can be considered an object to be stored and processed—representing a compression of the data from the number of component vectors.

By storing the data in n-dimensional vector form rather than just 3-dimensional vector form or integer form, a computer processor of the IES system 150 can access all the data contained in the entire set of coordinate data of each dynamic vector as a single object, with a single query—thereby speeding up the access to complex data through queries. Likewise, it effectively streamlines the management of vector coordinate data into the computer's memory cache. Further, the computer processor can apply a single instruction to the entire set of data compressed in vector form as a single object, thereby increasing processing speed while reducing the required memory size for storing and manipulating that data, and thereby improving computer performance.

Utilizing "compound vector management," each component vector can have from 1 to x-number of coordinates within the dynamic vector of n-dimensions. This compounding of vector management—utilizing vectors-within-vectors—can be expanded to triple, quadruple, and further levels (vectors-within-vectors-within-vectors-within . . . ). This continuously improves the efficiency for subsequent data usage and processing by compressing the amount of data when the CPU is accessing a single dynamic vector for processing, while decreasing query time, processing time, and storage time, while also decreasing the cache and other forms of memory needed for the data processing.

For example, consider the data in Table 1, below, with 5 variables and 5 corresponding component vectors, $^>A$, $^>B$, $^>C$, $^>D$, and $^>E$. Thus, each of the x-number of variables is represented by a component vector comprised of y-number of single vectors, where each single vector designates a coordinate of the component vector. Each component vector is thereby considered a $1^{st}$ level compound vector.

The $2^{nd}$ level compound vectors $^>T$ and $^>U$ are dynamic vectors comprised of a set of $1^{st}$ level compound vectors; all the data for the $1^{st}$ level compound vectors that comprise a 2nd level compound vector can be accessed together as the coordinates of that $2^{nd}$ level compound vector.

The $3^{rd}$ level compound vector $^>V$ is a dynamic vector comprised of a set of $2^{nd}$ level compound vectors; all the data for the $2^{nd}$ level compound vectors can be accessed together, as the coordinates of a $3^{rd}$ level compound vector.

TABLE 1

| | | Dynamic vectors | | | |
|---|---|---|---|---|---|
| Variable definitions | Vector coordinate definitions | $1^{st}$ level compound vectors (each is an original component vector) | | $2^{nd}$ level compound vectors $^>T = ^>A + ^>U =$ | $3^{rd}$ level compound vector $^>V =$ |
| | | $^>A$  $^>B$  $^>C$  $^>D$  $^>E$ | | $^>B + ^>C$   $^>D + ^>E$ | $^>T + ^>U$ |
| A = ___ | $a_1$ = ___ | $a_1$ | | $a_1$ | $a_1$ |
| B = ___ | $b_1$ = ___ | $b_1$ | | $b_1$ | $b_1$ |
| | $b_2$ = ___ | $b_2$ | | $b_2$ | $b_2$ |
| | $b_3$ = ___ | $b_3$ | | $b_3$ | $b_3$ |
| C = ___ | $c_1$ = ___ | $c_1$ | | $c_1$ | $c_1$ |
| | $c_2$ = ___ | $c_2$ | | $c_2$ | $c_2$ |
| D = ___ | $d_1$ = ___ | | $d_1$ | $d_1$ | $d_1$ |
| | $d_2$ = ___ | | $d_2$ | $d_2$ | $d_2$ |
| E = ___ | $e_1$ = ___ | | $e_1$ | $e_1$ | $e_1$ |
| | $e_2$ = ___ | | $e_2$ | $e_2$ | $e_2$ |
| | $e_3$ = ___ | | $e_3$ | $e_3$ | $e_3$ |
| | $e_4$ = ___ | | $e_4$ | $e_4$ | $e_4$ |

While the dynamic vectors are made up of x-number of component vectors and have a total of number of dimensions/coordinates, they can be manipulated in accord with 3-dimensional Euclidean calculations such as addition, subtraction, scalar multiplication and dot product.

The data for the first module 1850, second module 1860 and third modules 1870 are all represented by such dynamic vectors, and that set of data, represented as vectors, can be constantly changing real time. Because the user seeks to implement interventions to produce optimized innovative outcomes in real time, improving the computer-related technology for such processing is vital to meeting this "real time" feature of the user's interaction on the IES system, given the increasing complexity of the n-dimensional set of vector-compressed data. The use of dynamic vectors made up of component vectors with n-number of coordinates enables the computer to access all the data of the n-number of coordinates of a dynamic vector with one query, and apply the Euclidean calculations with one instruction across all the accessed data, so as to improve the speed of data retrieval and processing, while reducing memory requirements, and managing complex sets of data that are constantly changing in real-time, thereby improving computer-related technology.

Vector-Based User Interface 1810

Part 1: Defining the n-Number of Variables and the "Ideal" Vector

The Vector-based User Interface 1810 enables an individual user, a group administrator, and/or an organization administrator, and/or the system designer to define variables for a given situation that can include (but not be limited to):
  Attributes, preferences, tendencies and/or behaviors of an individual user, a group, and/or an organization
  Attributes, preferences, tendencies and/or behaviors of components that comprise a particular situation
  Types of innovation
  Types of outcomes
  Steps, stages, and tasks within a process to be followed
  Goals/decisions related to the complex, dynamic system being measured
  Strategic considerations
  The nature of the system itself
  Actual outcomes produced through the interactions with the system The vector-based user Interface 1810 enables an individual user, a group administrator, and/or an organization administrator, and/or the system designer to define the subjective value of importance of each of the x-number of component vectors by assigning a scalar "weighting" to each component vector, thus defining an "ideal" vector composed of x-number of ideal component vectors. In one embodiment, this user interface would be like a "graphic equalizer" in music, so that the magnitude of each coordinate of the x-number of component vectors could be raised or lowered. An "ideal" vector can be defined as a "target" vector that a user of the IES 150 attempts to approach. As stated earlier (para. 388), each evaluation from the first module 1850 constitutes a variable with y-number of dimensions, and thus is represented by a vector with y-number of coordinates as determined by a vector-based expert system. For each such variable, a user or an expert system can identify an "ideal" state; such an ideal becomes part of the "target" vector. Tracking user behavior expressed in terms of a dynamic vector can be compared to "ideal" behavior by the expert system. In the third module 1870, this expert system can determine suggested interventions that could transform the dynamic vector to more closely resemble the ideal vector, thus leading to optimized innovative outcomes with the IES system.

The Vector-Based Expert System 1815

Figure 19:
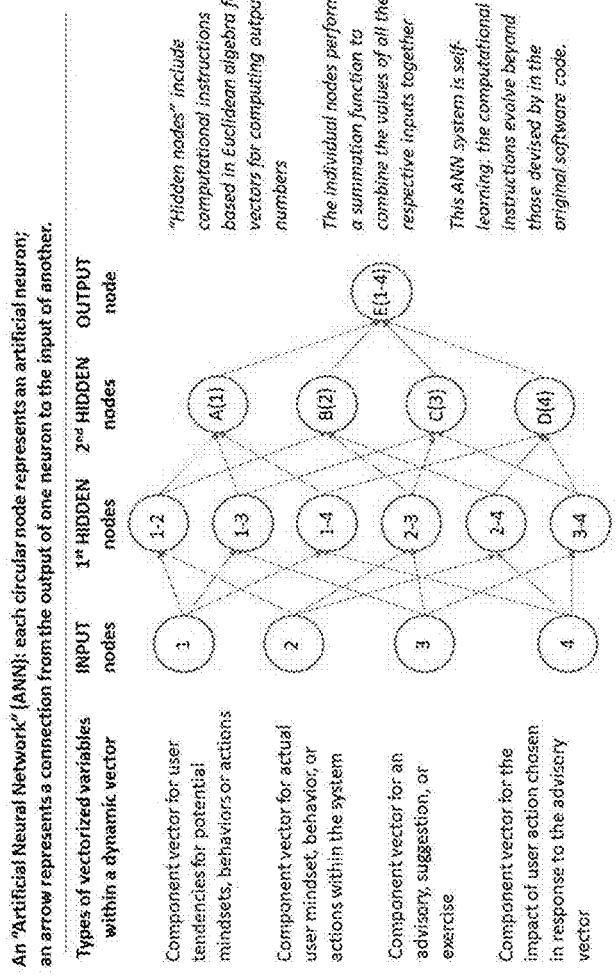
FIG. 19 is an example neural mesh of the innovation enablement system of the IES 150.

Regarding FIG. 19, the vector-based expert system 1815 has capabilities for "machine learning" and "deep learning" that tracks the relationship of the component vectors within an ideal vector and within the dynamic vector to advance the understanding of the statistical structure in sets of data and to model the complex relationships between vectors, thereby producing outputs which reflect new or updated patterns and relationships in the data, and to continuously refine the parameters and coordinates of the ideal vectors. This can also allow for guiding user-defined optimized output.

The vector-based expert system 1815 utilizes a data structure that in one embodiment includes but is not limited to the use of "artificial neural networks" (ANN), such as illustrated in FIG. 19, which are learning algorithms by which computations are structured using an interconnected group of nodes ("artificial neurons"), or other structural elements as they become known, that enable information processing using a connectionist approach to computation in order to advance the understanding of the statistical structure in sets of data contained in the vector data base.

In FIG. 19, a "displacement" vector can be determined by Euclidean algebra subtraction, to be the difference between a given n-dimensional dynamic vector ($\vec{D}$) subtracted from an n-dimensional "ideal" vector ($\vec{I}$). This subtraction is designated by: $\vec{I}-\vec{D}=(i_1-d_1, i_2-d_2, i_3-d_3, \ldots, i_n-d_n)$. This displacement vector would designate what component vectors need to change, in terms of magnitude and direction, for the given dynamic vector to become similar to or identical with the ideal vector. The dynamic, ideal, and displacement vectors would all contain component vectors related to the variables identified in the first module 1850, second module 1860, and third module 1870. Thus, they would have the same n-number of coordinates and could be the subject to one or more Euclidean algebra instructions from the CPU that would thereby act on the n-dimensional data (with n-number of coordinates) from all 3 modules at the same time and by the same algebraic functionality, thus improving the data acquisition and data processing functionality of computer-related technology.

When there is more than one component vector of a dynamic vector that is identified within the displacement vector, the user can give weightings to the component vectors within the ideal vector using the graphic interface described above) to determine the priorities for what needs to change in the given dynamic vector.

One supplementary data base contains a set of "interventions" in the form of data objects that are comprised of knowledge, exercises, prompts, and/or advice to stimulate a strategy with which an individual user, group, or organization can take actions that would result in measurable alterations of the coordinates of the given dynamic vector, in accord with the displacement vector, to become the ideal vector. Each intervention is vectorized with specific dimensions/coordinates of variables found in dynamic/ideal vectors, with an assigned scalar multiplier of those dimensions/coordinates. Assignment can be given either by a user or by the expert system based on data analysis of the efficacy of that intervention to alter the magnitude/direction of the dynamic vector to match an ideal vector.

To determine the potential strength that an intervention might have to alter a dynamic vector to more closely match an ideal vector, vector "dot product" multiplication of the intervention vector ('˘R) times the displacement vector ('S) is utilized. A dot product reveals the degree to which an intervention vector would contribute to the magnitude of the displacement vector in the same direction as the displacement vector. This dot product multiplication is designated by: $˘R*˘S=(r_1*s_1+r_2*s_2+r_3*s_3+\ldots+r_n*s_n)$. The result is a scalar number. When there are alternative interventions that a user could choose from, the dot product for each alternative is computed and the highest scalar number indicates the most impactful, recommended intervention.

To determine the potential strength that an intervention related to one variable might have on another variable, to bring one or both variables to more closely match an ideal vector, vector multiplication involving the cross product is used, because cross product reveals the degree of interaction across different dimensions.

Based on the displacement vector, the expert system 1815 would select a set of interventions, by their vector designation in the supplementary data base(s), that could have the optimum impact in altering the dynamic vector to become more like the ideal vector.

Other types of supplementary data bases that describe new variables within the complex dynamic system could also be introduced, such that the expert system 1815 could include those in its computations of best displacement vectors for optimizing the outcomes within that system. The data from these supplementary data bases is first vectorized in relation to 1 or more of the x-number of variables, and then accessed by the CPU 1710 for processing in conjunction with the expert system. With the IES 150, these supplemental data bases include, but are not limited to, those related to innovation management, eLearning systems, Human Resource and Talent Development assessment systems, project management systems, and content-driven data bases—a complex set of data which has not yet been brought together into an Innovation Enablement System.

Vector Based User Interface 1810 (Part 2)

In one embodiment, the User Interface enables the user to scroll the different segments of a dynamic, ideal, or displacement vector through a "digital magnifying glass" to see a segment's coordinates and manipulate those coordinates either separately or in accord with the input from the expert system, by scalar or Euclidean algebraic calculations. In another embodiment, the vector-based User Interface 1810 utilizes dynamic vector-based graphical displays (as opposed to the conventional raster-based graphics) to present the suggested set of interventions to the user(s) in a vectorized graphical format, from which the user could visualize and manipulate a simulation regarding which intervention(s) are preferable for optimizing the impact on the coordinates of the dynamic vector, in relation to the displacement vector, to become similar to or identical with the ideal vector. Thus, this user interface enables the user to conduct simulations of the optimal interventions as analyzed by the expert system's access to the vector data base as well as vectorizing supplemental data bases.

The User Interface enables the user to isolate specific variables, and their respective component vectors, within n-dimensional dynamic, ideal, and displacement vectors—much like isolating specific strands of DNA within DNA molecules—to examine the optimum way(s) to intervene in accord with the displacement vector to influence the dynamic vector to have the same/similar magnitude and direction as the ideal vector. In one embodiment, to enable the intervention the user interface would be like a "graphic equalizer" in music, so that the magnitude of each coordinate of the x-number of component vectors could be raised or lowered.

After the user chooses one or more interventions and implements them, the expert system tracks the impact on each of the n-number of variables (as coordinates in the dynamic vector) to "learn" about the impact of the intervention(s) and thereby to give a scalar weighting to their impact on the relevant displacement vector. This scalar weighting is applied to update the coordinates of the intervention vector.

The invention thereby weights the intervention(s) as designated vectors that can transform the dynamic vectors to become more like the ideal vectors. Utilizing a vector-based expert system increases computer processing speed and reduces memory usage to provide users with recommended interventions for optimizing outcomes within the dynamic system.

Specific Embodiment

An aim of the dynamic IES 150 in accordance with an exemplary embodiment is that it utilizes a novel n-dimensional vector-based data management system, in combination with a novel user interface and novel expert system, to speed up the efficiency of computer processing and real-time user application of data for selecting user interventions that optimize outcomes within the IES 150.

Expansion of the Applicability of the Approaches that Improve Computer-Related Technology The same novel n-dimensional vector-based data management system, in combination with a novel user interface and novel expert system, with the same impact on improving computer-related technology, can be used for other complex dynamic systems in which users wish to select user interventions that optimize outcomes. Examples of such other complex, dynamic systems include:

Optimizing the management of a natural ecosystem (that includes n-number of variables regarding physical, biological, and human considerations, etc.)

Managing the movement of people in an urban environment (that includes n-number of variables regarding social values, historical infrastructure, ecological considerations, etc.) In the end, such an invention enables a user, or users, to prioritize and select interventions to optimize outcomes within the dynamic system.

APPENDIX A

1. Competency Module Name: Basics of IES
Some Core Concepts:
  IES is an integrated set of innovation models, assessments and tools, delivered to clients through a comprehensive IT resource system
  IES inspires, educates, empowers and equips individuals, teams, and entire organizations to foster innovation
  IES helps achieve performance accountabilities through a human values based approach to innovation
  IES enhances how leaders strategize their business, motivate their employees, serve their customers, and benefit society and the planet at large
Objectives (Awareness/Learning/Application):
  To assess one's current degree of knowledge and practice of IES, and to set personal learning objectives regarding IES To understand the nature of IES, its components, and the relationship between human values and corporate innovation To apply this learning to an in-class project or outside work issue, through practical exercises Content Outline:
The Opportunity for Human Values Based Innovation
Transforming the Field of Innovation
Seeing Innovation from a New Perspective
Innovation in Relation to 4 Contexts of Business
Specialties in The Field of Innovation
Four Domains and Aims of Innovation
Sustainable Innovation
Innovation and Learning
Human Values, Learning, and Innovation
Discovering your Degree of IES Awareness and Practice 2. Competency Module Name: Human Values
Some Core Concepts:
Human values are the positive, desirable qualities of good character that are inherent in every human being, across cultures and across time IES integrates learning-and-innovating in a breathing rhythm of inhale-and-exhale, with human values answering the question, "Why are we learning and innovating in the first place?"

Human values build the character and courage it takes to produce meaningful innovations Objectives (Awareness/Learning/Application):
To assess one's current orientation to three categories of human values, and to set personal learning objectives regarding this.

To understand the nature of human values and their impact on sustainable business and innovation To apply this learning to an in-class project or outside work issue, through practical exercises.

Content Outline
Values in Relation to 4 Contexts of Business Values
Human Values
Social Values
Practice of Human Values
Richard Barrett—Seven Levels of Consciousness
Discovering your Human Values Strengths and Theme 3. Competency Module Name: Group Learning
Some Core Concepts:
Knowledge is the "raw material" of what we make and sell. It is the compilation of a group's "know-how" and "know-what"

Knowledge is not the same as intelligence
When knowledge is created and shared it provides a basis for innovative collaboration Learning and innovating have the same relationship as inhaling and exhaling—they are the "breathing rhythm" of a living organization.

Objectives (Awareness/Learning/Application):
To assess one's current styles and approaches to gaining insights and knowledge, and to set personal learning objectives regarding this.

To understand the various approaches to learning and their relation to being innovative To apply this learning to an in-class project or outside work issue, through practical exercises Content Outline:
Knowledge and Learning in Relation to 4 Contexts of Business
Learning, Knowledge and Intelligence
Styles of Learning
Innovation Process—Knowledge Relationship
Values-Centered Knowledge
Creating a Breathing Rhythm
Discovering your Learning and Knowledge Profile 4. Competency Module: Innovative Thinking
Some Core Concepts:
Innovative thinking takes us beyond creative thinking and helps us to become aware of the different ways we can approach the innovation process By stimulating the innovative thinking of individuals and teams, we tap into the source of our innovation potential There are four distinct styles (strategies) of innovative thinking. Each can be innovative, and all four are needed for comprehensive as well as creative solutions to work challenges.

Objectives (Awareness/Learning/Application):
To assess one's styles of innovative thinking, and to set personal learning objectives regarding this.

To understand the nature of innovation styles and their impact on the various tasks of the innovation process, as well as their practical usefulness when generating innovative solutions to various work task issues.

To apply this learning to an in-class project or outside work issue, through practical exercises Content Outline:
Innovative Thinking in Relation to 4 Contexts of Business
Importance of Innovative Thinking
Our Innovative Potential
History of Innovation Styles
Innovative Thinking Throughout the Process
Innovation Styles Factors
Discovering your Innovation Styles Profile
Individual and Team Profiles 5. Competency Module: Innovation Process
Some Core Concepts:
An innovation process provides the guidance, stimulation and discipline to innovate The innovation process expands conscious awareness from simply generating creative ideas to the whole art and practice of innovation The innovation process has four stages, each with two key tasks. The present approach to the innovation process incorporates human values in each task Objectives (Awareness/Learning/Application):
To assess one's favored role(s) within the innovation process, and to set personal learning objectives regarding this.

To understand the significance and nature of the different tasks in the innovation process (from start to finish).

To apply this learning to an in-class project or outside work issue, through practical exercises.

Content Outline:
Innovation Process in Relation to 4 Contexts of Business
Importance of the Innovation Process
Progression of Innovation Process Models
The proposed Innovation Process Model
"The Confidence Curve"
Risk, Character and Success
Discovering your Innovation Process Profile 6. Competency Module: Team Climate
Some Core Concepts:
Climate" is different from "culture." A "climate" is a set of core values that foster innovation which an individual can embody and lead others to practice in a work group or team Innovation requires a specific set of factors in the team climate—factors that are also likely to improve team productivity.

Objectives (Awareness/Learning/Application):
  To assess the presence in a team of factors that support collaborative innovation, and to set personal learning objectives regarding this.
  To understand the various principles that affect a team's capacity for collaborative innovation, and how to enhance them.
  To apply this learning to an in-class project or outside work issue, through practical exercises.

Content Outline:
  Team Climate in Relation to 4 Contexts of Business
  Climate and Culture
  Importance of a Climate for Innovation
  Team Attunement and Alignment
  Checkpoints for an Evocative Team Climate
  Discovering your Team Climate Profile 7. Competency Module: Leaders of Innovation
Some Core Concepts:
  Leaders throughout the organization play an integral role in championing innovation in the day-to-day work processes and tasks
  Leaders must model the qualities that foster innovativeness.
  Leaders of innovation must be adept in self-development, direct guidance of innovative work, and overall sponsorship of innovation.

Objectives (Awareness/Learning/Application):
  To assess in oneself the attributes of leadership that promotes innovation in oneself and others, and to set personal learning objectives regarding this.
  To understand the qualities of innovation leadership and how to develop them in oneself and others
  To apply this learning to an in-class project or outside work issue, through practical exercises.

Content Outline:
  Leadership of Innovation in Relation to 4 Contexts of Business
  Importance of the Leaders' Role in Innovation
  Common Concepts for Leaders/Leadership
  SPIRITED—the leaders
  Developing IES Leaders
  Discovering your SPIRITED Leadership Profile 8. Competency Module: Culture for Innovation
Some Core Concepts:
  An organizational "culture" is a set of core values that are embedded in an organization's norms, systems, policies and practices . . . usually beyond the influence of any one individual to affect and change.
  A culture can be an enabler for innovation or a barrier to innovation
  The impact of a culture is multiplied across the organization, depending on the number of innovation processes that are occurring
  The factors of the culture for innovation have a direct impact on the individuals and teams conducting innovation processes to meet work challenges.

Objectives (Awareness/Learning/Application):
  To assess the robustness of a organization culture's ability to foster innovation from start to finish
  To understand the factors of an culture for innovation, their impact on the innovation process, and the role of executive sponsors to foster this culture
  To apply this learning to an in-class project or outside work issue, through practical exercises.

Content Outline:
  Corporate Culture in Relation to 4 Contexts of Business
  Importance of a Culture for Innovation
  Thought Leader on Innovation Culture
  Strategic Innovation Management™ (SIM) Research
  Strategic Innovation Management™ Assessment Profile (Sympt$^{om}$)
  Fostering a Wisdom Culture
  Key Success Factors for a Living Organization
  Discovering your SIMAP Profile

APPENDIX B

| Work Task | For Visioning | For Modifying | For Exploring | For Experimenting |
|---|---|---|---|---|
| When Planning your career, ask | What would I ideally like to be doing ten years from now? | How can I build on the interests and experiences I've developed so far? | How can I challenge my assumptions about what's possible? | How can I combine the best parts of all the jobs I've had into a new career? |
| When developing a concept, ask | What solutions would tap into our client's aspirations? | What solutions would build on what the client is now doing? | What solutions would excite our client as radically new? | What solutions would our client see as workable and credible? |
| When putting together new workgroups, ask | How can we work together as a 'World class' innovation team? | What methods can we improve upon from successful teams we've been on? | What would be a revolutionary way of organizing ourselves as a team? | What work practices can we combine, drawing from different sources? |
| When undertaking organizational change, ask | What could make us the 'organization of choice' to work for and buy from? | What could improve on the way we currently do things? | What could 'unfreeze' the organization to see what emerges? | What could give us the best synergy among our units and capabilities? |
| When developing strategic alternatives, ask | How could we be ideally positioned within our industry? | How could we build upon our core strengths and competencies? | How could we rewrite the rules of competition? | How could we synergize different technologies, markets, or partnerships? |
| When developing | What could represent the ideal | What could improve on or | What could break the rules of | What could be the best mix of |

APPENDIX B-continued

| Work Task | For Visioning | For Modifying | For Exploring | For Experimenting |
|---|---|---|---|---|
| new products, ask | wishes of our customers? | extend our current offerings? | 'how things must be' in our industry? | features and benefits? |
| When improving work processes, ask | What could give us a 'world class' process? | What could simplify, add to, or build upon our current work processes? | What could totally reengineer our processes and practices? | What processes could we combine, integrate and synergize? |
| When creating new business growth, ask | How can we serve the ideal wishes of new customer segments? | How can we make what is currently available simpler or less costly? | How can we transform the core business model of this industry? | How can we initiate new partnerships and alliances? |

APPENDIX C

| Innovation Process Model | Each orientation | Intention | Connection | Action |
|---|---|---|---|---|
| Stage 1 CHALLENGE Task 1 Establish a goal | Which human values inspire you to set innovative goals? | Having a commitment to higher goals Extending goodwill to others | Doing no harm Being helpful | Upholding moral virtues Harmonizing diverse interests |
| Stage 1 CHALLENGE Task 2 Assess risks | Which human values encourage you to step into Uncertainty? | Seeing the whole Having tolerance for mistakes | Having no ill will Having a sensitive regard for others | Having disciplined thought Being truthful in speech |
| Stage 2 FOCUS Task 3 Tap into character | When your enthusiasm is low, which human values lift your confidence? | Having a positive outlook Being self-reflective | Having a humble spirit Sacrificing for others | Having strength of character Being accountable for actions |
| Stage 2 FOCUS Task 4 Analyze the issues | Which human values help you to discern the real issues? | Sincerely listening Being broadminded | Cultivating a sense of oneness Being trustworthy | Having steadfast principles Seeking a depth of understanding |
| Stage 3 SOLUTIONS Task 5 Generate ideas | Which human values open your mind to a wide variety of ideas? | Being non-judgmental Having a generous spirit | Being genuinely friendly Having respect for others | Making wise use of resources Making fair decisions |
| Stage 3 SOLUTIONS Task 6 Develop and decide | Which human values guide you to make wise decisions? | Making a meaningful contribution Cultivating inner peace | Trusting in the goodness of others Caring for others | Making wise use of resources Making fair decisions |
| Stage 4 COMPLETION Task 7 Implement the solution | Which human values give you the inner strength to innovate? | Seeking higher wisdom Having noble intentions | Having empathy for others Cooperating with others | Keeping promises Having integrity in decisions |
| Stage 4 COMPLETION Task 8 Celebrate the results | Which human values define your inner measures of success? | Engaging in Thoughtful inquiry Having an enthusiastic mind | Being thankful Serving others | Fulfilling my duties Having a unity of thought, word, action |

APPENDIX D

| Innovation Process Model | Each Style: | Visioning | Modifying | Exploring | Experimenting |
|---|---|---|---|---|---|
| Stage 1 CHALLENGE Task 1 | Excels at Challenges that require: | A clear vision and purpose to drive the | Refining and optimizing what has been | Going into new territory to see what | Combining different elements to |

APPENDIX D-continued

| Innovation Process Model | Each Style: | Visioning | Modifying | Exploring | Experimenting |
|---|---|---|---|---|---|
| Establish a goal | | creative energy | done before | is possible | create many options |
| Stage 1 CHALLENGE Task 2 Assess risks | Will accept risks in relationship to: | Significantly altering the system | Improving the system in the near term | Radically transforming the system | Restructuring the system in verifiable stages |
| Stage 2 FOCUS Task 3 Tap into character | Seeks to bring out values that: | Represent high ideals | Can be practiced day-to-day | Challenge each person to live by | Are shared among many people |
| Stage 2 FOCUS Task 4 Analyze the issues | Understands the issues/ priorities by . . . | Using intuition to understand the future | Analyzing facts to decide on priorities for improvements | Using intuition to challenge assumptions | Analyzing facts to establish key factors and issues to address |
| Stage 3 SOLUTIONS Task 5 Generate ideas | Seeks Ideas by asking: | "What is the Ideal long term Solution?" | "What has been done before that we can improve | "What would be radically new and different?' | "What can we combine to put together a new solution?" |
| Stage 3 SOLUTIONS Task 6 Develop and decide | Evaluates and selects ideas by . . . | Using intuition to see the fit with future goals | Using facts and analysis to optimize results | Using intuition to select the new and novel | Using facts and analysis to verify workability |
| Stage 4 COMPLETION Task 7 Implement the solution | Is best at implementing when . . . | Working with a plan to track progress over the long-term | Working with a plan to achieve short-term results | Working with an eye on "what's next after implementation | Working with a process for learning and improving over time |
| Stage 4 COMPLETION Task 8 Celebrate the results | Knows it is time to celebrate the results when . . . | There is significant progress towards a long - term vision | There is significant short term achievements | There is an exciting break through | There are practical verifiable results that also yield new knowledge |

APPENDIX D

Broad Needs for the Invention

Based on research and over 25 years of global experience in the field of innovation, the inventors have identified ten broad conditions for which the invention is intended to address:

Individual Challenges

1. The practice of innovation today can be likened to a mainframe computer: it is an asset and priority that every organization knows is critical to their business, yet it is still held in the hands of specialists, consultants, and a few exceptional entrepreneurs. It is now being recognized on a global scale that innovativeness has become a requisite core competency for virtually every employee.

The IES invention is intended to be the equivalent of the first innovation enablement "PC" that will demystify innovation while putting the full knowledge, empowerment, responsibility, and tools for innovation into the hands of every person.

2. A significant cause or block to innovation is whether or not a person believes they are innovative and are capable of participating in innovation initiatives. When this belief in oneself is low, he or she tends to look only to specialists (the "experts" in innovation) to do all the innovating. This limits the capacity of workgroups and organizations to engage everyone to contribute their best at work.

The IES invention is intended to bridge the divide between those who believe they (or others) are innovative and those who believe they are not, and engages people of all backgrounds, and all levels in an organization, to participate in innovation endeavors—sometimes initiated by themselves and sometimes by their organization.

3. More and more, the growing importance of creativity and innovation is being touted by professionals and organizations worldwide, but the sources of this momentum are not fully appreciated. Most contextualize it using a "business" rationale and focus on the need for breakthrough products, increased efficiency, lower costs, and greater profits and market share. But the source of this movement is much more multi-dimensional. For example, one source of this movement is the growing awareness that creativity and innovativeness are inherent aspects of being human, and an essential inner urge people have for actualizing their full potential.

The IES invention is intended to reinforce the knowledge that all people are by nature creative and innovative. VCI provides the awareness, concepts, and tools to actualize that inherent potential—in part by drawing its models and concepts from Asian and Indian cultures as well as Western methodologies Organizational Challenges 4. Executives around the world identify innovation as among their top 3 strategic priorities, yet they also state a general dissatisfaction with the capability of their people and organizations to deliver on their innovation investment.

The IES invention is intended to strengthen the capacity to innovate through individual and workgroup competency-building and practice, as well as through organizational leadership, strategy and culture, which are essential components for increasing the satisfaction and return on innovation spending.

5. There are a substantial number of innovation enablement practitioners and consultants around the world who have targeted a specific need for how to foster innovation. Yet their interventions do not share a common conceptual framework that allows an executive to institute an organization-wide approach to innovation enablement. This piecemeal approach is expensive for organizations and results in sub-optimized results for their innovation spending.

The IES invention is intended to bring together the disparate kinds of enablement interventions under one umbrella of common language, depth of insight, and integrated methodologies, which make an organization-wide implementation seamless and less expensive than the current options.

6. Innovation can produce both good and harm in the world. Thought leadership about the importance of character, ethics, and responsibility continue to be missing in the methodologies and practice of corporate innovation.

The IES invention is intended to emphasize and reinforce the qualities of good character and wholistic versatility that are the foundation for beneficial and sustainable innovation.

7. Intellectual capital is the most fundamental asset of an organization. Worldwide, executives have turned their attention to measures of intellectual capital, as they are prime indicators for both innovativeness and intangible market value. Determining how to increase and sustain intellectual capital is at the top of their agenda, but sustainable solutions have proved elusive.

The IES invention is intended to empower an organization to increase their intellectual capital in five ways:

Build "Renewal Capital" by strengthening the ability to develop new intellectual properties and new product and service innovations Build "Process Capital" by strengthening the ability to embed wisdom and innovation into everyday work processes and systems Build "Human Capital" by strengthening the talent pool and finding effective ways to create and share new knowledge Build "Leadership Capital" by strengthening innovative business models, organization design and culture Build "Relationship Capital" by strengthening relationships with customers, suppliers, academics, external resources, and society Global Challenges 8. The global economic and market conditions are undergoing transformative change. For example, the world can no longer rely on American and European consumers to fuel the global economy by buying an unlimited amount of imported goods. The global monetary system designed in the 1940's is in dire need of being brought into the $21^{st}$ century. The BRIC countries are emerging as economic powerhouses. And the planet is in need of sustainable solutions to climate conditions and natural resource limitations. Today, there is not a strong voice of leadership within the field of innovation who has the mission, vision, values and practical tools to make a significant contribution to this transformation outside of the "innovation as usual" construct.

The IES invention is intended to support those with a clear short and long-term global mission and vision for the innovation contribution that is needed to fuel this transformation, including the values-centered processes and tools needed to deliver it.

9. Countries around the world are actively seeking to develop innovation ecosystems to improve their economic and social conditions, while assisting entrepreneurs and home-based businesses to be more inclusive as well as competitive in the global marketplace. They are still struggling to gain the models, collaboration, and resources to put these ecosystems in place. The political will, methodologies, knowledge, and a true spirit of collaboration and courage are still too fragile to actualize this goal.

While the IES invention is not intended to be or replace a country-wide innovation ecosystem, it is intended to provide the innovation enablement tools needed to foster the courage, the trusting collaborative relationships, and the broad-minded thinking it takes to successfully build innovation ecosystems.

10. Businesses, governments and everyday workers are continuing to feel the aftershocks of the global economic recession that started in 2007-2008. Cash is hoarded, credit is hard to come by, deficits are soaring, jobs are lost and slow to rebound, and economic and social suffering continues. This is adding to the economic and social suffering of those who have been disenfranchised for decades. The ways and means to innovate in an inclusive manner that systemically lifts all sectors of society are not well understood or practiced to the degree required to bring all of humanity to a new level of well-being.

The IES invention is intended to be inclusive and systemically uplifting in a two-fold manner: (1) at the grassroots level it is intended to teach and empower individuals and small workgroups; and (2) at the top levels it is intended to guide and empower executives, leaders and academics. Furthermore, the IES invention is intended to show people how to use a human values and wholistic viewpoint when generating and implementing innovative solutions to uplift all sectors of society.

The invention claimed is:

1. A computer-implemented system for facilitating users to develop, practice and/or apply innovation-conducive behaviors and techniques in order to produce a user-defined optimized innovative outcome, the system comprising:

a user system including at least an input device and a display device;

a data store coupled to the user system; and an innovation enablement system (IES) coupled to the user system, the IES including:

a first module that enables display of information stored in the data store configured to guide one or more users through inputting information to complete a first set of one or more tasks directed to developing one or more competencies in innovation, a second module that enables display of information stored in the data store configured to guide one or more users through inputting information to complete a second set of predetermined tasks, including at least two tasks, that together form an innovation process that directs a user towards producing an innovation, and a third module that integrates the first module and the second module by enabling information input into one of the first and second modules to be used by the other of said first and second modules when the user is utilizing the other of the first and second modules, with guidance for the user to utilize the input from the first and/or second modules to produce the user-defined optimized innovative outcome, the user-defined optimized innovative outcome is selected through employment of a combination of pre-defined values of a plurality a set of questions, checkpoints, and exercises that a user is required to finish before proceeding to a next task, wherein the next task is correlated to a user output which is to be employed by the user-defined optimized innovative outcome, wherein the first module, the second module, and the third module each further employs the following, either singularly, or in combination:
 a vector-based data structure architecture with n-dimensional compound vectors;
 a vector-based user interface that enables a user to manipulate one or more vectors sequentially and/or simultaneously; and
 a vector-based expert system employing artificial intelligence coupled to the vector-based user interface that is configured to analyze the relationship complexities of the n-dimensional compound vectors through employment of linear algebra and guide the production of the user-defined optimized, innovative outcome, wherein the user-defined optimized innovative outcome is generated through:
 a) the third module computing the magnitude and direction of the user's action with the first and second modules, to generate a dynamic vector, wherein said dynamic vector is said user output;
 b) the third module then determining a displacement vector that would transform the dynamic vector into an ideal vector; and
 c) the third module then guiding; the user to said user-defined optimized outcome through correlating the displacement vector to a correlated set of guidelines and exercises, wherein said user-defined optimized outcome is represented by the ideal vector with an n-number of coordinates correlated to said pre-defined values.

2. The system of claim 1, wherein the information to guide the group of users consists of guidelines and exercises.

3. The system of claim 1, wherein the competency in innovation employs at least one of:
 a. knowledge
 b. awareness
 c. skills.

4. The system of claim 1, wherein input by the one or more users utilizing the first module can be used by the system to access application exercises that the one or more users engage in as part of a competency in innovation when utilizing the second module, wherein the application exercises are interventions.

5. The system of claim 1, wherein input: by the one or more users utilizing the second module can be used by the system to access learning and application exercises that the one of more users engage in as pa of a competency building in innovation when utilizing the first module.

6. The system of claim 1, wherein, while utilizing the third nodule, the system can prompt the one or more users to choose to switch to either the first or second module, and input information based on the competency-building gained when utilizing competencies gained in the first module or when engaged with the inputs in the second module.

7. A computer-implemented method for facilitating users to produce an innovation, comprising:
 (a) establishing, in an innovation enablement system (IES), a collection of users as a group,
 (b) establishing, in the IES, a set of innovation competency-building tasks relating to imparting knowledge, awareness and/or skills for that user group to develop, and;
 (c) establishing, in the IES, a set of tasks that comprise a project in which the user group:
  practices innovation-conducive behaviors and techniques by inputting information according to a set of predetermined tasks that together form an innovation process whose output is intended to be an innovation,
 wherein the set of tasks is selected within a selection of one or more modules that increase a competency of innovation, comprising at least one of:
  a knowledge increase through electronic learning of a first module,
  an awareness increase through an assessment and feedback of the first module, and
  a skill increase through an application exercise of the first module,
 wherein the first module further employs the following either singularly or in combination:
  a vector-based data structure architecture with n-dimensional compound vectors;
  a vector-based user interface that enables a user to manipulate one or more vectors sequentially and/or simultaneously; and
  a vector-based expert system employing artificial intelligence coupled to the vector-base user interface that is configured to analyze the relationship complexities of the n-dimensional compound vectors through employment of linear algebra and guide the production of the optimized, innovative outcome,
 the optimized, innovative outcome is selected through employment of a combination of pre-defined values of a plurality a set of questions, checkpoints, and exercises that a user is required to finish before proceeding to a next task, wherein the next task is correlated to a user output which is to be employed by the optimized, innovative outcome,
 wherein the optimized innovative outcome is generated through:
  a) computing the magnitude and direction of the user's interaction with the IES to generate a dynamic vector, wherein said dynamic vector is said user output,
  b) determining a displacement vector that would transform the dynamic vector into an ideal vector, and
  c) guiding the user to said optimized outcome through correlating the displacement vector to a correlated set of guidelines and exercises, the ideal outcome represented by the ideal vector with an n-number of coordinates correlated to said pre-defined values.

8. The method of claim 7, further comprising establishing a set of innovation competency-building tasks that comprise a project in which the group practices innovation-conducive behaviors and techniques.

9. The method of claim 7, wherein the set of tasks include short-term and long-term goals for competency-building.

10. The method of claim 7, administrating a selection of a competency-building agenda for applying competency-building to producing innovation.

11. The method of claim 7, wherein said group is set up by a member selected from the group consisting of:
a user; or
an administrator.

12. The method of claim 7, further comprising:
determining a first set of orientations, wherein each of the first set of orientations represents a personal orientation of a user for a specific competency for innovation,
wherein, while utilizing the first set of orientations, an expert system can prompt one or more users to choose to switch to a second set of orientations, and input information based on a competency-building gained when utilizing competencies gained from the first set of orientations in the second set of orientations; and
a server system coupled to the user system, at least a portion of the data store being maintained on said server system,
wherein said innovation enablement system (IES) coupled to the user system is implemented on said user system on a stand-alone basis.

13. A system, comprising:
a vector-based data structure architecture with n-dimensional compound vectors;
a vector-based user interface that enables a user to manipulate one or more vectors sequentially and/or simultaneously; and
a vector-based expert system coupled to the vector-based user interface that is configured to analyze the relationship complexities of the n-dimensional compound vectors and guide a production of optimized, innovative outcomes,
wherein the optimized innovative outcome is selected through employment of a combination of pre-defined values of a plurality a set of questions, checkpoints, and exercises that a user is required to finish before proceeding to a next task, wherein the next task is correlated to a user output which is to be employed by the optimized innovative outcome,
a first module that enables display of information stored in the data store to guide one or more users through inputting information to complete a first set of one or more tasks directed to developing one or more competencies in innovation,
a second module that enables display of information stored in the data store to guide one or more users through inputting information to complete a second set of predetermined tasks, including at least two tasks, that together form an innovation process that directs a user towards producing an innovation, and
a third module that integrates the first module and the second module by enabling information input into one of the first or second modules to be used by the other of said first or second modules when the user is utilizing the first and second modules in order to produce a user-defined optimized innovative outcome,
wherein each of the first module, the second module, and the third module each further employ the following either singularly or in combination:
a vector-based data structure architecture with n-dimensional compound vectors,
a vector-based user interface that enables a user to manipulate one or more vectors sequentially and/or simultaneously, and
a vector-based expert system employing artificial intelligence that is configured to analyze the relationship complexities of the n-dimensional compound vectors through employment of linear algebra and guide the production of optimized, innovative outcomes,
wherein the optimized innovative outcome is generated through:
a) computing the magnitude and direction of the users interaction with the first and second modules, to generate a dynamic vector, wherein said dynamic vector is said user output;
b) determining a displacement vector that would transform the dynamic vector into an ideal vector; and
c) guiding the user to said optimized outcome through correlating the displacement vector to a correlated set of guidelines and exercises, the ideal outcome represented by an ideal vector with an n-number of coordinates correlated to said pre-defined values.

14. The system of claim 13, wherein the vector-based user interface is further employed to train a user in skills that lead to an innovation.

15. The system of claim 13, wherein the vector based expert system is employed to increase a user's competency in innovation, wherein the competency in innovation employs at least one of:
a. knowledge
b. awareness; and
c. skills.

16. The system of claim 13, wherein the vector-based data structure architecture employs a first vector as a component of a second vector of the vector-based data structure.

17. The system of claim 13, wherein the vector-based user interface is configured to define and weigh a subjective value of importance for a user of a compound vector.

18. The system of claim 13, wherein a set of vectors are added to larger compound vectors.

19. The system of claim 13, wherein the expert system employs an artificial neural network to refine a parameter of a vector that includes the subjective weighting of at least one component vector.

20. The system of claim 13, wherein the expert system dynamically advises a user regarding interventions the user could make that would result in adjusting vectors to approach an ideal vector based upon at least one input of a user.

* * * * *